(12) United States Patent
Bemment et al.

(10) Patent No.: US 12,163,479 B2
(45) Date of Patent: Dec. 10, 2024

(54) FUEL DELIVERY

(71) Applicant: ROLLS-ROYCE PLC, London (GB)

(72) Inventors: Craig W Bemment, Derby (GB); Benjamin J Keeler, Derby (GB); Paul W Ferra, Derby (GB); Alastair G Hobday, Derby (GB); Kevin R McNally, Derby (GB); Andrea Minelli, Derby (GB); Martin K Yates, Northamptonshire (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 18/125,477

(22) Filed: Mar. 23, 2023

(65) Prior Publication Data
US 2023/0323822 A1 Oct. 12, 2023

Related U.S. Application Data

(63) Continuation of application No. 17/853,185, filed on Jun. 29, 2022, now Pat. No. 11,643,979.

(30) Foreign Application Priority Data

Apr. 12, 2022 (GB) .................... 2205347

(51) Int. Cl.
F02C 9/28 (2006.01)
B64D 27/12 (2006.01)
B64D 37/00 (2006.01)
B64D 41/00 (2006.01)

(52) U.S. Cl.
CPC ............... F02C 9/28 (2013.01); B64D 27/12 (2013.01); B64D 37/00 (2013.01); B64D 41/00 (2013.01); F05D 2220/323 (2013.01); F05D 2240/35 (2013.01); F05D 2270/313 (2013.01)

(58) Field of Classification Search
CPC ...... F02C 9/26; F02C 9/40; F02C 9/44; F23R 3/36
See application file for complete search history.

(56) References Cited

U.S. PATENT DOCUMENTS

| 3,032,986 | A | 5/1962 | Wright |
| 10,520,195 | B2 | 12/2019 | Pal et al. |
| 11,643,979 | B1 | 5/2023 | Bemment et al. |

(Continued)

FOREIGN PATENT DOCUMENTS

| GB | 2587685 A | 4/2021 |
| WO | 2021/001563 A1 | 1/2021 |

OTHER PUBLICATIONS

Chevron, "Aviation Fuels Technical Review", p. 3 (Year: 2007).

Primary Examiner — Thuyhang N Nguyen
(74) Attorney, Agent, or Firm — Oliff PLC

(57) ABSTRACT

The present application discloses a method of determining one or more fuel characteristics of an aviation fuel suitable for powering a gas turbine engine of an aircraft, the gas turbine engine having a combustor supplied with fuel from a fuel system, the method comprising: determining a mass of the fuel being supplied to the combustor; determining a corresponding volume of the fuel being supplied to the combustor; and determining one or more fuel characteristics based on the determined mass and volume. Also disclosed is a fuel characteristic determination system, a method of operating an aircraft, and an aircraft.

22 Claims, 11 Drawing Sheets

(56) References Cited

U.S. PATENT DOCUMENTS

| | | | | |
|---|---|---|---|---|
| 2010/0112500 A1* | 5/2010 | Maiello | ............... | F23N 3/082 |
| | | | | 431/76 |
| 2011/0126545 A1* | 6/2011 | Loeven, II | ............ | F23R 3/36 |
| | | | | 60/39.281 |
| 2011/0307192 A1* | 12/2011 | Veilleux | ............. | G01F 1/363 |
| | | | | 702/47 |
| 2015/0100219 A1* | 4/2015 | Swann | ................. | F02C 3/20 |
| | | | | 701/100 |
| 2015/0191667 A1* | 7/2015 | Dubois | ............... | C10L 10/02 |
| | | | | 44/451 |
| 2015/0323189 A1 | 11/2015 | Jeney et al. | | |
| 2016/0257416 A1 | 9/2016 | Himmelmann et al. | | |
| 2017/0175019 A1 | 6/2017 | Ginestra et al. | | |
| 2017/0284671 A1 | 10/2017 | Asai et al. | | |
| 2020/0141332 A1 | 5/2020 | Griffiths | | |
| 2022/0356845 A1* | 11/2022 | Morenko | .......... | F23D 11/107 |

\* cited by examiner

FUEL DELIVERY

CROSS-REFERENCE TO RELATED APPLICATIONS

This application is a continuation of U.S. application Ser. No. 17/853,185, filed on 29 Jun. 2022, which claims priority from United Kingdom Patent Application Number 2205347.4, filed on 12 Apr. 2022. The entire contents of each of these applications are incorporated herein by reference in their entirety.

BACKGROUND

Field of the Disclosure

The present disclosure relates to aircraft propulsion systems, and to methods of operating aircraft involving the management of fuels of different types, including control of refuelling, and to methods of modifying aircraft so as to allow such operating methods to be implemented. The present disclosure further relates to methods of, and systems for, determining one or more fuel characteristics of an aviation fuel. The present disclosure further relates to operating an aircraft according to the determined fuel characteristics.

Description of the Related Art

There is an expectation in the aviation industry of a trend towards the use of fuels different from the traditional kerosene-based jet fuels generally used at present.

SUMMARY

According to a first aspect there is provided a method of refuelling an aircraft comprising a gas turbine engine and a fuel tank arranged to provide fuel to the gas turbine engine, the method comprising:
   obtaining an amount of energy required for an intended flight profile;
   obtaining a calorific value of fuel available to the aircraft for refuelling;
   calculating the amount of the available fuel needed to provide the required energy; and
   refuelling with the calculated amount of the available fuel.

Knowledge of the calorific value(s) of fuel(s) available to an aircraft can allow more efficient, tailored, control of the propulsion system. For example, changing to a fuel with a higher calorific value may allow a smaller amount (mass or volume) of fuel to supply an aircraft's energy needs for a flight. In addition, as more power is needed to lift a greater mass of fuel, taking sufficient fuel for the intended flight (including a safety margin above the expected energy demand), but not completely filling the tank(s), may provide an efficiency bonus by reducing take-off weight of the aircraft. Knowledge of the calorific value of the fuel can therefore be used as a tool to improve aircraft performance, e.g. avoiding carrying excess fuel weight.

The calculating the amount of the available fuel needed to provide the required energy may comprise obtaining an energy content of fuel already in the fuel tank(s)—e.g. that remaining from a previous refuelling event—and subtracting that from the determined amount of energy required for the intended flight profile.

The obtaining the calorific value of the fuel available to the aircraft for refuelling may comprise receiving an input of calorific value data for the available fuel, e.g. via a user interface.

The obtaining the calorific value of the fuel available to the aircraft may comprise receiving calorific value data in an electronic communication, e.g. from the reading of a barcode or QR code associated with the fuel supply, or receiving a message from the fuel supplier or refuelling facility.

The obtaining the calorific value of the fuel available to the aircraft may comprise chemically and/or physically determining the calorific value of the available fuel, optionally by performing one or more of:
   i. identifying a tracer in the available fuel, such as a dye, or a trace substance used as a marker, and looking up a calorific value corresponding to that tracer (a trace substance inherently present in the fuel which may vary between fuels may be used to identify a fuel, and/or a substance may be added deliberately to act as a tracer);
   ii. inferring the calorific value from one or more detected physical or chemical properties of the available fuel; and/or
   iii. combusting a sample of the available fuel to determine its calorific value directly, optionally using the gas turbine engine.

The chemically and/or physically determining the calorific value of the available fuel may be performed onboard the aircraft, and optionally may be performed in operation of the aircraft, e.g. powering lighting, heating, and/or air conditioning whilst stationary/before refuelling is complete.

Especially (but not only) in scenarios in which the calorific value is manually input, the method may further comprise performing a check to verify the calorific value/input data, the check comprising measuring the calorific value of the fuel in use in the gas turbine engine, optionally during operation of the aircraft prior to take-off (e.g. taxiing, or at-gate operations), and comparing that to the value obtained by a different route. In the event of a mis-match beyond a threshold, the aircraft may be returned to the gate/refuelling may recommence.

The determining the calorific value of the fuel may be performed by monitoring engine parameters during a first time period of aircraft operation during which the gas turbine engine uses the fuel; and determining the calorific value of the fuel based on the monitored engine parameters. This determination step may be used to determine the calorific value of the fuel already in the aircraft's tanks—e.g. in a flight prior to the refuelling event—such that the energy remaining in the tanks can be calculated and deducted from the amount needed on refuelling. This determination step may also be used for the new fuel to be provided to the aircraft—e.g. combusting a small sample in the/a gas turbine engine whilst the aircraft is stationary and before refuelling is complete, so as to determine how much more fuel to request or accept, or as part of checks to confirm the calorific value obtained on refuelling.

The gas turbine engine may be a main, propulsive, gas turbine engine, or may be a gas turbine engine of an auxiliary power unit (APU), which may or may not be arranged to provide propulsive power to the aircraft. In some cases, fuel properties may be determined by combusting a small sample in the APU before starting the main engine(s). In additional or alternative examples, the combustion of a fuel sample for determining fuel characteristics may be done in one or more of the main propulsion engine(s).

According to a second aspect, there is provided a propulsion system for an aircraft, the propulsion system comprising:

a gas turbine engine;

a fuel tank arranged to contain a fuel to power the gas turbine engine; and a refuelling manager arranged to:

obtain an amount of energy required for an intended flight profile;

obtain a calorific value of fuel available to the aircraft;

calculate the mass or volume of the available fuel needed to provide the required energy; and output the mass or volume of the available fuel needed so as to allow the aircraft to be refuelled accordingly.

The amount of energy required for an intended flight profile may include a safety margin beyond the amount expected to be needed for the flight. The size of the safety margin may be decided based on a variety of flight, environmental condition, and aircraft parameters.

The propulsion system may further comprise one or more sensors arranged to physically and/or chemically detect one or more properties or characteristics of the fuel. The one or more fuel properties/the sensor data may then be used to infer or calculate the calorific value of the fuel—this may be used for either or both of the fuel already present in the aircraft's tank(s) prior to refuelling, and the fuel being provided to the aircraft on refuelling. Sensor type and location may be selected accordingly.

The propulsion system may be arranged to implement the method of the first aspect.

The gas turbine engine optionally comprises:

an engine core comprising a turbine, a compressor, and a core shaft connecting the turbine to the compressor; and a fan located upstream of the engine core, the fan comprising a plurality of fan blades and being arranged to be driven by an output from the core shaft.

According to a further aspect, there is provided a non-transitory computer readable medium having stored thereon instructions that, when executed by a processor, cause the processor to:

obtain an amount of energy required for an intended flight profile of an aircraft;

obtain a calorific value of fuel available to the aircraft;

calculate the amount of the available fuel needed to provide the required energy; and output the mass or volume of the available fuel needed so as to allow the aircraft to be refuelled accordingly.

The instructions may be further arranged to cause the processor to control fuel input to the aircraft, such that the aircraft is refuelled with the calculated amount of the available fuel.

The instructions may be arranged to cause the processor to perform the method of the first aspect.

According to a third aspect, there is provided a method of checking refuelling of an aircraft comprising a gas turbine engine and a fuel tank arranged to provide fuel to the gas turbine engine, the method comprising:

receiving an input of calorific value data for fuel provided to the aircraft on refuelling;

independently determining at least one of:

(i) the calorific value of fuel supplied to the gas turbine engine in use; and (ii) the calorific value of the fuel provided to the aircraft on refuelling; and providing an alert if the determined calorific value of fuel is inconsistent with the calorific value data input received.

As used above, "independently" determining the calorific value means determining the calorific value with no use of, or reference to, the input calorific value data—two values for the calorific value can therefore be obtained separately and compared. The two values may therefore be obtained in completely different ways—e.g. one may be provided by a fuel supplier, and one may be calculated from sensor data.

The inventors appreciated that, as different fuels can have different properties, whilst still conforming to the standards, knowledge of the fuel(s) available to an aircraft can allow more efficient, tailored, control of the propulsion system. Verification systems, for example implementing a check of fuel properties if changes to aircraft control are to be made based on the fuel characteristics, may therefore be implemented to build trust in, and improve reliability of, such new propulsion system control techniques.

The checking of the third aspect may be performed for safety reasons—to ensure that the total energy in fuel onboard the aircraft is sufficient for the intended flight, including any safety margin provided (e.g. in case of adverse weather or a need to divert to a different airport).

The checking of the third aspect may be performed for aircraft performance optimisation reasons—confidence in knowledge of the fuel(s) onboard the aircraft may allow engine operation to be tailored to the available fuel(s).

The method may be performed by an aircraft system, and/or by an off-wing unit.

The gas turbine engine may be a main, propulsive, gas turbine engine or a gas turbine engine of an auxiliary power unit (APU), which may or may not be arranged to provide propulsive power to the aircraft.

The method may comprise determining the calorific value of the fuel provided to the aircraft on refuelling in a fuel testing unit. The fuel testing unit may be provided off-wing at a refuelling site.

The determining the calorific value of the fuel supplied to the gas turbine engine in use may be performed during at least one of: (i) one or more operations on the ground prior to take-off (e.g. engine warm-up and/or taxiing of the aircraft), and (ii) climb. It will be appreciated that performing the determination relatively early in the flight may facilitate taking appropriate corrective action if the determined value is inconsistent with the calorific value data input received. Ideally, the check may be performed before the aircraft leaves the ground, in case the fuel is not as expected to such an extent that refuelling is advisable.

The determining the calorific value of the fuel supplied to the gas turbine engine in use may be performed by burning fuel taken from the fuel tank arranged to be used to supply fuel to the gas turbine engine in an auxiliary power unit (APU) of the aircraft and determining the calorific value.

The determining the calorific value of the fuel supplied to the gas turbine engine in use may be performed by sensing engine parameters (of the propulsive gas turbine engine and/or of a gas turbine engine of an APU) during a first time period of aircraft operation during which the gas turbine engine uses the fuel; and determining the calorific value of the fuel based on the monitored engine parameters. Optionally, the one or more engine parameters may be monitored over the first time period.

The determining the calorific value of the fuel provided to the aircraft on refuelling may be performed by identifying a tracer in the fuel provided to the aircraft (e.g. a dye or a marker trace element), and looking up a calorific value corresponding to that tracer.

The determining the calorific value of the fuel provided to the aircraft on refuelling may be performed by inferring the calorific value from one or more detected physical or chemical properties of the available fuel.

The receiving an input of calorific value data for fuel provided to the aircraft on refuelling may comprise receiving data input via a user interface of the aircraft, e.g. a typed-in value or value selected from a menu.

The receiving an input of calorific value data for fuel provided to the aircraft on refuelling may comprise receiving data electronically communicated to the aircraft, e.g. sent by a supplier or obtained from reading a bar code, QR code, or other code associated with the provided fuel.

According to a fourth aspect, there is provided a propulsion system for an aircraft, the propulsion system comprising:
a gas turbine engine;
a fuel tank arranged to contain a fuel to power the gas turbine engine; and
a fuel tracking system arranged to:
receive an input of calorific value data for fuel provided to the aircraft on refuelling;
determine at least one of:
(i) the calorific value of fuel supplied to the gas turbine engine in use; and
(ii) the calorific value of the fuel provided to the aircraft on refuelling; and provide an alert if the determined calorific value of the fuel is inconsistent with the calorific value data input received.

The gas turbine engine may comprise:
an engine core comprising a turbine, a compressor, and a core shaft connecting the turbine to the compressor; and
a fan located upstream of the engine core, the fan comprising a plurality of fan blades and being arranged to be driven by an output from the core shaft.

The propulsion system may further comprise one or more sensors arranged to physically and/or chemically detect one or more properties of the fuel, the one or more fuel properties being used to infer or calculate the calorific value of the fuel. These sensors may be used in determining the calorific value of either or both of the fuel supplied to the gas turbine engine in use, and the fuel being provided to the aircraft on refuelling. Sensor type and location may be selected accordingly.

The propulsion system may further comprise one or more sensors arranged to sense at least one engine parameter during a first time period of aircraft operation during which the gas turbine engine (a propulsive gas turbine engine and/or a gas turbine engine of an APU) uses the fuel; the at least one engine parameter being used to determine the calorific value of the fuel.

The propulsion system may be arranged to implement the method of the third aspect.

According to a fifth aspect, there is provided a method of refuelling an aircraft comprising a gas turbine engine and a fuel tank arranged to provide fuel to the gas turbine engine, the method comprising:
determining an amount of energy required for an intended flight profile (optionally including a safety margin as mentioned above);
receiving an input of calorific value data for the available fuel;
calculating the amount of the available fuel needed to provide the required energy;
outputting the calculated amount of the available fuel needed so as to allow the aircraft to be refuelled accordingly;
determining at least one of:
(i) the calorific value of fuel supplied to the gas turbine engine in use after refuelling; and
(ii) the calorific value of the fuel provided to the aircraft on refuelling; and
providing an alert if the determined calorific value of fuel is inconsistent with the calorific value data input received.

The calculating the amount of the available fuel (e.g. from a refuelling vessel or pipeline) needed to provide the required energy may comprise obtaining a calorific value of fuel already in the fuel tank, and using that to calculate the total energy available from fuel already onboard, optionally using one or more calorific values of the one or more fuels onboard and the amount of each. That value may then be subtracted from the determined amount of energy required for the intended flight profile. The calculating the amount of the available fuel needed to provide the required energy may therefore comprise obtaining an energy value of fuel already in the fuel tank, and subtracting that from the determined amount of energy required for the intended flight profile.

The method may further comprise calculating a calorific value for the mixed fuel after refuelling. The calorific value of fuel supplied to the gas turbine engine in use may therefore be determined to be inconsistent with the calorific value data input received only when the calculated calorific value for the mixed fuel does not match the determined calorific value of fuel supplied to the gas turbine engine in use.

According to a sixth aspect, there is provided a method of determining a calorific value of fuel supplied to a gas turbine of an aircraft, the method comprising:
sensing one or more engine parameters during a first time period of aircraft operation during which the gas turbine engine uses the fuel; and
based on the one or more sensed engine parameters, determining a calorific value of the fuel.

The sensing may be repeated such that the at least one engine parameter is monitored over time, and/or to provide a check of a first sensed value.

As different fuels can have different properties, such as different calorific values, whilst still conforming to the standards, the same gas turbine engine may perform differently when provided with a different fuel. The performance of the gas turbine engine itself can therefore be used to determine calorific value of a fuel currently being provided to a gas turbine engine. Knowledge of the fuel(s) available to an aircraft is beneficial as it can allow more efficient, tailored, control of the propulsion system, and/or tailored fuelling.

The first time period of aircraft operation may comprise at least one of (i) a period of engine operation prior to take-off, and (ii) a period of time spent climbing.

The first time period of aircraft operation may comprise a period of time spent warming up the engine prior to any movement, a period of time taxiing prior to take-off, and/or a period of time spent climbing. In other examples, the first time period may be during cruise. It will be appreciated that performing the determination relatively early in the flight may facilitate making use of the calorific value determined. The determination may be performed before the aircraft leaves the ground, in case the fuel is not as expected to such an extent that refuelling is advisable, or so as to judge how much of a fuel to load. In other implementations, the calorific value may be used to influence propulsion system control in flight/for the remainder of the flight following the determination.

The sensed/monitored engine parameters may include one or more of fuel flow rate, shaft speed, combustor temperature rise, thrust generated, and exhaust temperature.

The method may further comprise performing a check to verify the determined calorific value, the check comprising comparing the calorific value of the fuel determined from the engine parameters to a calorific value of the fuel which is:
a) supplied to the aircraft (e.g. by an electronic communication, or using a graphical user interface);
b) calculated from detected fuel properties (e.g. from sensor data); and/or
c) determined from one or more engine parameters sensed in a different time period of aircraft operation.

The calorific value of the fuel may be determined as a relative value, or change, compared to that of a different fuel used by the same gas turbine engine. A change in the monitored/sensed engine parameter(s) on changing from one fuel to the other may be used to determine the change in calorific value.

One or more engine parameters may therefore be sensed/monitored in two different time periods—one each for the two different fuels. The change in fuel may be the only change made to engine control between the two time periods. The two time periods may also be selected such that altitude and/or other external parameters are at least substantially the same for both, and may therefore be selected to be close to each other in time, if not immediately consecutive. An interval may be left between the two time periods to allow for any transient behaviour around the change in fuel.

The engine parameters may instead be monitored over a single time period during which the change between the two different fuels is made. The change in fuel may be the only change made to engine control during the time period. Any transient behaviour around the change in fuel may be used in determining the calorific value in some examples.

The engine parameters may be or comprise shaft speed and fuel flow rate.

The engine parameters may be or comprise temperature rise across the combustor and fuel flow rate.

The gas turbine engine which is monitored to determine calorific value of the fuel being combusted may be a propulsive gas turbine engine of the aircraft.

The gas turbine engine which is monitored to determine calorific value of the fuel being combusted may be a gas turbine engine of an auxiliary power unit of the aircraft. In such cases, the calorific value may be determined prior to starting a propulsive gas turbine engine of the aircraft.

According to a seventh aspect, there is provided a method of operating an aircraft comprising a gas turbine engine and a fuel tank arranged to supply fuel to the gas turbine engine, the method comprising:
sensing one or more engine parameters during a first time period of aircraft operation during which the gas turbine engine uses the fuel;
based on the sensed engine parameter(s), determining data relating to or comprising a calorific value of the fuel; and
adjusting (e.g. optimising) engine performance during a second time period of aircraft operation based on the determined data.

The sensing may be repeated such that the at least one engine parameter is monitored over time, and/or to provide a check of a first sensed value.

Knowledge of the calorific value of the fuel can therefore be used as a tool to improve aircraft performance in flight, e.g. gauging the likelihood of forming contrails behind an aircraft in given atmospheric conditions and changing fuel source or altitude mid-flight as appropriate, or using a lower calorific value fuel for lower thrust operations.

The first time period of aircraft operation may comprise at least one of (i) a period of engine operation prior to take-off, and (ii) time spent climbing. The first time period of aircraft operation may comprise at least one of time spent warming up the engine prior to movement, time spent taxiing prior to take-off, and time spent climbing. Alternatively or additionally, the first time period may be early on within a cruise period (e.g. within the first 1%, 5% or 10% of the cruise time), so allowing for the optimisation of engine performance thereafter.

The second time period of aircraft operation may be a period of time spent at cruise, and optionally may be the entirety of cruise.

The adjusting engine performance may comprise at least one of:
changing fuel flow rate;
changing pump spill;
changing altitude;
changing guide vane staging; and
changing fuel.

According to an eighth aspect, there is provided a power system for an aircraft, the power system comprising:
a gas turbine engine;
a fuel tank arranged to contain a fuel to power the gas turbine engine; and
a fuel tracking system arranged to:
sense one or more engine parameters during a first time period of aircraft operation during which the gas turbine engine uses the fuel; and
determine a calorific value of the fuel based on the sensed engine parameter(s).

The gas turbine engine may comprise an engine core comprising a turbine, a compressor, and a core shaft connecting the turbine to the compressor; and a fan located upstream of the engine core, the fan comprising a plurality of fan blades and being arranged to be driven by an output from the core shaft.

The gas turbine engine may be arranged to provide propulsive power to the aircraft. The power system may therefore be described as a propulsion system.

Alternatively, the gas turbine engine may be an Auxiliary Power Unit (APU) of the aircraft and may not be arranged to provide propulsive power.

The power system may further comprise at least one sensor arranged to sense the at least one engine parameter.

The power system may further comprise one or more sensors arranged to physically and/or chemically detect one or more properties or characteristics of the fuel, the one or more fuel properties or characteristics being used to infer or calculate the calorific value of the fuel.

According to a ninth aspect, there is provided a propulsion system for an aircraft, the propulsion system comprising a gas turbine engine and one or more fuel tanks arranged to contain fuel to power the gas turbine engine, one or more of the tanks containing a fuel which is a sustainable aviation fuel—SAF—or is a fuel blend including SAF, the SAF having a density of between 90% and 98% of the density, $\rho_K$, of kerosene and a calorific value of between 101% and 105% the calorific value, $CV_K$, of kerosene.

The propulsion system therefore comprises at least one fuel tank arranged to store fuel to power the gas turbine engine, wherein the stored fuel comprises at least a proportion of a sustainable aviation fuel—SAF. If the stored fuel is a SAF-blend as opposed to purely SAF, the blend's calorific value and density will lie between those of the SAF and those for kerosene.

The gas turbine engine comprises:
a combustor; and
a fuel pump arranged to supply a fuel from one or more of the fuel tanks to the combustor at an energy flow rate, C, the fuel pump having an inlet arranged to receive fuel from one or more of the fuel tank(s) and an outlet arranged to output the fuel at a pump output volumetric flow rate, Q, a proportion of the output fuel being provided to the combustor and the remainder being recirculated (i.e. sent from the pump outlet back to the inlet, either directly or indirectly via one or more systems or components), the percentage of fuel passing through the pump which is recirculated/which is not provided to the combustor being referred to as a spill percentage, and wherein the fuel supplied to the pump comprises X % SAF, where X % is in the range from 5% to 100%, with any remainder of the fuel being kerosene, and has a density, $\rho_F$, and a calorific value $CV_F$.

The propulsion system is arranged such that:
the (dimensionless) fuel-change spill ratio, $R_s$, of:

$$R_s = \frac{\text{spill percentage at cruise using kerosene}}{\text{spill percentage at cruise using the fuel with } X\% \text{ SAF}}$$

is equal to:

$$\frac{Q - (C/(CV_K \times \rho_K))}{Q - (C/(CV_F \times \rho_F))}.$$

X may be greater than 50, such that the fuel supplied to the combustor is more than 50% SAF.

It will be appreciated that different tanks may hold fuels with a different % SAF.

The gas turbine engine may be arranged such that, for an engine with a maximum take-off thrust in the range from 400 kN to 500 kN, $R_s$ is in the following range at cruise:

$$\frac{Q - ((Q - 5.80)/(0.014 \times CV_K \times \rho_K))}{Q - ((Q - 6.31)/(0.014 \times CV_F \times \rho_F))} \le$$

$$R_s \le \frac{Q - ((Q - 6.31)/(0.014 \times CV_K \times \rho_K))}{Q - ((Q - 5.80)/(0.014 \times CV_F \times \rho_F))},$$

and optionally in the range:

$$\frac{Q - (Q - 5.80)/(0.014 \times CV_K \times \rho_K)}{Q - (Q - 5.80)/(0.014 \times CV_F \times \rho_F)} \le$$

$$R_s \le \frac{Q - (Q - 6.00)/(0.014 \times CV_K \times \rho_K)}{Q - (Q - 5.80)/(0.014 \times CV_F \times \rho_F)}$$

where Q (fuel flow rate) is measured in litres per second, CV (calorific value) in MJ/kg, and $\rho$ (density) in kg per litre, with the K and F subscripts used for kerosene and the SAF or SAF-blend fuel, respectively.

The gas turbine engine may be arranged such that, for an engine with a maximum take-off thrust in the range from 300 kN to 350 kN, $R_s$ is in the following range at cruise:

$$\frac{Q - ((Q - 4.37)/(0.027 \times CV_K \times \rho_K))}{Q - ((Q - 4.87)/(0.027 \times CV_F \times \rho_F))} \le$$

$$R_s \le \frac{Q - ((Q - 4.87)/(0.027 \times CV_K \times \rho_K))}{Q - ((Q - 4.37)/(0.027 \times CV_F \times \rho_F))}$$

and optionally in the range:

$$\frac{Q - (Q - 4.37)/(0.027 \times CV_K \times \rho_K)}{Q - (Q - 4.87)/(0.027 \times CV_F \times \rho_F)} \le$$

$$R_s \le \frac{Q - (Q - 4.47)/(0.027 \times CV_K \times \rho_K)}{Q - (Q - 4.37)/(0.027 \times CV_F \times \rho_F)},$$

where, as above, Q is measured in litres per second, CV in MJ/kg, and $\rho$ in kg per litre.

The SAF proportion (X %) may be gravimetric.

The gas turbine engine may be arranged such that $R_s \le 1.04$.

The gas turbine engine may be arranged such that $R_s \ge 1.003$.

The gas turbine engine may be arranged such that $R_s \ge 1.014$. It may be that $R_s \ge 1.014$ when the SAF proportion is greater than or equal to 75%.

In addition to considering fuel properties, $R_s$ may be varied based on one or more of ambient temperature, altitude, and stage of cruise.

The gas turbine engine may be arranged such that $R_s$ decreases by less than 0.15% between the beginning and end of cruise, for a constant temperature and altitude.

The gas turbine engine may be arranged such that $R_s$ decreases by at least 0.11% when altitude increases by at least 600 m.

The gas turbine engine may comprise an engine core comprising a turbine, a combustor, a compressor, and a core shaft connecting the turbine to the compressor; and a fan located upstream of the engine core, the fan comprising a plurality of fan blades and being arranged to be driven by an output from the core shaft.

A fuel tank of the one or more tanks may contain pure SAF having a density of between 90% and 98% of the density, $\rho_K$, of kerosene and a calorific value of between 101% and 105% the calorific value, $CV_K$, of kerosene. Alternatively or additionally, a fuel tank of the one or more tanks may contain a blended fuel comprising a proportion of SAF, the SAF having a density of between 90% and 98% of the density, $\rho_K$, of kerosene and a calorific value of between 101% and 105% the calorific value, $CV_K$, of kerosene and being mixed with a kerosene-based fuel to form the blend.

According to a tenth aspect, there is provided a propulsion system for an aircraft, the propulsion system comprising a gas turbine engine and at least one fuel tank arranged to store fuel to power the gas turbine engine, wherein the stored fuel comprises at least a proportion of a sustainable aviation fuel—SAF, the SAF having a density of between 90% and 98% of the density, $\rho_K$, of kerosene and a calorific value of between 101% and 105% the calorific value $CV_K$, of kerosene,
  the gas turbine engine comprising:
    a combustor; and
    a fuel pump arranged to supply fuel from one or more of the fuel tanks to the combustor, the fuel pump having an inlet arranged to receive fuel from one or more of the fuel tanks, the fuel supplied to the pump comprising X % SAF (with any remainder of the fuel being kerosene) and an outlet arranged to output the fuel, a proportion of the output fuel being provided to the combustor and the remainder being recirculated, the percentage of fuel passing through the pump which is recirculated/which is not provided to the combustor being referred to as a spill percentage,
and wherein the propulsion system is arranged such that:
  the fuel-change spill ratio, $R_s$, of:

$$R_s = \frac{\text{spill percentage at cruise using kerosene}}{\text{spill percentage at cruise using the fuel with } X\% \; SAF},$$

where X % is at least 30%, is greater than or equal to 1.003.

Here, a gravimetric SAF percentage is used, as opposed to volumetric—the fuel is therefore X % SAF by weight. Due to the differing densities of the fuels, the volumetric SAF percentage would be slightly different—a percentage by volume may be used in some implementations, and the numbers give may be adjusted accordingly.

The propulsion system, and more specifically the gas turbine engine, may be arranged such that:

$$R_s \geq 1 + \frac{X}{10000}.$$

When X is 50 (i.e. the fuel is 50% SAF by weight), the fuel-change spill ratio may be at least 1.0066.

When X is 100, such that the fuel is pure SAF, the fuel-change spill ratio may be at least 1.0138.

The gas turbine engine may be arranged such that $R_s$ varies based on one or more of ambient temperature, altitude, and stage of cruise.

The gas turbine engine may be arranged such that $R_s$ decreases by less than 0.15% between the beginning and end of cruise, for a constant temperature and altitude.

The gas turbine engine may be arranged such that $R_s$ decreases by at least 0.11% when altitude increases by at least 600 m.

The gas turbine engine may be arranged such that $R_s$ is less than or equal to 1.04.

The gas turbine engine may be arranged such that $R_s$ is greater than or equal to 1.003. The gas turbine engine may be arranged such that $R_s$ is greater than or equal to 1.014.

According to an eleventh aspect, there is provided a method of operating an aircraft comprising a propulsion system, the propulsion system comprising a gas turbine engine including a combustor, and at least one fuel tank arranged to store fuel to power the gas turbine engine, wherein the stored fuel comprises at least a proportion of a sustainable aviation fuel—SAF—having a density of between 90% and 98% of the density, $\rho_K$, of kerosene and a calorific value of between 101% and 105% the calorific value $CV_K$, of kerosene, the gas turbine engine comprising a fuel pump arranged to supply a fuel from one or more of the fuel tanks to the combustor at an energy flow rate, C, the fuel pump having an inlet arranged to receive fuel from the one or more fuel tanks and an outlet arranged to output fuel at a pump output volumetric flow rate, Q, a proportion of the output fuel being provided to the combustor and the remainder being recirculated, the percentage of fuel passing through the pump which is recirculated being referred to as a spill percentage, the method comprising:
  supplying a fuel from one or more of the fuel tanks to the gas turbine engine, the fuel supplied to the gas turbine engine comprising X % SAF, where X % is in the range from 5% to 100%, with any remainder of the fuel being kerosene, and wherein the fuel has a density, $\rho_F$, and a calorific value $CV_F$; and
  controlling the propulsion system such that:
    the fuel-change spill ratio, $R_s$, of:

$$R_s = \frac{\text{spill percentage at cruise using kerosene}}{\text{spill percentage at cruise using the fuel with } X\% \; SAF}$$

is equal to:

$$\frac{Q - (C/(CV_K \times \rho_K))}{Q - (C/(CV_F \times \rho_F))}.$$

The method may comprise controlling the propulsion system such that any of the conditions relating to $R_s$ as described above for the ninth and tenth aspects apply.

X % may be in the range from 50% to 100%.

According to a twelfth aspect, there is provided a method of operating an aircraft comprising a propulsion system comprising a gas turbine engine and one or more fuel tanks arranged to contain fuel to power the gas turbine engine, one or more of the tanks containing at least a proportion of a sustainable aviation fuel—SAF—having a density of between 90% and 98% of the density, $\rho_K$, of kerosene and a calorific value of between 101% and 105% the calorific value $CV_K$, of kerosene:
  the gas turbine engine comprising:
    a combustor; and
    a fuel pump arranged to supply a fuel from one or more of the fuel tanks to the combustor, the fuel pump having an inlet arranged to receive fuel from the one or more fuel tanks, the fuel supplied to the pump comprising X % SAF, with any remainder of the fuel being kerosene, and an outlet arranged to output the fuel, a proportion of the output fuel being provided to the combustor and the remainder being recirculated, the percentage of fuel passing through the pump which is recirculated being referred to as a spill percentage.
The propulsion system is arranged such that:
  the fuel-change spill ratio, $R_s$, is defined as:

$$R_s = \frac{\text{spill percentage at cruise using kerosene}}{\text{spill percentage at cruise using a fuel with } X\% \; SAF},$$

When X % is at least 30% (i.e. when the fuel is at least 30% SAF by weight/mass), $R_s$ is greater than or equal to 1.003.

The method may comprise controlling the propulsion system such that any of the conditions relating to $R_s$ as described above for the ninth and tenth aspects apply.

According to a thirteenth aspect, there is provided a method of determining one or more fuel characteristics of an aviation fuel suitable for powering a gas turbine engine of an aircraft, the method comprising:
  determining a mass of a fuel being loaded, or which has been loaded, onto the aircraft;
  determining a corresponding volume of the fuel; and
  determining one or more fuel characteristics of the fuel based on the determined mass and volume.

The inventors have appreciated that by measuring a mass and volume parameter of the fuel being loaded, or which has been loaded, onto an aircraft one or more characteristics of the fuel can be determined.

Determining the one or more fuel characteristics may comprise calculating a fuel density based on the determined fuel mass and fuel volume. The one or more fuel characteristics may be based on the density. The one or more fuel characteristics may be obtained by comparison of the density to a look-up table of fuels having known densities and corresponding fuel characteristics that are to be determined.

Determining the mass of the fuel may comprise measuring a mass flow rate at a point within a fuel supply line used to convey fuel to one or more fuel tanks on board the aircraft.

Determining the volume of the fuel may comprise measuring a volume flow rate at a point within the fuel supply line used to convey fuel to one or more fuel tanks on board the aircraft.

Determining the mass of the fuel may comprise measuring the mass and/or a change in the mass of any one or more of: the aircraft; one or more fuel tanks on board the aircraft; a fuel tanker vehicle from which the fuel is supplied; or a storage vessel from which the fuel is supplied to the aircraft.

Determining the volume of the fuel may comprise measuring the volume and/or a change in the volume of fuel: stored in one or more fuel tanks on board the aircraft; and/or stored in a fuel storage vessel from which the fuel is supplied to the aircraft.

The one or more fuel characteristics determined may include any one or more of:
  (i) a hydrocarbon distribution of the fuel
  (ii) a percentage of sustainable aviation fuel in the fuel; and/or
  (iii) an aromatic hydrocarbon content of the fuel.

The one or more fuel characteristics may include an indication that the fuel is a fossil fuel e.g. kerosene.

The one or more fuel characteristics may be further determined based on a signal indicative of the temperature of the fuel.

According to a fourteenth aspect, there is provided a fuel characteristic determination system for determining one or more fuel characteristic of an aviation fuel suitable for powering a gas turbine engine of an aircraft, the system comprising:
  a fuel characteristic determination module arranged to:
    receive a fuel mass signal indicative of a mass of the fuel being loaded, or which has been loaded, onto the aircraft;
    receive a fuel volume signal indicative of a volume of fuel being loaded or loaded onto the aircraft; and
    determine one or more fuel characteristics of the fuel based on the fuel volume and fuel mass signals.

The fuel characteristic determination module may be configured to calculate a density of the fuel based on the fuel mass signal and fuel volume signal.

The fuel characteristic determination system may further comprise a mass sensor arranged to measure a mass of the fuel, wherein the fuel mass signal is received from the mass sensor.

The fuel characteristic determination system may further comprise a volume sensor arranged to measure a volume of fuel, wherein the fuel volume signal is received from the volume sensor.

The mass sensor may be a mass flow rate meter. The volume sensor may be a volume flow rate meter.

The mass flow rate meter may be arranged to measure mass flow rate at a point within a fuel supply line used to convey fuel to one or more fuel tanks on board the aircraft.

The volume flow rate meter may be arranged to measure a volume flow rate at a point within the fuel supply line used to supply fuel to one or more fuel tanks on board the aircraft.

The fuel mass signal may be based on a measured mass and/or change in the mass of any one or more of: the aircraft; one or more fuel tanks on board the aircraft; a fuel tanker vehicle from which the fuel is supplied; or a storage vessel from which the fuel is supplied to the aircraft. The mass sensor may be arranged to measure any of the parameter in the previous sentence.

The fuel volume signal may be based on a measured volume and/or in change in volume of fuel: stored in one or more fuel tanks on board the aircraft; and/or stored in a fuel storage vessel from which the fuel is supplied to the aircraft. The volume sensor may be arranged to measure either of these parameters.

The one or more fuel characteristics determined may include any one or more of:
  (i) a hydrocarbon distribution of the fuel;
  (ii) a percentage of sustainable aviation fuel in the fuel; and/or
  (iii) an aromatic hydrocarbon content of the fuel.

The one or more fuel characteristics may include an indication that the fuel is a fossil fuel e.g. kerosene.

The determination module may be further arranged to determine the one or more fuel characteristics based on a signal indicative of the temperature of the fuel.

According to a fifteenth aspect, there is provided a method of operating an aircraft having a gas turbine engine, the method comprising:
  determining one or more fuel characteristics using the method of the thirteenth aspect; and
  operating the aircraft according to the one or more fuel characteristics.

Operating the aircraft according to the one or more fuel characteristics may comprise:
  a) modifying a control parameter of the aircraft, preferably a control parameter of the gas turbine engine, in response to the one or more fuel characteristics; and/or
  b) providing a fuel having different fuel characteristics during refuelling of the aircraft.

According to a sixteenth aspect, there is provided an aircraft comprising the fuel characteristic determination system of the fourteenth aspect, the aircraft further comprising a control system arranged to control operation of the aircraft according to the one or more fuel characteristics determined by the fuel characteristic determination system.

Accord to a seventeenth aspect, there is provided a method of determining one or more fuel characteristics of an aviation fuel suitable for powering a gas turbine engine of an aircraft, the gas turbine engine having a combustor supplied with fuel from a fuel system of the aircraft, the method comprising:
  determining a mass of the fuel being supplied to the combustor;
  determining a corresponding volume of the fuel being supplied to the combustor; and
  determining one or more fuel characteristics based on the determined mass and volume.

The inventors have appreciated that one or more fuel characteristics can be determined during operation of a gas turbine engine by measuring a mass and volume parameter of fuel as it is being supplied to a combustor of the gas turbine engine. One or more fuel characteristics can be determined based on the measure mass and volume of the fuel.

Determining the one or more fuel characteristics may comprise calculating a fuel density based on the determined fuel mass and fuel volume. The one or more fuel characteristics may be based on the density. The one or more fuel characteristics may be obtained by comparison of the density to a look-up table of fuels having known densities and corresponding fuel characteristics that are to be determined.

Determining the mass of the fuel may comprise determining a mass flow rate of fuel being supplied to the combustor.

The fuel system may comprise an engine fuel system forming part of the gas turbine engine. The mass flow rate may be measured at a point in a fuel conduit of the engine fuel system. The mass flow rate may be measured immediately before fuel reaches the combustor.

The mass flow rate may be determined based on an operating parameter of a fuel pump provided in the fuel system. The mass flow rate may be determined based on a measurement of fuel flow using a mass flow meter.

Determining the volume of the fuel may comprise determining a volume flow rate of fuel being supplied to the combustor.

The volume flow rate may be measured at a point in a fuel conduit of the engine fuel system. The volume flow rate may be measured immediately before fuel reaches the combustor. The volume flow rate may be measured at a position adjacent the mass flow rate.

The volume flow rate may be determined based on an operating parameter of a pump provided in the fuel system. The volume flow rate may be determined based on a measurement of fuel flow using a volume flow meter.

The one or more fuel characteristics determined include any one or more of:
  (i) a hydrocarbon distribution of the fuel;
  (ii) a percentage of sustainable aviation fuel in the fuel; and/or
  (iii) an aromatic hydrocarbon content of the fuel.

The one or more fuel characteristics include an indication that the fuel is a fossil fuel e.g. kerosene.

According to an eighteenth aspect, there is provided a fuel characteristic determination system for determining one or more fuel characteristics of an aviation fuel suitable for powering a gas turbine engine of an aircraft, the gas turbine engine having a combustor supplied with fuel from a fuel system of the aircraft, the fuel characteristic determination system comprising:
  a fuel characteristic determination module arranged to:
    receive a fuel mass signal indicative of a mass of fuel being supplied to the combustor;
    receive a fuel volume signal indicative of a volume of fuel being supplied to the combustor; and
    determine one or more fuel characteristics of the fuel based on the fuel volume and fuel mass signals.

The fuel characteristic determination module may be configured to calculate a density of the fuel based on the fuel mass signal and fuel volume signal.

The fuel characteristic determination system may further comprise a mass flow meter arranged to measure a mass flow rate of fuel being supplied to the combustor. The fuel mass signal may be received from the mass flow meter.

The fuel characteristic determination system may further comprise a volume flow meter arranged to measure a volume flow rate of fuel being supplied to the combustor. The fuel volume signal may be received from the volume flow meter.

The mass flow meter and/or volume flow meter may be arranged to measure the flow of fuel measured at a point in a fuel conduit of an engine fuel system of the gas turbine engine. The mass flow meter and/or volume flow meter may be arranged to measure the flow of fuel measured at a point immediately before fuel reaches the combustor.

The fuel system may further comprise a fuel pump arranged to provide fuel to the combustor. The fuel mass signal and/or the fuel volume signal may be based on an operating parameter of the fuel pump.

The one or more fuel characteristics determined include any one or more of:
  (i) a hydrocarbon distribution of the fuel;
  (ii) a percentage of sustainable aviation fuel in the fuel; and/or
  (iii) an aromatic hydrocarbon content of the fuel.

The one or more fuel characteristics include an indication that the fuel is a fossil fuel e.g. kerosene.

According to a nineteenth aspect, there is provided a method of operating an aircraft having a gas turbine engine, the method comprising:
  determining one or more fuel characteristics using the method of the seventeenth aspect; and
  operating the aircraft according to the one or more fuel characteristics.

Operating the aircraft according to the one or more fuel characteristics may comprise:
  a) modifying a control parameter of the aircraft, preferably a control parameter of the gas turbine engine, in response to the one or more fuel characteristics; and/or
  b) providing a fuel having different fuel characteristics during refuelling of the aircraft.

According to a twentieth aspect, there is provided an aircraft comprising the fuel characteristic determination system of the eighteenth aspect, the aircraft further comprising a control system arranged to control operation of the aircraft according to the one or more fuel characteristics determined by the fuel characteristic determination system.

The present disclosure may apply to any relevant configuration of gas turbine engine. Such a gas turbine engine may be, for example, a turbofan gas turbine engine, an open rotor gas turbine engine (in which the propeller is not surrounded by a nacelle), a turboprop engine or a turbojet engine. Any such engine may or may not be provided with an afterburner.

A gas turbine engine in accordance with any aspect of the present disclosure may comprise an engine core comprising a turbine, a combustor, a compressor, and a core shaft connecting the turbine to the compressor. Such a gas turbine engine may comprise a fan (having fan blades). Such a fan may be located upstream of the engine core. Alternatively, in some examples, the gas turbine engine may comprise a fan located downstream of the engine core, for example where the gas turbine engine is an open rotor or a turboprop engine (in which case the fan may be referred to as a propeller).

Where the gas turbine engine is an open rotor or a turboprop engine, the gas turbine engine may comprise two contra-rotating propeller stages attached to and driven by a free power turbine via a shaft. The propellers may rotate in opposite senses so that one rotates clockwise and the other anti-clockwise around the engine's rotational axis. Alternatively, the gas turbine engine may comprise a propeller stage and a guide vane stage configured downstream of the propeller stage. The guide vane stage may be of variable pitch. Accordingly, high-pressure, intermediate pressure, and free power turbines respectively may drive high and intermediate pressure compressors and propellers by suitable interconnecting shafts. Thus, the propellers may provide the majority of the propulsive thrust.

Where the gas turbine engine is an open rotor or a turboprop engine, one or more of the propellor stages may be driven by a gearbox. The gearbox may be of the type described herein.

An engine according to the present disclosure may be a turbofan engine. Such an engine may be a direct-drive turbofan engine in which the fan is directly connected to the fan drive turbine, for example without a gearbox. In such a direct-drive turbofan engine, the fan may be said to rotate at the same rotational speed as the fan-drive turbine.

An engine according to the present disclosure may be a geared turbofan engine. In such an arrangement, the engine has a fan that is driven via a gearbox. Accordingly, such a gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. Such a gearbox may be a single stage. Alternatively, such a gearbox may be a compound gearbox, for example a compound planetary gearbox (which may have the input on the sun gear and the output on the ring gear, and thus be referred to as a "compound star" gearbox), for example having two stages of reduction.

The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a reduction ratio in the range of from 3.1 or 3.2 to 3.8. Purely by way of further example, the gearbox may be a "star" gearbox having a reduction ratio in the range 3.0 to 3.1. Purely by way of further example, the gearbox may be a "planetary" gearbox having a reduction ratio in the range 3.6 to 4.2. In some arrangements, the gear ratio may be outside these ranges.

In any gas turbine engine as described and/or claimed herein, fuel of a given composition or blend is provided to a combustor, which may be provided downstream of the fan and compressor(s) with respect to the flowpath (for example axially downstream). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other. For example, the gas turbine engine may be a direct-drive turbofan gas turbine engine comprising 13 or 14 compressor stages (in addition to the fan). Such an engine may, for example, comprise 3 stages in the first (or "low pressure") compressor and either 10 or 11 stages in the second (or "high pressure") compressor. By way of further example, the gas turbine engine may be a "geared" gas turbine engine (in which the fan is drive by a first core shaft via a reduction gearbox) comprising 11, 12 or 13 compressor stages (in addition to the fan). Such an engine may comprise 3 or 4 stages in the first (or "low pressure") compressor and 8 or 9 stages in the second (or "high pressure") compressor. By way of further example, the gas turbine engine may be a "geared" gas turbine engine having 4 stages in the first (or "low pressure") compressor and 10 stages in the second (or "high pressure") compressor.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other. The second (or "high pressure") turbine may comprise 2 stages in any arrangement (for example regardless of whether it is a geared or direct-drive engine). The gas turbine engine may be a direct-drive gas turbine engine comprising a first (or "low pressure") turbine having 5, 6 or 7 stages. Alternatively, the gas turbine engine may be a "geared" gas turbine engine comprising a first (or "low pressure") turbine having 3 or 4 stages.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32 or 0.29 to 0.30. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 140 cm, 170 cm, 180 cm, 190 cm, 200 cm, 210 cm, 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm. Purely by way of non-limitative example, the fan diameter may be in the range of from 170 cm to 180 cm, 190 cm to 200 cm, 200 cm to 210 cm, 210 cm to 230 cm, 290 cm to 300 cm or 340 cm to 360 cm.

The rotational speed of the fan may vary in use. Generally, the rotational speed is lower for fans with a higher diameter. Purely by way of non-limitative example, the rotational speed of the fan at cruise conditions may be less than 3500 rpm, for example less than 2500 rpm, for example less than 2300 rpm. Purely by way of further non-limitative example, the rotational speed of the fan at cruise conditions for an "geared" gas turbine engine having a fan diameter in the range of from 200 cm to 210 cm may be in the range of from 2750 to 2900 rpm. Purely by way of further non-limitative example, the rotational speed of the fan at cruise conditions for an "geared" gas turbine engine having a fan diameter in the range of from 210 cm to 230 cm may be in the range of from 2500 to 2800 rpm. Purely by way of further non-limitative example, the rotational speed of the fan at cruise conditions for an "geared" gas turbine engine having a fan diameter in the range of from 340 cm to 360 cm may be in the range of from 1500 to 1800 rpm. Purely by way of further non-limitative example, the rotational speed of the fan at cruise conditions for a direct drive engine having a fan diameter in the range of from 190 cm to 200 cm may be in the range of from 3600 to 3900 rpm. Purely by way of further non-limitative example, the rotational speed of the fan at cruise conditions for a direct drive engine having a fan diameter in the range of from 300 cm to 340 cm may be in the range of from 2000 to 2800 rpm.

In use of the gas turbine engine, the fan (with associated fan blades) rotates about a rotational axis. This rotation results in the tip of the fan blade moving with a velocity $U_{tip}$. The work done by the fan blades 23 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all values being dimensionless). The fan tip loading may be in an inclusive range bounded by any two of the values in the previous sentence (i.e. the values may form upper or lower bounds), for example in the range of from 0.28 to 0.31, or 0.29 to 0.3 (for example for a geared gas turbine engine).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 9, 9.5, 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of from 12 to 16, 13 to 15, or 13 to 14. Purely by way of non-limitative example, the bypass ratio of a direct-drive gas turbine engine according to the present disclosure may be in the range of from 9:1 to 11:1. Purely by way of further non-limitative example, the bypass ratio of a geared gas turbine engine according to the present disclosure may be in the range of from 12:1 to 15:1 The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure at the exit of the highest pressure compressor (before entry into the combustor) to the stagnation pressure upstream of the fan. By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70. Purely by way of non-limitative example, the overall pressure ratio at cruise conditions of a geared gas turbine engine having a fan diameter in the range of from 200 cm to 210 cm may be in the range of from 40 to 45. Purely by way of non-limitative example, the overall pressure ratio at cruise conditions of a geared gas turbine engine having a fan diameter in the range of from 210 cm to 230 cm may be in the range of from 45 to 55. Purely by way of non-limitative example, the overall pressure ratio at cruise conditions of a geared gas turbine engine having a fan diameter in the range of from 340 cm to 360 cm may be in the range of from 50 to 60.

Purely by way of non-limitative example, the overall pressure ratio at cruise conditions of a direct-drive gas turbine engine having a fan diameter in the range of from 300 cm to 340 cm may be in the range of from 50 to 60.

Specific thrust of an engine may be defined as the net thrust of the engine divided by the total mass flow through the engine. In some examples, specific thrust may depend, for a given thrust condition, upon the specific composition of fuel provided to the combustor. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines. Purely by way of non-limitative example, the specific thrust of a geared gas turbine engine having a fan diameter in the range of from 200 cm to 210 cm may be in the range of from 90 $Nkg^{-1}s$ to 95 $Nkg^{-1}s$. Purely by way of non-limitative example, the specific thrust of a geared gas turbine engine having a fan diameter in the range of from 210 cm to 230 cm may be in the range of from 80 $Nkg^{-1}s$ to 90 $Nkg^{-1}s$. Purely by way of non-limitative example, the specific thrust of a geared gas turbine engine having a fan diameter in the range of from 340 cm to 360 cm may be in the range of from 70 $Nkg^{-1}s$ to 90 $Nkg^{-1}s$. Purely by way of non-limitative example, the specific thrust of a direct drive gas turbine engine having a fan diameter in the range of from 300 cm to 340 cm may be in the range of from 90 $Nkg^{-1}s$ to 120 $Nkg^{-1}s$.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 100 kN, 110 kN, 120 kN, 130 kN, 140 kN, 150 kN, 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of non-limitative example, a gas turbine as described and/or claimed herein may be capable of producing a maximum thrust in the range of from 330 kN to 420 kN, for example 350 kN to 400 kN. Purely by way of non-limitative example, the maximum thrust of a geared gas turbine engine having a fan diameter in the range of from 200 cm to 210 cm may be in the range of from 140 kN to 160 kN. Purely by way of non-limitative example, the maximum thrust of a geared gas turbine engine having a fan diameter in the range of from 210 cm to 230 cm may be in the range of from 150 kN to 200 kN. Purely by way of non-limitative example, the maximum thrust of a geared gas turbine engine having a fan diameter in the range of from 340 cm to 360 cm may be in the range of from 370 kN to 500 kN. Purely by way of non-limitative example, the maximum thrust of a direct drive gas turbine engine having a fan diameter in the range of from 300 cm to 340 cm may be in the range of from 370 kN to 500 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. In some examples, TET may depend, for a given thrust condition, upon the specific composition of fuel provided to the combustor. At cruise, the TET may be at least (or on the order of) any of the following: 1400K, 1450K, 1500K, 1550K, 1600K or 1650K. Thus, purely by way of non-limitative example, the TET at cruise of a geared gas turbine engine having a fan diameter in the range of from 200 cm to 210 cm may be in the range of from 1540K to 1600K. Purely by way of non-limitative example, the TET at cruise of a geared gas turbine engine having a fan diameter in the range of from 210 cm to 230 cm may be in the range of from 1590K to 1650K. Purely by way of non-limitative example, the TET at cruise of a geared gas turbine engine having a fan diameter in the range of from 340 cm to 360 cm may be in the range of from 1600K to 1660K. Purely by way of non-limitative example, the TET at cruise of a direct drive gas turbine engine having a fan diameter in the range of from 300 cm to 340 cm may be in the range of from 1590K to 1650K. Purely by way of non-limitative example, the TET at cruise of a direct drive gas turbine engine having a fan diameter in the range of from 300 cm to 340 cm may be in the range of from 1570K to 1630K.

The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K, 2000K, 2050K, or 2100K. Thus, purely by way of non-limitative example, the maximum TET of a geared gas turbine engine having a fan diameter in the range of from 200 cm to 210 cm may be in the range of from 1890K to 1960K. Purely by way of non-limitative example, the maximum TET of a geared gas turbine engine having a fan diameter in the range of from 210 cm to 230 cm may be in the range of from 1890K to 1960K. Purely by way of non-limitative example, the maximum TET of a geared gas turbine engine having a fan diameter in the range of from 340 cm to 360 cm may be in the range of from 1890K to 1960K. Purely by way of non-limitative example, the maximum TET of a direct drive gas turbine engine having a fan diameter in the range of from 300 cm to 340 cm may be in the range of from 1935K to 1995K. Purely by way of non-limitative example, the maximum TET of a direct drive gas turbine engine having a fan diameter in the range of from 300 cm to 340 cm may be in the range of from 1890K to 1950K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre composite. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades. Where the fan blades have a carbon fibre composite body, there may be 16 or 18 fan blades. Where the fan blades have a metallic body (for example aluminium-lithium or titanium-alloy), there may be 18, 20 or 22 fan blades.

As used herein, the terms idle, taxi, take-off, climb, cruise, descent, approach, and landing have the conventional meaning and would be readily understood by the skilled person. Thus, for a given gas turbine engine for an aircraft, the skilled person would immediately recognise each term to refer to an operating phase of the engine within a given mission of an aircraft to which the gas turbine engine is designed to be attached.

In this regard, ground idle may refer to an operating phase of the engine where the aircraft is stationary and in contact with the ground, but where there is a requirement for the engine to be running. During idle, the engine may be producing between 3% and 9% of the available thrust of the engine. In further non-limitative examples, the engine may be producing between 5% and 8% of available thrust. In further non-limitative examples, the engine may be producing between 6% and 7% of available thrust. Taxi may refer to an operating phase of the engine where the aircraft is being propelled along the ground by the thrust produced by the engine. During taxi, the engine may be producing between 5% and 15% of available thrust. In further non-limitative examples, the engine may be producing between 6% and 12% of available thrust. In further non-limitative examples, the engine may be producing between 7% and 10% of available thrust. Take-off may refer to an operating phase of the engine where the aircraft is being propelled by the thrust produced by the engine. At an initial stage within the take-off phase, the aircraft may be propelled whilst the aircraft is in contact with the ground. At a later stage within the take-off phase, the aircraft may be propelled whilst the aircraft is not in contact with the ground. During take-off, the engine may be producing between 90% and 100% of available thrust. In further non-limitative examples, the engine may be producing between 95% and 100% of available thrust. In further non-limitative examples, the engine may be producing 100% of available thrust.

Climb may refer to an operating phase of the engine where the aircraft is being propelled by the thrust produced by the engine. During climb, the engine may be producing between 75% and 100% of available thrust. In further non-limitative examples, the engine may be producing between 80% and 95% of available thrust. In further non-limitative examples, the engine may be producing between 85% and 90% of available thrust. In this regard, climb may refer to an operating phase within an aircraft flight cycle between take-off and the arrival at cruise conditions. Additionally or alternatively, climb may refer to a nominal point in an aircraft flight cycle between take-off and landing, where a relative increase in altitude is required, which may require an additional thrust demand of the engine.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

Furthermore, the skilled person would immediately recognise either or both of descent and approach to refer to an operating phase within an aircraft flight cycle between cruise and landing of the aircraft. During either or both of descent and approach, the engine may be producing between 20% and 50% of available thrust. In further non-limitative examples, the engine may be producing between 25% and 40% of available thrust. In further non-limitative examples, the engine may be producing between 30% and 35% of available thrust. Additionally or alternatively, descent may refer to a nominal point in an aircraft flight cycle between take-off and landing, where a relative decrease in altitude is required, and which may require a reduced thrust demand of the engine.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at any suitable condition, which may be as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at any suitable condition, for example the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Figure 1:
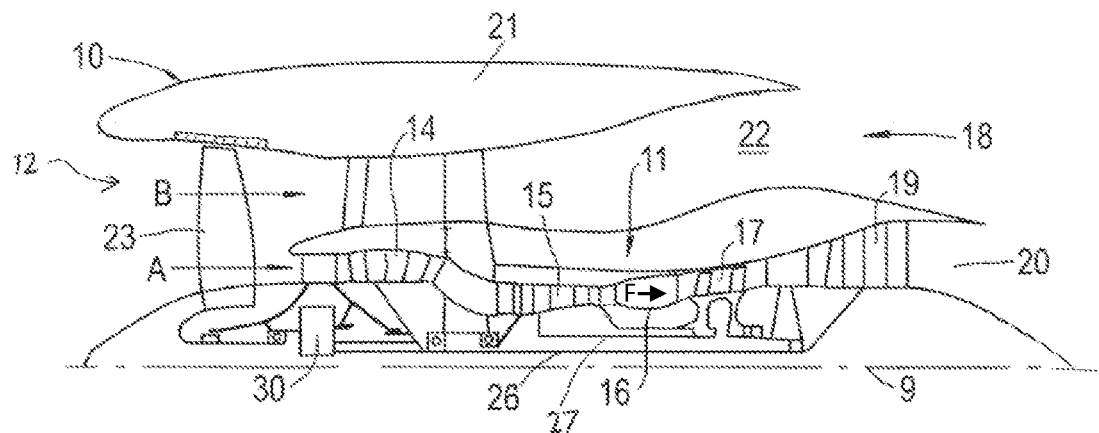
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel F and the mixture is combusted. The combustion equipment 16 may be referred to as the combustor 16, with the terms "combustion equipment 16" and "combustor 16" used interchangeably herein. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
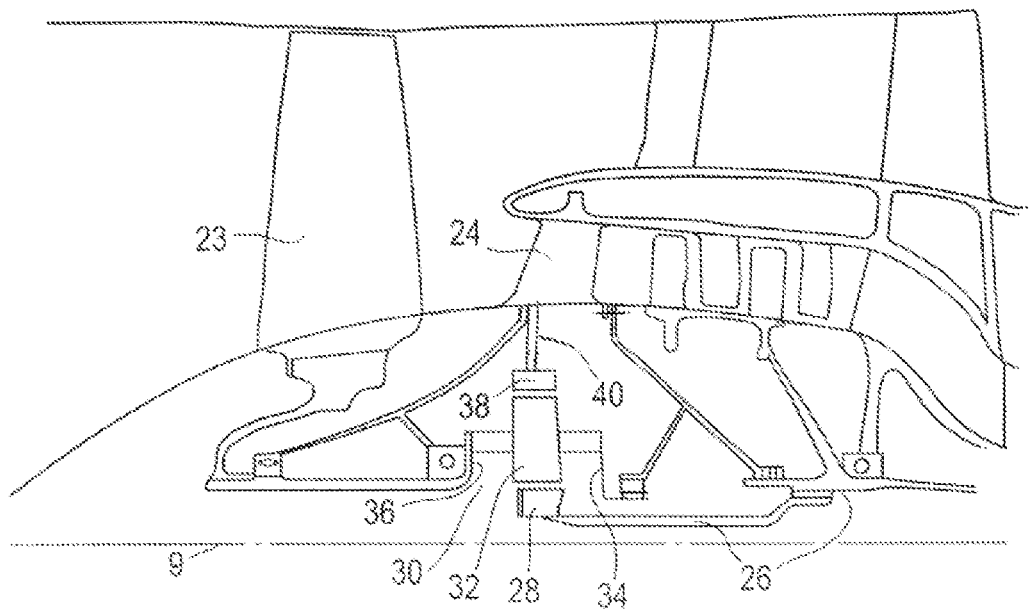
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to process around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
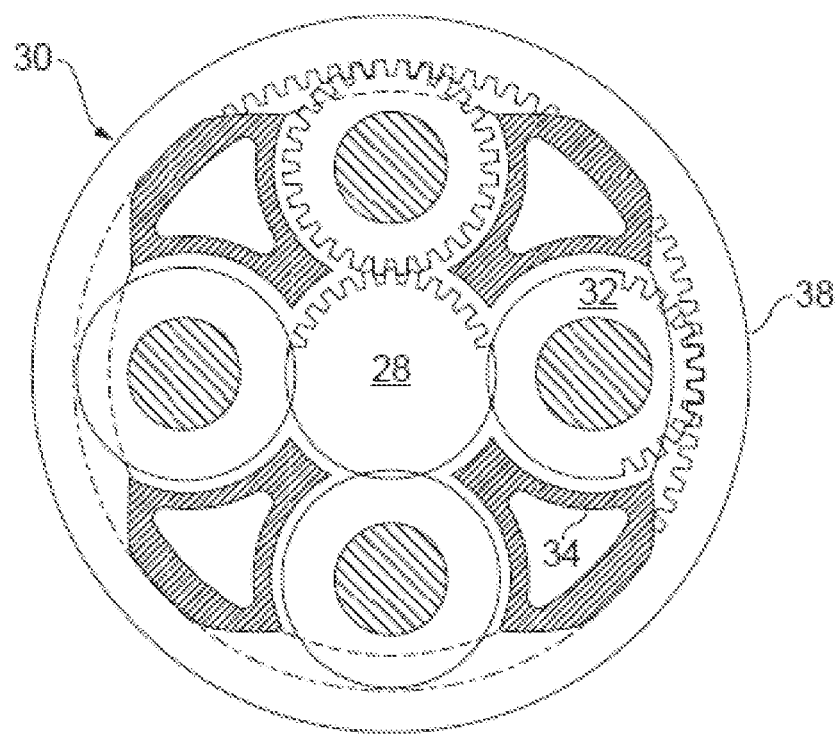
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area.

Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

The fuel F provided to the combustion equipment 16 may comprise a fossil-based hydrocarbon fuel, such as Kerosene.

Thus, the fuel F may comprise molecules from one or more of the chemical families of n-alkanes, iso-alkanes, cycloalkanes, and aromatics. Additionally or alternatively, the fuel F may comprise renewable hydrocarbons produced from biological or non-biological resources, otherwise known as sustainable aviation fuel (SAF). In each of the provided examples, the fuel F may comprise one or more trace elements including, for example, sulphur, nitrogen, oxygen, inorganics, and metals.

Functional performance of a given composition, or blend of fuel for use in a given mission, may be defined, at least in part, by the ability of the fuel to service the Brayton cycle of the gas turbine engine 10. Parameters defining functional performance may include, for example, specific energy; energy density; thermal stability; and, emissions including particulate matter. A relatively higher specific energy (i.e. energy per unit mass), expressed as MJ/kg, may at least partially reduce take-off weight, thus potentially providing a relative improvement in fuel efficiency. A relatively higher energy density (i.e. energy per unit volume), expressed as MJ/L, may at least partially reduce take-off fuel volume, which may be particularly important for volume-limited missions or military operations involving refuelling. A relatively higher thermal stability (i.e. inhibition of fuel to degrade or coke under thermal stress) may permit the fuel to sustain elevated temperatures in the engine and fuel injectors, thus potentially providing relative improvements in combustion efficiency. Reduced emissions, including particulate matter, may permit reduced contrail formation, whilst reducing the environmental impact of a given mission. Other properties of the fuel may also be key to functional performance. For example, a relatively lower freeze point (° C.) may allow long-range missions to optimise flight profiles; minimum aromatic concentrations (%) may ensure sufficient swelling of certain materials used in the construction of o-rings and seals that have been previously exposed to fuels with high aromatic contents; and, a maximum surface tension (mN/m) may ensure sufficient spray break-up and atomisation of the fuel.

The ratio of the number of hydrogen atoms to the number of carbon atoms in a molecule may influence the specific energy of a given composition, or blend of fuel. Fuels with higher ratios of hydrogen atoms to carbon atoms may have higher specific energies in the absence of bond strain. For example, fossil-based hydrocarbon fuels may comprise molecules with approximately 7 to 18 carbons, with a significant portion of a given composition stemming from molecules with 9 to 15 carbons, with an average of 12 carbons.

A number of sustainable aviation fuel blends have been approved for use, comprising between 10% and 50% sustainable aviation fuel (the remainder comprising one or more fossil-based hydrocarbon fuels, such as Kerosene), with further compositions awaiting approval. However, there is an anticipation in the aviation industry that sustainable aviation fuel blends comprising up to (and including) 100% sustainable aviation fuel (SAF) will be eventually approved for use.

Sustainable aviation fuels may comprise one or more of n-alkanes, iso-alkanes, cyclo-alkanes, and aromatics, and may be produced, for example, from one or more of synthesis gas (syngas); lipids (e.g. fats, oils, and greases); sugars; and alcohols. Thus, sustainable aviation fuels may comprise either or both of a lower aromatic and sulphur content, relative to fossil-based hydrocarbon fuels. Additionally or alternatively, sustainable aviation fuels may comprise either or both of a higher iso-alkane and cyclo-alkane content, relative to fossil-based hydrocarbon fuels. Thus, in some examples, sustainable aviation fuels may comprise either or both of a density of between 90% and 98% that of kerosene and a calorific value of between 101% and 105% that of kerosene.

Owing at least in part to the molecular structure of sustainable aviation fuels, sustainable aviation fuels may provide benefits including, for example, one or more of a higher specific energy (despite, in some examples, a lower energy density); higher specific heat capacity; higher thermal stability; higher lubricity; lower viscosity; lower surface tension; lower freeze point; lower soot emissions; and, lower $CO_2$ emissions, relative to fossil-based hydrocarbon fuels (e.g. when combusted in the combustion equipment 16). Accordingly, relative to fossil-based hydrocarbon fuels, such as Kerosene, sustainable aviation fuels may lead to either or both of a relative decrease in specific fuel consumption, and a relative decrease in maintenance costs.

Figure 4:
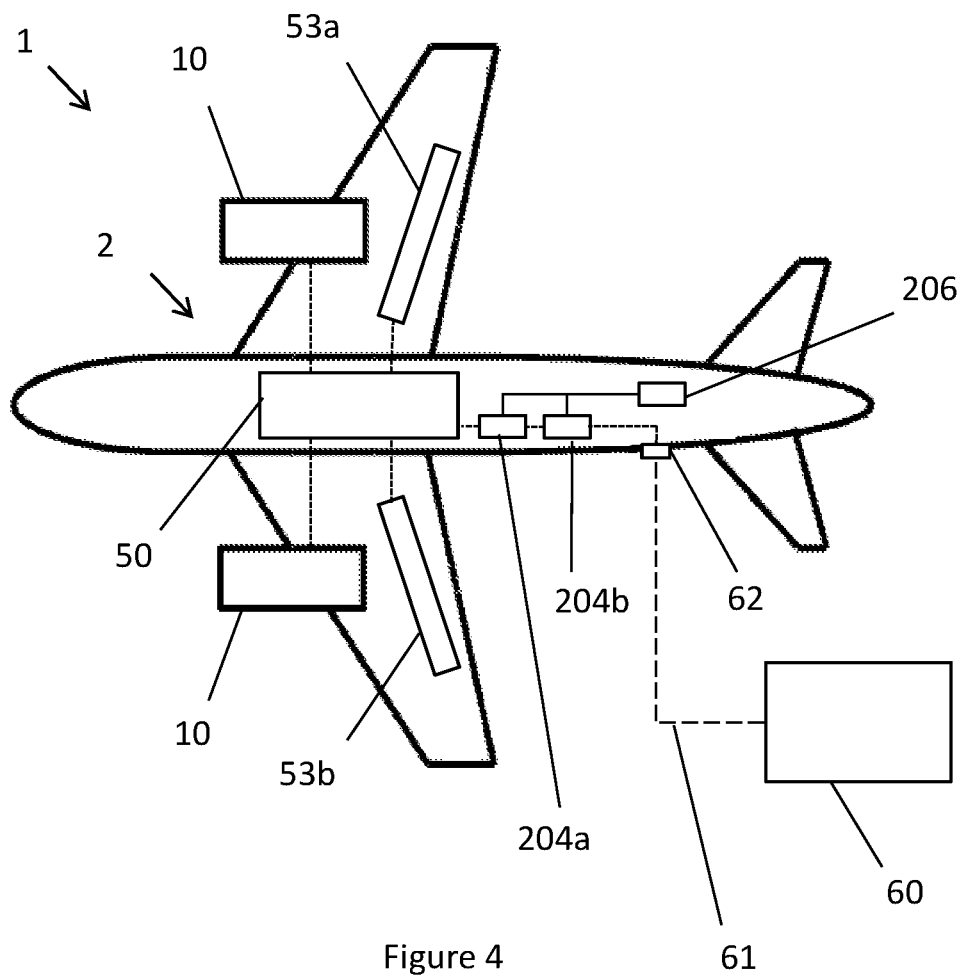
FIG. 4 is a schematic view of an aircraft including a refuelling manager.
Figure 6:
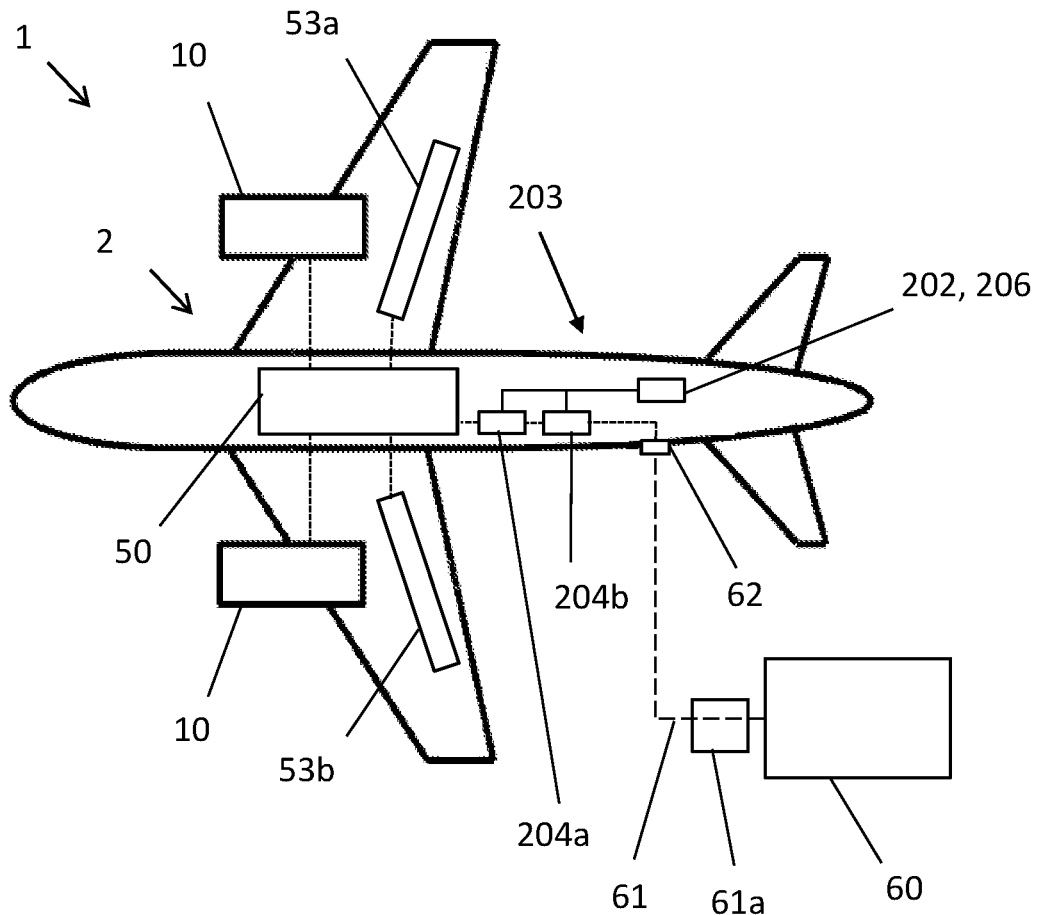
FIG. 6 is a schematic view of an aircraft including a fuel tracking system.
Figure 10:
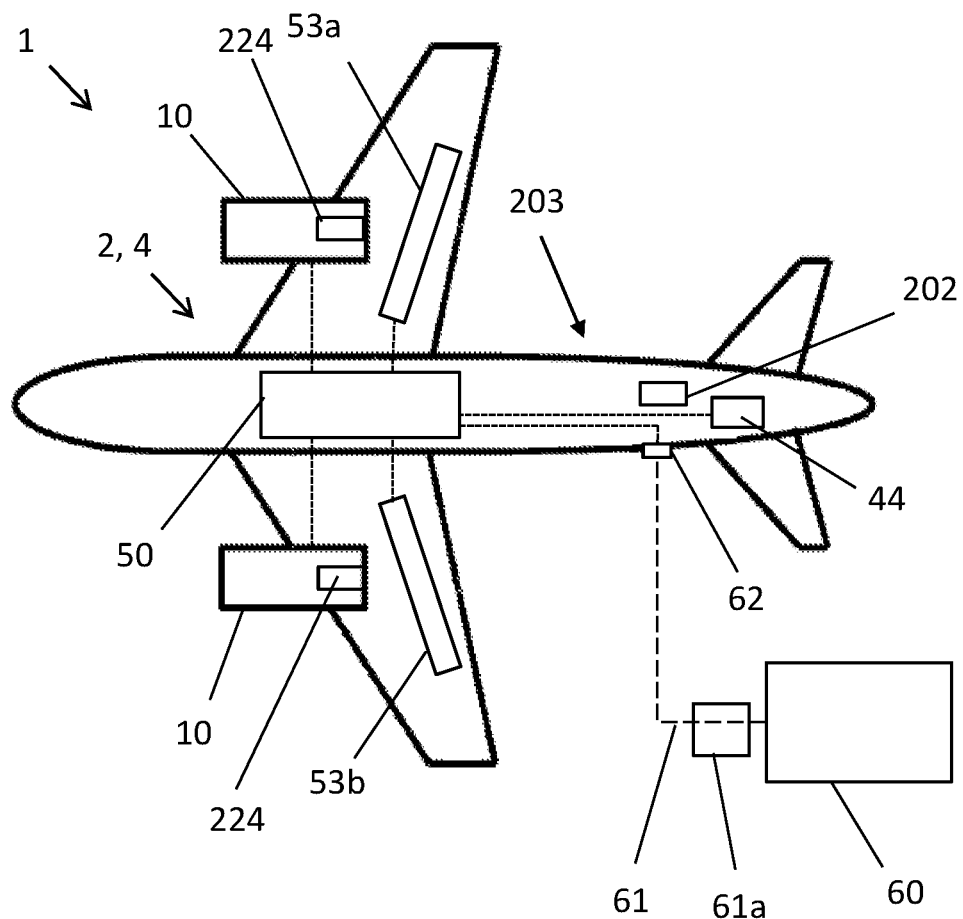
FIG. 10 is a schematic view of an aircraft including a fuel tracking system.

As depicted in FIGS. 4, 6 and 10, an aircraft 1 may comprise multiple fuel tanks 50, 53; for example a larger, primary fuel tank 50 located in the aircraft fuselage, and a smaller fuel tank 53a, 53b located in each wing. In other examples, an aircraft 1 may have only a single fuel tank 50, and/or the wing fuel tanks 53 may be larger than the central fuel tank 50, or no central fuel tank may be provided (with all fuel instead being stored in the aircraft's wings)—it will be appreciated that many different tank layouts are envisaged and that the examples pictured are provided for ease of description and not intended to be limiting.

FIG. 4, FIG. 6, and FIG. 10 show an aircraft 1 with a propulsion system 2 comprising two gas turbine engines 10. The gas turbine engines 10 are supplied with fuel from a fuel supply system on board the aircraft 1. The fuel supply system of the examples pictured comprises a single fuel source. For the purposes of the present application the term "fuel source" is understood to mean either 1) a single fuel tank, or 2) a plurality of fuel tanks which are fluidly interconnected. Each of the fuel sources is arranged to provide a separate source of fuel i.e. the first fuel source may contain a first fuel having a different fuel characteristic, or multiple different fuel characteristics, from a second fuel contained in the second fuel source. First and second fuel sources are therefore not fluidly coupled to each other so as to separate the different fuels (at least under normal running conditions).

As used herein, the term "fuel characteristics" refers to intrinsic or inherent fuel properties such as fuel composition, not variable properties such as volume or temperature. Examples of fuel characteristics include one or more of:

i. the percentage of sustainable aviation fuel (SAF) in the fuel, or an indication that the fuel is a fossil fuel, for example fossil kerosene, or a pure SAF;

ii. parameters of a hydrocarbon distribution of the fuel, such as:

the aromatic hydrocarbon content of the fuel, and optionally also/alternatively the multi-aromatic hydrocarbon content of the fuel;

the hydrogen to carbon ratio (H/C) of the fuel;

% composition information for some or all hydrocarbons present;

iii. the presence or percentage of a particular element or species, such as:

the percentage of nitrogen-containing species in the fuel;

the presence or percentage of a tracer species or trace element in the fuel (e.g. a trace substance inherently present in the fuel which may vary between fuels and so be used to identify a fuel, and/or a substance added deliberately to act as a tracer);
naphthalene content of the fuel;
sulphur content of the fuel;
cycloparaff in content of the fuel;
oxygen content of the fuel;
iv. one or more properties of the fuel in use in a gas turbine engine 10, such as:
level of non-volatile particulate matter (nvPM) emissions or $CO_2$ emissions on combustion (a value may be provided for a specific combustor operating under particular conditions to compare fuels fairly—a measured value may be adjusted accordingly based on combustor properties and conditions);
level of coking of the fuel;
v. one or more properties of the fuel itself, independent of use in an engine or combustion, such as:
thermal stability of the fuel (e.g. thermal breakdown temperature); and
one or more physical properties such as density, viscosity, calorific value, freeze temperature, and/or heat capacity.

In the present example, the first fuel source comprises a centre fuel tank 50, located primarily in the fuselage of the aircraft 1 and a plurality of wing fuel tanks 53a, 53b, where at least one wing fuel tank is located in the port wing and at least one wing fuel tank is located in the starboard wing for balancing. All of the tanks 50, 53 are fluidly interconnected in the example shown, so forming a single fuel source. Each of the centre fuel tank 50 and the wing fuel tanks 53 may comprise a plurality of fluidly interconnected fuel tanks.

In another example, the wing fuel tanks 53a, 53b may not be fluidly connected to the central tank 50, so forming a separate, second fuel source. For balancing purposes, one or more fuel tanks in the port wing may be fluidly connected to one or more fuel tanks in the starboard wing. This may be done either via a/the centre fuel tank 50 (if that tank does not form part of a different fuel source), or bypassing the centre fuel tank(s), or both (for maximum flexibility and safety).

In another example, the first fuel source comprises wing fuel tanks 53 and a centre fuel tank 50, while a second fuel source comprises a further separate centre fuel tank. Fluid interconnection between wing fuel tanks 53 and the centre fuel tank 50 of the first fuel source may be provided for balancing of the aircraft 1.

In some examples, the allocation of fuel tanks 50, 53 available on the aircraft 1 may be constrained such that a first fuel source and a second fuel source are each substantially symmetrical with respect to the aircraft centre line. In cases where an asymmetric fuel tank allocation is permitted, a suitable means of fuel transfer may be provided between fuel tanks of the first fuel source and/or between fuel tanks of the second fuel source such that the position of the aircraft's centre of mass can be maintained within acceptable lateral limits throughout the flight.

An aircraft 1 may be refuelled by connecting a fuel storage vessel 60, such as that provided by an airport fuel truck, or a permanent pipeline, to a fuel line connection port 62 of the aircraft, via a fuel line 61. A desired amount of fuel may be transferred from the fuel storage vessel 60 to the one or more tanks 50, 53 of the aircraft 1. Especially in examples with more than one fuel source, in which different tanks 50, 53 are to be filled with different fuels, multiple fuel line connection ports 62 may be provided instead of one, and/or valves may be used to direct fuel appropriately.

Aircraft 1 generally refuel at multiple different airports, for example at the beginning and end of a long-distance flight. Whilst there are standards with which all aviation fuels must be compliant, different aviation fuels have different compositions, for example depending on their source (e.g. different petroleum sources, biofuels or other synthetic aviation fuels (often described as sustainable aviation fuels—SAFs), and/or mixtures of petroleum-based fuels, and other fuels) and on any additives included (e.g. such as antioxidants and metal deactivators, biocides, static reducers, icing inhibitors, corrosion inhibitors) and any impurities. As well as varying between airports and fuel suppliers, even for a given airport or fuel supplier, fuel composition of the available aviation fuel may vary between batches. Further, fuel tanks 50, 53 of aircraft 1 are usually not emptied before being topped up for a subsequent flight, resulting in mixtures of different fuels within the tanks—effectively a fuel with a different composition resulting from the mixture. Different fuels may have different calorific values and/or different densities, among other fuel characteristics.

As used herein, the term "calorific value" denotes the lower heating value (also known as net calorific value) of the fuel, unless otherwise specified. The net calorific value is defined as the amount of heat released by combusting a specified quantity of the fuel, assuming that the latent heat of vaporisation of water in the reaction products is not recovered (i.e. that produced water remains as water vapour after combustion).

Calorific values (also referred to as heating values) of fuels may be directly determined—for example by measuring the energy released when a certain volume or mass of the fuel is combusted in the gas turbine engine 10—or calculated from other fuel parameters; e.g. looking at the hydrocarbon distribution of the fuel and the calorific value of each constituent hydrocarbon type. Alternatively, or additionally so as to provide verification, the calorific value may be determined using external data, such as a look-up table for a tracer substance in the fuel, or data encoded in a barcode associated with the fuel, or other stored data.

The determination may therefore be performed in many different ways. For example:
a barcode of a fuel to be added to a fuel tank 50, 53 of the aircraft 1 may be scanned to read data of the fuel, or a tracer substance (e.g. a dye) identified and fuel properties looked up based on that tracer;
data may be manually entered, or transmitted to the aircraft 1;
a fuel sample may be extracted for ground-side analysis prior to take-off;
fuel properties may be inferred from measurements of the propulsion system 2 activity during one or more periods of aircraft operation, e.g. engine warm-up, taxi, take-off, climb and/or cruise; and/or
one or more fuel properties may be detected onboard, optionally in-flight, for example using in-line sensors and/or other measurements.

The calorific value of the fuel may therefore be looked up, physically determined from the results of combustion (either on-wing or off-wing), chemically determined from detected chemical properties, calculated/inferred from other detected fuel properties (either on-wing or off-wing), or otherwise determined or obtained.

In some examples, combinations of these techniques may be used to determine and/or verify one or more fuel characteristics, including calorific value.

Fuel characteristics may be detected in various ways, both direct (e.g. from sensor data corresponding to the fuel characteristic in question) and indirect (e.g. by inference or calculation from other characteristics or measurements). The characteristics may be determined as relative values as compared to another fuel, or as absolute values. For example, one or more of the following detection methods may be used:

The aromatic or cycloparaffin content of the fuel may be determined based on measurements of the swell of a sensor component made from a seal material such as a nitrile seal material.

Trace substances or species, either present naturally in the fuel or added to act as a tracer, may be used to determine fuel characteristics such as the percentage of sustainable aviation fuel in the fuel or whether the fuel is kerosene.

Measurements of the vibrational mode of a piezoelectric crystal exposed to the fuel may be used as the basis for the determination of various fuel characteristics including the aromatic content of the fuel, the oxygen content of the fuel, and the thermal stability or the coking level of the fuel—for example by measuring the build-up of surface deposits on the piezoelectric crystal which will result in a change in vibrational mode.

Various fuel characteristics may be determined by collecting performance parameters of the gas turbine engine 10 during a first period of operation (such as during take-off) and then during a second period of operation (e.g. during cruise) comparing these collected parameters to expected values if using fuel of known properties.

Various fuel characteristics including the aromatic hydrocarbon content of the fuel may be determined based on sensor measurements of the presence, absence, or degree of formation of a contrail by the gas turbine 10 during its operation.

Fuel characteristics including the aromatic hydrocarbon content may be determined based on a UV-Vis spectroscopy measurement performed on the fuel.

Various fuel characteristics including the sulphur content, naphthalene content, aromatic hydrogen content and hydrogen to carbon ratio may be determined by measurement of substances present in the exhaust gases emitted by the gas turbine engine 10 during its use.

Calorific value of the fuel may be determined in operation of the aircraft 1 based on measurements taken as the fuel is being burned—for example using fuel flow rate and shaft speed or change in temperature across the combustor 16.

Various fuel characteristics may be determined by making an operational change arranged to affect operation of the gas turbine engine 10, sensing a response to the operational change; and determining the one or more fuel characteristics of the fuel based on the response to the operational change.

Various fuel characteristics may be determined in relation to fuel characteristics of a first fuel by changing a fuel supplied to the gas turbine engine 10 from the first fuel to a second fuel, and determining the one or more fuel characteristics of the second fuel based on a change in a relationship between T30 and one of T40 and T41 (the relationship being indicative of the temperature rise across the combustor 16). The characteristics may be determined as relative values as compared to the first fuel, or as absolute values by reference to known values for the first fuel.

As used herein and discussed below, T30, T40 and T41, and any other numbered pressures and temperatures, are defined using the station numbering listed in standard SAE AS755, in particular:

T30=High Pressure Compressor (HPC) Outlet Temperature;
T40=Combustion Exit Temperature; and
T41=High Pressure Turbine (HPT) Rotor Entry Temperature.

In some examples, the obtaining the calorific value of the fuel available to the aircraft 1 and/or of the fuel already onboard the aircraft 1 prior to refuelling may comprise chemically and/or physically determining the calorific value of the available fuel. Equivalent determinations may be performed for the fuel(s) to be used for refuelling—either using ground-based testing (e.g. prior to refuelling) or onboard testing (e.g. using one or more sensors 204 on a fuel supply line within the aircraft 1, leading to a tank 50, 53). Optionally, that determination may be or comprise performing one or more of:

(i) identifying a tracer in the available fuel, such as a dye or a marker trace element, and looking up a calorific value corresponding to that tracer;

(ii) inferring the calorific value from one or more detected physical and/or chemical properties of the available fuel, for example using a ground-based testing-unit to analyse a fuel sample; and/or (iii) combusting a sample of the available fuel to determine its calorific value directly, optionally using the gas turbine engine 10.

The step of chemically and/or physically determining the calorific value of the available fuel may therefore be performed on the aircraft 1 in some examples.

The inventors appreciated that, as different fuels can have different properties whilst still conforming to the standards, knowledge of the fuel(s) available to an aircraft 1 can allow more efficient, tailored, control of the propulsion system 2. For example, changing to a fuel with a higher calorific value may allow a smaller amount (mass and/or volume) of fuel to supply an aircraft's energy needs for a flight. As more power is needed to lift a greater mass of fuel, taking sufficient fuel for the intended flight (including a safety margin above the expected energy demand), but not completely filling the tank(s) 50, 53, may provide an efficiency bonus by reducing take-off weight of the aircraft 1. Knowledge of the calorific value of the fuel can therefore be used as a tool to improve aircraft performance, e.g. avoiding carrying excess fuel weight.

In the example shown in FIG. 4, two sensors 204a, 204b are provided, each arranged to physically and/or chemically detect one or more features of the composition of the fuel being added to the fuel tank 50, 53 on refuelling. One or more of these fuel characteristics may be used to infer or calculate calorific value. The sensors may be described as part of a refuelling management system 204, 206.

In alternative examples, no such sensors 204 may be provided (for example, a barcode associated with the fuel storage vessel 60 may be read and the corresponding data on the fuel provided to the refuelling manager 206 rather than sensing fuel properties), or more or fewer, and/or differently-located, sensors may be provided.

Figure 5:
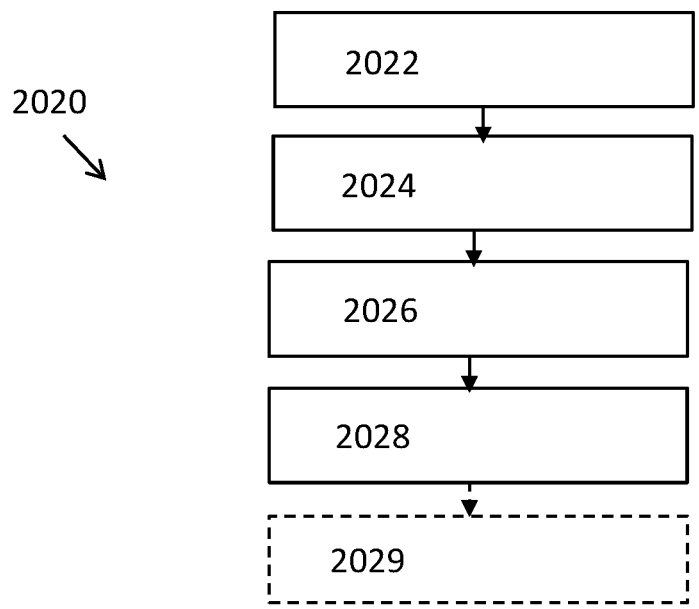
FIG. 5 is a schematic representation of a refuelling management method.

In the examples described herein with respect to FIGS. 4 and 5, prior to refuelling an aircraft 1, an amount of energy required for an intended flight profile of that aircraft is determined. As used herein, the "amount of energy required for an intended flight profile" generally includes a safety margin above a calculated amount of fuel needed for the aircraft 1, with its expected take-off weight, to complete the intended flight. The safety margin may comprise an allowance for possible diversion to an alternative destination airport, e.g. in case of weather conditions preventing a safe landing at the intended destination airport.

As used herein, the term "flight profile" refers to the operational characteristics (e.g. height/altitude, power setting, flight path angle, airspeed, and the like) of an aircraft 1 as it flies along a flight track, and also to the trajectory/flight track (route) itself. In determining the amount of energy required to complete an intended flight profile, external conditions may also be considered (e.g. weather, as a prevailing headwind can increase the energy required, for example). Additionally or alternatively, the size of the safety margin may be selected to cover variation in external conditions.

When an aircraft 1 is about to be refuelled, in various examples, a calorific value of the fuel available to the aircraft 1 (i.e. the fuel with which the aircraft is to be refuelled) is obtained, optionally using any of the off-wing methods described above. The total specific energy of the fuel available (either per unit mass or per unit volume) can therefore be established. An amount of fuel required to meet the energy requirements of the flight profile may then be determined. In some cases, an on-wing determination method could be used (e.g. combusting a sample or use of onboard sensors). On-wing determination may lead to a need to pause and re-start refuelling whilst the desired amount of fuel is calculated.

In many cases, the tank(s) 50, 53 of the aircraft 1 are not completely empty when the aircraft 1 is to be refuelled. In such cases, the calorific value of fuel already onboard the aircraft 1 is also obtained, optionally by retrieving characteristics of the fuel (e.g. calorific value, or other properties from which calorific value can be calculated) from storage, and/or by combusting a sample of the fuel (e.g. during taxiing) and measuring the calorific value directly. From a known amount of remaining fuel (mass, volume, or % full of the tank(s) 50, 53) and the known calorific value, the total energy available from the onboard fuel can be determined.

The total energy available from the onboard fuel can therefore be subtracted from the determined amount of energy required for the intended flight profile to determine an amount of energy needed to be added to the aircraft 1 on refuelling. Using the specific energy (or volumetric energy density) of the fuel available, a desired amount (i.e. mass or volume) of the fuel available to the aircraft 1 can therefore be calculated.

In some examples, an aircraft 1 may have multiple tanks 50, 53 which contain different fuels, optionally with different calorific values. Total fuel energy content for onboard fuel may therefore be summed across the different tanks 50, 53. Similarly, if an aircraft 1 is to be refuelled with multiple different fuels, the determined amount of energy required can be split between the different fuels as desired, and a mass or volume of each fuel to be added can be calculated.

The aircraft 1 can then be refuelled with the calculated amount (mass or volume) of the available fuel.

In some examples (especially examples in which data look-up has been used to determine one or more calorific values), after refuelling a check is then performed to verify the calorific value of the fuel. The check may comprise measuring the calorific value of the fuel in use in the gas turbine engine 10, optionally during warm-up of the engine prior to taxiing, or during taxiing of the aircraft 1 prior to take-off. Ideally, the fuel characteristics may be determined (and any checks of, or based on, the determined characteristics performed) before the aircraft 1 leaves the ground, in case the fuel is not as expected.

The method 2020 performed in these examples is illustrated in FIG. 5.

At step 2022, an amount of energy required for an intended flight profile, including a safety margin, is obtained. In this context, the amount of energy being "obtained" means that a numerical value or measure for the amount of energy required is in some way made available for use in the present method 2020—whether this is by calculation or other determination (e.g. from a look-up table), by communication with another system, by input from a user (e.g. at a graphical user interface), by retrieval from memory, or in any other suitable way. For example, the refuelling manager 206 may receive a message including a value indicative of the energy requirement, or may calculate such a value based on knowledge of the intended flight profile and of the aircraft 1 and aircraft load.

At step 2024, a calorific value of fuel available to the aircraft 1 is obtained. In this context, the calorific value being "obtained" again means that a numerical value or measure of the calorific value is in some way made available for use in the present method 2020. The value may be obtained in any suitable way, for example being manually entered, e.g. via a graphical user interface in communication with the refuelling manager 206, electronically communicated to the refuelling manager 206, e.g. by wired or wireless communication from a barcode scanner following reading of a barcode, and/or determined from sensor data. The value may be stored for future use, optionally in memory of, or in communication with, the refuelling manager 206.

The steps of obtaining 2022 the required amount of energy and obtaining 2024 a calorific value of the fuel available for refuelling purposes may be performed in either order, or simultaneously.

It will be appreciated that, if the tank 50, 53 is not empty prior to refuelling, the energy content of fuel already onboard may also be obtained—e.g. by retrieving a previously-stored calorific value for that fuel, and calculating the energy content of the remaining fuel by reference to that and the amount of fuel remaining in the tank(s) 50, 53, or by calculation from sensor data.

At step 2026, an amount of the available fuel needed to provide the required energy is calculated, based on the obtained values. The calculated amount may be a volume and/or a mass of fuel—refuelling may be performed volumetrically or gravimetrically. The calculation may be performed by the refuelling manager 206 itself in some examples. In examples in which there is remaining fuel onboard, the energy of that fuel may be subtracted from the energy required for the intended flight profile before calculation of the amount of the available fuel needed.

At step 2028 the calculated amount (mass or volume) of the available fuel needed is output so as to allow the aircraft 1 to be refuelled accordingly. For example, a refuelling manager 206 may display the amount at a graphical user interface, may transmit the amount to another system for the attention of a refuelling technician, or may provide the value to an automated system so as to cause that system to automatically terminate the refuelling process, or trigger an alert, once the calculated amount of fuel has been provided.

Updated values for the calorific value of the fuel in the fuel tank 50, 53 after refuelling may be calculated and stored for future use, optionally by the refuelling manager 206. In examples in which an aircraft 1 has multiple fuel tanks 50, 53 which are fluidly linked such that the fuels in the tanks 50, 53 are equivalent, a single calorific value for the fuel may be stored and updated. In examples in which an aircraft 1 has multiple fuel tanks 50, 53 which are not fluidly linked, such that there may be differences between fuels in the different tanks 50, 53, a separate calorific value may be stored and updated for each tank 50, 53.

The method 2020 may then be iterated on each refuelling event.

The method 2020 may further comprise controlling 2029 an automated refuelling system to refuel the aircraft 1 in line with the calculated amount of fuel. Alternatively, the refuelling may be performed and/or terminated manually, e.g. by a person reading the output calculated amount (mass or volume) of the available fuel needed, optionally from a display associated with the aircraft's fuel line connection port 62.

In some examples, refuelling may be started before one or more of the preceding method steps 2022-2028 are performed, those steps may be performed during refuelling, and the refuelling process may then be terminated when the calculated amount of fuel has been added.

In some examples, especially in implementations in which a calorific value of fuel is manually input at step 2024, a check may then be performed to verify the input data. The check may comprise measuring the calorific value of the fuel in use in the gas turbine engine 10, optionally during taxiing of the aircraft 1 prior to take-off. The determining the calorific value of the fuel may be performed by monitoring engine parameters during a first time period of aircraft operation during which the gas turbine engine 10 uses the fuel; and determining the calorific value of the fuel based on the monitored engine parameters (e.g. rate of fuel combustion, fuel flow rate, temperatures, pressures, generated thrust, shaft speed, etc.). In case of a significant mis-match in the entered and determined values, the aircraft 1 may return to the terminal for further investigation, as a safety measure.

A propulsion system 2 for an aircraft 1 may therefore comprise a refuelling manager 206 arranged to:
  obtain 2022 an amount of energy required for an intended flight profile, optionally including a safety margin;
  obtain 2024 a calorific value of fuel available to the aircraft;
  calculate 2026 the amount (mass or volume) of the available fuel needed to provide the required energy; and
  output 2028 the amount (mass or volume) of the available fuel needed so as to allow the aircraft 1 to be refuelled accordingly.

In some implementations, a refuelling manager may be provided separately; not onboard the aircraft 1. Optionally, a refuelling manager may be provided as part of a ground-based refuelling station.

If the flight profile does not include a safety margin, or if any reasons to extend a safety margin are found (e.g. forecast adverse weather or abnormally high load), a (further) safety margin may be added at the calculation stage.

The refuelling manager 206 may additionally be arranged to control 2029 an automated refuelling system such that it refuels the aircraft 1 in line with the calculated amount of fuel (e.g. adding the calculated amount of fuel only, within tolerances).

The refuelling manager 206 may be provided as a separate refuelling management unit built into the propulsion system 2, and/or as software and/or hardware incorporated into the pre-existing aircraft control systems (e.g. as part of an Engine Electronic Controller (EEC) 42). In some examples, the refuelling manager 206 may store calorific value data for any fuel currently in the aircraft's tank(s) 50, 53, and may cause those data to be updated following refuelling. The data may be stored separately from circuitry performing the calculations and retrieved when required—wherever the data are stored, that storage can be thought of as a part of the refuelling manager 206, whether or not it is integral or physically connected in any way.

In examples in which a calorific value is looked up or read (e.g. from scanning a barcode), this value may be automatically transferred to the refuelling manager 206, or may be typed into a user interface of, or associated with, the refuelling manager 206, e.g. by a pilot or technician.

In some implementations, a non-transitory computer readable medium having stored thereon instructions to cause the method 2020 described above may be provided, for use on-wing or off-wing. The instructions may cause the processor to:
  obtain 2022 an amount of energy required for an intended flight profile of an aircraft 1;
  obtain 2024 a calorific value of fuel available to the aircraft;
  calculate 2026 the amount of the available fuel needed to provide the required energy; and
  output 2028 the mass or volume of the available fuel needed so as to allow the aircraft to be refuelled accordingly.

In implementations with automated refuelling, the instructions may be further arranged to cause the processor to control 2029 fuel input to the aircraft 1, such that the aircraft is refuelled with the calculated amount of the available fuel. In other implementations, the output may be read by a person who then refuels the aircraft 1 accordingly, and/or used to provide an alert when a sufficient volume or mass of fuel has been added.

The inventors appreciated that, as different fuels can have different properties, whilst still conforming to the standards, knowledge of the fuel(s) available to an aircraft 1 can allow more efficient, tailored, control of the propulsion system 2. For example, changing to a fuel with a higher calorific value may allow a smaller amount of fuel to supply an aircraft's energy needs for a flight. As more power is needed to lift a greater mass of fuel, taking sufficient fuel for the intended flight (including a safety margin above the expected energy demand), but not completely filling the tank(s), may provide an efficiency bonus by reducing take-off weight of the aircraft. Knowledge of the calorific value of the fuel can therefore be used as a tool to improve aircraft performance, e.g. avoiding carrying excess fuel weight and/or gauging the likelihood of forming contrails behind an aircraft in given atmospheric conditions. The calorific value of one or more fuel(s) may be checked by a second method to improve reliability, especially if knowledge of the calorific value is to be used in any way that might influence safety (e.g. ensuring sufficient fuel onboard for a safe landing at a destination airport).

In various examples as described with respect to FIGS. 6 to 9, an aircraft 1 receives an input of calorific value data for fuel provided to the aircraft 1 on refuelling. For example, a barcode of a fuel to be added to a fuel tank 50, 53 of the aircraft may be scanned to read data of the fuel, or a tracer substance (e.g. a dye) identified and fuel properties looked up based on that tracer. Alternatively, a pilot or technician may be provided with a calorific value, e.g. on a written label or orally, for entry into an aircraft system. Calorific value data may be manually entered, or electronically transmitted to the aircraft 1. In examples in which a calorific value is looked up or read (e.g. from scanning a barcode), this value may be automatically transferred to a fuel tracking system 203 of the aircraft 1, or may be typed into a user interface of, or associated with, the fuel tracking system 203 e.g. by a pilot or technician.

It will be appreciated that checking of calorific values of fuels may be important, especially in examples involving manual data entry of calorific values. The received input of the calorific value data for fuel provided to the aircraft 1 on refuelling may therefore be checked, and an alert may be provided if the determined calorific value of fuel is inconsistent with the calorific value data input received.

In the example shown in FIG. 6, two sensors 204a, 204b are provided, each arranged to physically and/or chemically detect one or more features of the composition of the fuel being added to the fuel tank 50, 53 on refuelling. One or more of these fuel characteristics may be used to infer or calculate calorific value. The sensors 204 may be described as part of a fuel tracking system 203, which may be described as a fuel composition tracking system 203.

In alternative examples, no such sensors 204 may be provided (for example, a barcode associated with a fuel storage vessel 60 may instead be read and the corresponding data on the fuel provided to the refuelling manager 206), or more or fewer, and/or differently-located, sensors may be provided.

In many cases, the tank(s) 50, 53 of the aircraft 1 are not completely empty when the aircraft 1 is to be refuelled. In such cases, the calorific value of fuel already onboard the aircraft 1 is also obtained, optionally by retrieving characteristics of the fuel (e.g. calorific value, or other properties from which calorific value can be calculated) from storage, and/or by combusting a sample of the fuel (e.g. during taxiing) and measuring the calorific value directly. From a known amount of remaining fuel (mass, volume, or % full of the tank(s)), a known amount of added fuel, and the known calorific values of each, the calorific value of the resultant blend can be determined where appropriate (e.g. where fuels mix in the same tank or linked tanks, or are blended in use).

In various examples, the calorific value of fuel arranged to be supplied to the gas turbine engine in use is determined. It will be appreciated that, in implementations with multiple fuel sources, the fuel arranged to be supplied to the gas turbine engine 10 may differ from the fuel in any given tank 50, 53. This fuel may comprise a mixture of fuel with which the aircraft 1 has recently been refuelled, and any fuel remaining in the aircraft's tank(s) 50, 53 following an earlier refuelling event. In some examples, a sample may be extracted, e.g. from a pipe approaching the gas turbine engine 10, for analysis, for example using a ground-based analysis unit or laboratory. In alternative or additional examples, the determination may be performed on-wing, using one or more sensors or other detectors onboard the aircraft 1.

In alternative or additional examples, the calorific value of the fuel provided to the aircraft 1 on refuelling is determined—for example, by ground-based testing prior to the refuelling event, or by on-wing testing in a pipe or tank containing only the newly-added fuel. In examples with an active fuel management system, it may be possible to supply the new fuel alone to the gas turbine engine 10, irrespective of whether or not older fuel is still on board (e.g. by tank/fuel source selection), and to calculate the calorific value of the new fuel directly from engine performance.

In examples in which ground-based testing of the fuel is performed, the calorific value of the fuel provided to the aircraft 1 on refuelling may be determined in a fuel testing unit 61a. In some examples, the fuel testing unit may form a part of a fuel delivery apparatus 61. In other examples, a fuel testing unit 61a may be provided by an airline or airport, or a sample may be sent to a laboratory for analysis.

The testing unit 61a of such examples may be provided off-wing at a refuelling site.

In examples in which on-wing testing of the fuel is performed, the determining the calorific value of the fuel supplied to the gas turbine engine 10 in use may be performed during at least one of taxiing of the aircraft prior to take-off, and during climb. If a sufficiently large discrepancy is identified, the flight may be aborted subject to re-verification of the fuel.

In examples in which on-wing testing of the fuel is performed, the determining the calorific value of the fuel supplied to the gas turbine engine 10 in use may be performed by burning fuel taken from the fuel tank 50, 53 in an auxiliary power unit of the aircraft 1 and measuring the calorific value. Alternatively or additionally, the main gas turbine engine 10 itself may be used to perform the combustion.

After refuelling, a check is then performed to verify the calorific value of the fuel onboard the aircraft 1. The check may comprise measuring the calorific value of the fuel in use in the gas turbine engine 10, optionally during taxiing of the aircraft 1 prior to take-off.

If a discrepancy between the determined calorific value and the received calorific value data exceeds a threshold, an alert may be provided—e.g. an audible and/or visual alarm, and/or a message sent to a pilot or other responsible party. It will be appreciated that, when the determined calorific value is that of a fuel mixture created on-board the aircraft 1, the determined value is not compared directly to the received calorific value data; instead, adjustments are made to one or the other to reflect the contribution from the older fuel.

Figure 7:
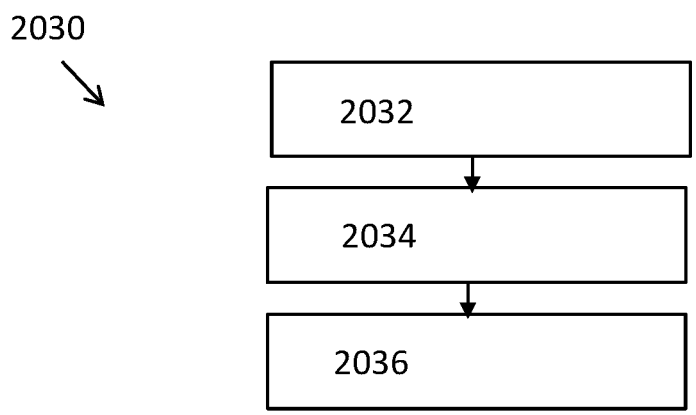
FIG. 7 is a schematic representation of a calorific value checking method.
Figure 8:
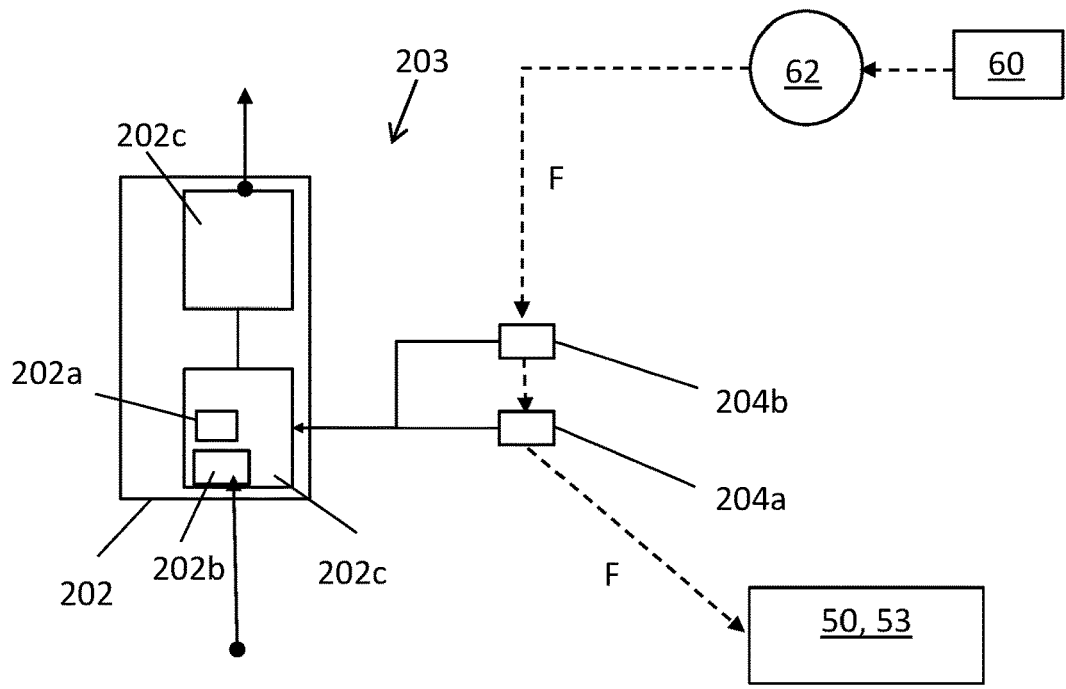
FIG. 8 is a schematic representation of a fuel tracking system.

The method 2030 performed is illustrated in FIG. 7.

At step 2032, an input of calorific value data for a fuel provided to the aircraft 1 on refuelling is received. This data may be manually entered, transmitted to the fuel tracking system 203, obtained by reading a bar code, or similar. The input may comprise a calorific value for the fuel, and/or may be arranged to allow the calorific value for the fuel to be determined (e.g. calculated or looked up).

The input may be obtained in any suitable way, for example being manually entered, e.g. via a graphical user interface in communication with the fuel tracking system 203, and/or electronically communicated to the fuel tracking system 203, e.g. by wired or wireless communication from a barcode scanner following reading of a barcode. The input may be or comprise sensor data in some implementations, e.g. providing one or more chemical or physical fuel characteristics. A calorific value of the fuel in, or determined from, the input may be stored for future use, optionally in memory of, or in communication with, the fuel tracking system 203.

At step 2034, a calorific value is determined for at least one of:
(i) the fuel supplied to the gas turbine engine 10 in use (that fuel including some of, or being, the fuel provided to the aircraft 1 on refuelling); and
(ii) the fuel provided to the aircraft 1 on refuelling.

The determination 2034 does not use the calorific value data provided at step 2032, such that the determinations of calorific values in steps 2032 and 2034 are independent of each other. The determination 2034 may otherwise use any approach described above. The value may be stored for future use, optionally in memory of, or in communication with, the fuel tracking system 203.

It will be appreciated that the fuel supplied to the gas turbine engine 10 in use may differ from the fuel provided to the aircraft 1 on refuelling, as other fuel already on board the aircraft 1 may be used (either mixing in the same tank 50, 53 as the new fuel, or being provided in a blend from different onboard fuel sources).

Steps 2032 (receiving calorific value input) and 2034 (determining calorific value, independently of that input) may be performed in either order, or simultaneously.

At step 2036, an alert is provided if the determined calorific value of the fuel is inconsistent with the calorific value data input received.

It will be appreciated that, if the tank 50, 53 is not empty prior to refuelling, the calorific value of fuel already onboard may also be obtained—e.g. by retrieving a previously-stored calorific value for that fuel—and may also be used in determining 2034 whether or not the determined calorific value of the fuel is inconsistent with the calorific value data input received.

Updated values for the calorific value of the fuel in the fuel tank 50, 53 after refuelling may be calculated and stored for future use, optionally by the fuel tracking system 203. In examples in which an aircraft 1 has multiple fuel tanks 50, 53 which are fluidly linked such that the fuels in the tanks 50, 53 are equivalent, a single calorific value for the fuel may be stored and updated. In examples in which an aircraft 1 has multiple fuel tanks 50, 53 which are not fluidly linked, such that there may be differences between fuels in the different tanks 50, 53, a separate calorific value may be stored and updated for each tank.

The method 2030 may then be iterated on each refuelling event.

Implementations of the method 2030 therefore allow a check to be performed to verify the input data. The check may comprise measuring the calorific value of the fuel in use in the gas turbine engine 10, optionally during warm-up of the engine 10 or taxiing of the aircraft 10 prior to take-off. The determining 2034 the calorific value of the fuel may be performed by monitoring engine parameters during a first time period of aircraft operation during which the gas turbine engine 10 uses the fuel; and determining the calorific value of the fuel based on the monitored engine parameters (e.g. rate of fuel combustion, temperatures, pressures, shaft speed(s) generated thrust, etc.). In case of a significant mis-match in the entered and determined values, the aircraft 1 may return to the terminal for further investigation, as a safety measure, and/or propulsion system control based on knowledge of fuel calorific value may not be performed.

A propulsion system 2 for an aircraft may therefore comprise a fuel tracking system 203 arranged to:
receive an input of calorific value data for fuel provided to the aircraft 1 on refuelling;
determine at least one of:
  i. the calorific value of fuel supplied to the gas turbine engine 10 in use; and
  ii. the calorific value of the fuel provided to the aircraft 1 on refuelling; and
provide an alert if the determined calorific value is inconsistent with the calorific value data input received.

The fuel tracking system 203 may be provided as a separate fuel tracking unit built into the propulsion system 2, and/or as software and/or hardware incorporated into the pre-existing aircraft control systems. In some examples, the fuel tracking system 203 may store calorific value data for any fuel currently in the aircraft's tank(s) 50, 53, and may cause those data to be updated following refuelling. The data may be stored separately from circuitry performing the calculations and retrieved when required—wherever the data are stored, that storage can be thought of as a part of the fuel tracking system 203, whether or not it is integral or physically connected in any way.

The fuel tracking system 203 comprises a fuel composition tracker 202. The fuel composition tracker 202 of the example being described comprises memory 202a arranged to store the current fuel characteristic data (in particular, calorific values), and processing circuitry 202c arranged to calculate updated values for the one or more fuel characteristics of the fuel in the fuel tank 50, 53 after refuelling. The calculated values may then replace the previously stored fuel characteristic data in the memory, and/or may be time- and/or date-stamped and added to the memory. A log of fuel characteristic data with time may therefore be assembled.

The fuel composition tracker 202 of the example shown also includes a receiver 202b arranged to receive data relating to fuel composition (e.g. calorific value, or data which can be used to determine calorific value) and/or requests for fuel composition information.

The fuel composition tracker 202 of the example shown also includes an output module 202c arranged to provide an alert if the determined calorific value of fuel supplied to the gas turbine engine 10 and/or of the newly-added fuel is inconsistent with the calorific value data input received, for example by sending a signal to an alarm or other system.

In examples in which a calorific value is looked up or read (e.g. from scanning a barcode), this value may be automatically transferred to the fuel composition tracker 202, or may be typed into a user interface of, or associated with, the fuel composition tracker 202, e.g. by a pilot or technician.

Figure 9:
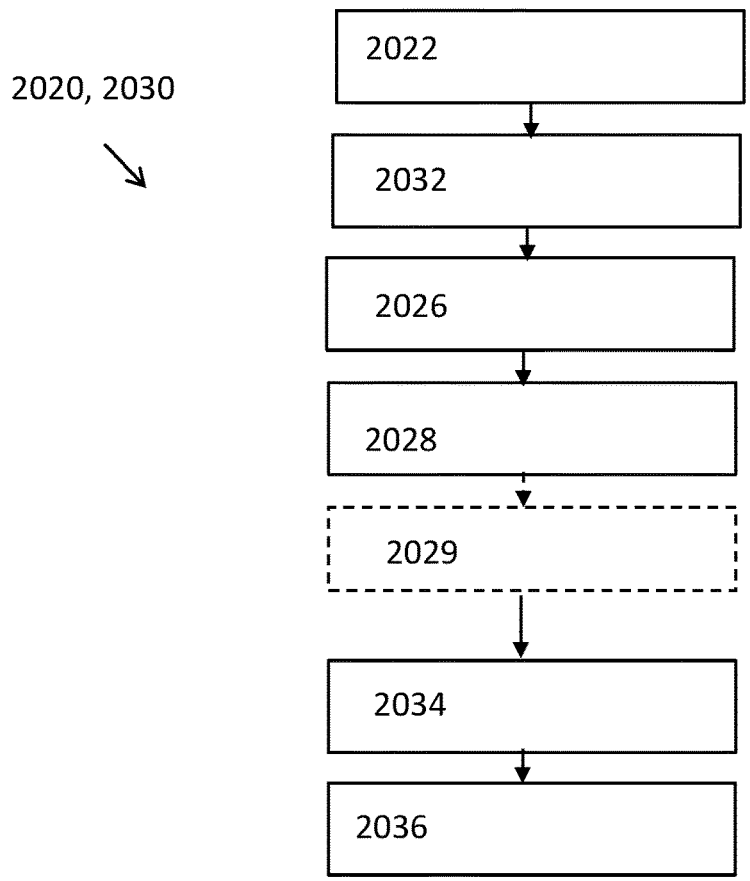
FIG. 9 is a schematic representation of a refuelling management method including the calorific value checking method of FIG. 7.

In some implementations, the calorific value checking method 2030 may be incorporated into a refuelling method 2020 as described earlier with respect to FIG. 5, as illustrated in FIG. 9. In such implementations, the fuel composition tracker 202 may also be referred to as a refuelling manager, or may form part of a refuelling manager 206.

At step 2022, an amount of energy required for an intended flight profile, optionally including a safety margin, is obtained. In this context, the amount of energy being "obtained" means that a numerical value or measure for the amount of energy required is in some way made available for use in the present method 2020, 2030—whether this is by calculation or other determination (e.g. from a look-up table), by communication with another system, by input from a user (e.g. at a graphical user interface), by retrieval from memory, or in any other suitable way. For example, the refuelling manager 202, 206 may receive a message including a value indicative of the energy requirement, or may calculate such a value based on knowledge of the intended flight profile and of the aircraft 1 and aircraft load.

The term "flight profile" is used as defined above.

At step 2032, an input of calorific value data for a fuel provided to the aircraft 1 on refuelling is received, as described above.

Steps 2022 and 2032 may be performed in either order, or simultaneously.

It will be appreciated that, if the tank 50, 53 is not currently empty, the energy content of fuel already on board may also be obtained—e.g. by retrieving a previously-stored calorific value for that fuel, and calculating the energy content of the remaining fuel by reference to that and the amount of fuel remaining in the tank(s) 50, 53.

At step 2026, an amount of the available fuel needed to provide the required energy is calculated, based on the obtained values. The calculated amount may be a volume and/or a mass of fuel—refuelling may be performed volumetrically or gravimetrically. The calculation may be performed by the refuelling manager 206 itself in some examples. In examples in which there is remaining fuel onboard, the energy of that fuel may be subtracted from the energy required for the intended flight profile before calculation of the amount of the available fuel needed.

At step 2028 the calculated amount (mass or volume) of the available fuel needed is output so as to allow the aircraft 1 to be refuelled accordingly. For example, a refuelling manager 206 may display the amount at a graphical user interface, may transmit the amount to another system for the attention of a refuelling technician, or may provide the value to an automated system so as to cause that system to automatically terminate the refuelling process once the calculated amount of fuel has been provided.

Updated values for the calorific value of the fuel in the fuel tank 50, 53 after refuelling may be calculated and stored for future use, optionally by the refuelling manager 202, 206. In examples in which an aircraft 1 has multiple fuel tanks 50, 53 which are fluidly linked such that the fuels in the tanks 50, 53 are equivalent, a single calorific value for the fuel may be stored and updated. In examples in which an aircraft 1 has multiple fuel tanks 50, 53 which are not fluidly linked, such that there may be differences between fuels in the different tanks 50, 53, a separate calorific value may be stored and updated for each tank.

The method 2020 may further comprise controlling 2029 an automated refuelling system to refuel the aircraft 1 in line with the calculated amount of fuel. Alternatively, the refuelling 2029 may be performed manually, e.g. by a person reading the output calculated amount (mass or volume) of the available fuel needed, optionally from a display associated with the aircraft's fuel line connection port 62.

In some examples, refuelling may be started before one or more of steps 2022 to 2028 are performed; those steps may be performed during refuelling, and the refuelling process may then be terminated when the calculated amount of fuel has been added.

A check 2034, 2036 is then performed to verify the input data, as described above.

The check may comprise measuring 2034 the calorific value of the fuel in use in the gas turbine engine 10, optionally during engine warm-up or taxiing of the aircraft 10 prior to take-off. The determining 2034 the calorific value of the fuel may be performed by monitoring engine parameters during a first time period of aircraft operation during which the gas turbine engine 10 uses the fuel; and determining the calorific value of the fuel based on the monitored engine parameters (e.g. rate of fuel combustion, temperatures, shaft speeds, pressures, generated thrust, etc.). In case of a significant mis-match in the entered and determined values, an alert is provided 2036 and the aircraft 1 may return to the terminal for further investigation, as a safety measure.

The check may be performed during or after refuelling.

The method 2020, 2030 may then be iterated on each refuelling event.

In some examples, the fuel tracking system 203 may therefore be further arranged to:
obtain 2022 an amount of energy required for an intended flight profile, including safety margin;
obtain 2032 a calorific value of fuel available to the aircraft;
calculate 2036 the amount (mass or volume) of the available fuel needed to provide the required energy; and
output 2038 the amount (mass or volume) of the available fuel needed so as to allow the aircraft to be refuelled accordingly.

In such examples, the fuel tracking system 203 may be referred to as a refuelling manager 206. It will be appreciated that the examples described with respect to FIGS. 4 and 5 may therefore be combined with the examples described with respect to FIGS. 6 to 9.

In such examples, the calculating the mass or volume of the available fuel needed to provide the required energy comprises obtaining a calorific value of fuel already in the fuel tank 50, 53, and subtracting that from the determined amount of energy required for the intended flight profile.

The method may further comprise calculating a calorific value for the mixed fuel after refuelling. The calorific value of fuel supplied to the gas turbine engine 10 may only be determined to be inconsistent with the calorific value data input received when the calculated calorific value for the mixed fuel does not match the determined calorific value of fuel supplied to the gas turbine engine 10 in use.

The inventors appreciated that, as different fuels can have different properties, whilst still conforming to the standards, knowledge of the fuel(s) available to an aircraft 1 can allow more efficient, tailored, control of the propulsion system. For example, changing to a fuel with a higher calorific value may allow a smaller flow rate of fuel to meet an aircraft's energy needs at a particular point in the flight envelope, so potentially providing more fuel to auxiliary systems (e.g. fueldraulic actuators or fuel-oil heat exchangers) if a total pumped flow rate is constant. Knowledge of the calorific value of the fuel can therefore be used as a tool to improve aircraft performance in flight even if it is not known at the point of refuelling, e.g. gauging the likelihood of forming contrails behind an aircraft 1 in given atmospheric conditions and changing fuel source or altitude mid-flight. Further, in-flight determination of calorific value may be used as a check to verify data provided on or before refuelling.

As discussed above, calorific values (also referred to as heating values) of fuels may be directly determined—for example by measuring the energy released when a certain volume or mass of the fuel is combusted in the gas turbine engine 10—or calculated from other fuel parameters. In the examples presently being described, with respect to FIGS. 10 to 12, the calorific value of the fuel is directly determined by measuring the energy released (or taking measurements which allow the energy released to be inferred) when a certain volume or mass of the fuel is combusted within a gas turbine engine 10, 44 of the aircraft 1. The performance of the main/propulsive gas turbine engine 10 itself, and/or of a gas turbine engine of an Auxiliary Power Unit (APU) 44 is therefore used to determine this fuel characteristic.

In addition to the propulsion system 2 described with respect to FIGS. 4 and 6, a power system 4 of the implementation shown in FIG. 10 includes an Auxiliary Power Unit (APU) 44. The more general term "power system" 4 may be used in place of propulsion system 2 when the system 2, 4 does not provide only propulsive power, or indeed when the system 4 does not provide any propulsive power. A propulsion system 2 is an example of a power system 4.

The APU 44 is a gas turbine engine smaller than those 10 on the wings of the aircraft 1, and is arranged to provide electrical power to systems of the aircraft 1; for example, lighting, heating, air conditioning and/or similar. The APU 44 may be, for example, an APU in Honeywell's 331 Series, such as the HGT1700 auxiliary power unit (APU). In some implementations, the APU 44 may be certified for in-flight use; in other implementations, it may be certified for ground use only.

An aircraft APU 44 is generally arranged to be started using one or more aircraft batteries so as to provide electrical power as well as optionally bleed air for air conditioning and for engine start. The APU 44 of the implementation shown is located towards the rear of the fuselage, and is not arranged to provide any propulsive power to the aircraft 1. In alternative implementations, the APU may be differently located (e.g. within a nacelle 21 of the aircraft 1), and/or may provide some propulsive power. In the example shown in FIG. 10, the centre fuel tank 50 is arranged to supply fuel to the APU 44; fuelling arrangements may vary in other examples.

Engine parameters during a first time period of aircraft operation during which the gas turbine engine 10, 44 uses the fuel are sensed, and optionally monitored over time. Those parameters may include one or more of the thrust/propulsion provided, the volume (or mass) of fuel used in a given time (e.g. calculated from a fuel pumping rate/fuel flow rate, bearing in mind a pump spill ratio if applicable), the exhaust temperature, one or more shaft speeds, one or more temperature readings of other components/in other locations, and/or one or more pressure measurements. In some examples, it may be assumed that 100% of the fuel fed to a combustor 16 of the gas turbine engine 10 is fully combusted. In other examples, different assumptions on the completeness of combustion may be made as applicable.

Sensors 224, for example temperature sensors 224a and pressure sensors 224b, may be provided in association with the or each gas turbine engine 10 so as to monitor the performance of the gas turbine engine 10.

Based on the monitored engine parameters, a calorific value of the fuel can then be determined.

As discussed above, it will be appreciated that checking of calorific values of fuels may be important, especially in examples involving manual data entry of calorific values. The determined calorific value may therefore be checked by a second determination (and optionally also additional determinations), and/or used to check a manually entered (or otherwise provided) value, and an alert may be provided if the determined calorific value of the fuel is inconsistent with the calorific value data input received. Examples as currently being described with respect to FIGS. 10 to 12 may therefore be combined with examples described above with respect to FIGS. 6 to 9.

In various examples, an aircraft 1 receives an input of calorific value data for fuel provided to the aircraft 1 on refuelling and a comparison of the input value with the determined value may provide that check. For example, a barcode of a fuel to be added to a fuel tank 50, 53 of the aircraft 1 may be scanned to read data of the fuel, or a tracer substance (e.g. a dye) identified and fuel properties looked up based on that tracer. Alternatively or additionally, a pilot or technician may be provided with a calorific value, e.g. on a written label or orally, for entry into an aircraft system. Calorific value data may therefore be manually entered, or transmitted to the aircraft 1. In examples in which a calorific value is looked up or read (e.g. from scanning a barcode), this value may be automatically transferred to a fuel tracking system 203 of the aircraft 1, or may be typed into a user interface of, or associated with, the fuel tracking system 203, e.g. by a pilot or technician.

In some implementations, the calorific value determined by measuring or otherwise determining the energy released when a certain volume or mass of the fuel is combusted may be verified against a value determined in a different way, such as any of the determination methods described above.

The calorific value of the fuel may therefore be physically determined from the results of combustion on-wing, and optionally verified with values provided to the aircraft 1, chemically determined from detected chemical properties, or calculated/inferred from other detected fuel properties (either on-wing or off-wing), for example using any of the detection techniques described above. In alternative or additional examples, the process of determining calorific value based on engine performance may be repeated, and the values compared, so providing a check using the same approach. In alternative or additional examples, a calorific value based on engine performance may be determined in two different engines, so providing a check; e.g. two different propulsive gas turbine engines 10, or a propulsive gas turbine engine 10 and an APU gas turbine engine 44.

Repeating the sensing and determination so as to obtain a second calorific value may be described as performing the same method in a second time period. The first and second time periods may be at different stages of aircraft operation (e.g. ground operations vs. cruise, climb vs. cruise, or cruise at a first altitude vs. cruise at a second altitude), or may be at the same stage of aircraft operation—therefore, in some cases, no changes may be made to propulsion system control and/or the ambient conditions may be the same between the two time periods, such that the same values of the monitored parameters (within errors/natural variation) would be expected.

If a discrepancy between the determined calorific value and the received calorific value data exceeds a threshold, an alert may be provided—e.g. an audible and/or visual alarm, and/or a message sent to a pilot or other responsible party. It will be appreciated that, when the determined calorific value is that of a fuel mixture created onboard the aircraft 1, the determined value is not compared directly to the received calorific value data; instead, adjustments are made to one or the other to reflect the contribution from the different fuel(s).

If a sufficiently large discrepancy is identified, the flight may be aborted subject to re-verification of the fuel, and/or no fuel-specific control of the propulsion system 2 may be performed.

In some examples, an aircraft 1 may comprise multiple fuel tanks 50, 53, and two or more of the fuel tanks may contain different fuels, which may have different calorific values. In such cases, a determination of the calorific value for the fuel in each tank 50, 53 may be made—for example using a fuel management system to initially provide 100% fuel from one tank, and doing a first determination, and then using the fuel management system to initially provide 100% fuel from the other tank, and doing a second determination. Alternatively or additionally, calorific values for two (or more) different blends of the two (or more) different fuels may be determined from the engine performance on the specific blends, and calorific values for the fuels in the individual tanks 50, 53 may be calculated based on those determinations. In other such cases, the two or more different fuels may always be provided in the same ratio in a blend, and the calorific value of the blend may therefore be the only value of interest.

In the examples described herein, the calorific value of fuel supplied to the gas turbine engine 10 in use is determined. This fuel may comprise a mixture of fuel with which the aircraft 1 has recently been refuelled, and any fuel remaining in the aircraft's tank(s) 50, 53 following an earlier refuelling event, and may comprise a mixture of fuels from different tanks.

The determination(s) are performed in a first stage of aircraft operation, and the results can then be used to influence control of the propulsion system 2, or of the aircraft 1 more generally, in one or more later stages of aircraft operation. For example, the determining the calorific value of the fuel supplied to the gas turbine engine 10 in use may be performed during taxiing of the aircraft 1 prior to take-off, and/or during other ground-based operations, and the result may be used to influence control during one or more of take-off, climb, and cruise. Especially in implementations in which an Auxiliary Power Unit 44 is used for the determination, the determination may even be performed at an airport gate, before the main gas turbine engine(s) 10 have been turned on. Alternatively, the determination may be performed under cruise conditions and the results used to influence control later in the flight, e.g. during cruise later in the same flight.

It will be appreciated that cruise conditions generally account for a large proportion of most commercial flights, and that optimising propulsion system control for cruise therefore provides optimisation for the bulk of the flight envelope in most cases.

Figure 11:
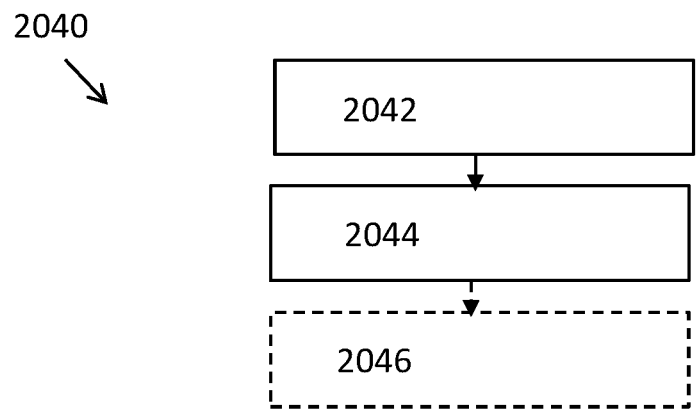
FIG. 11 is a schematic representation of a calorific value determining method.
Figure 12:
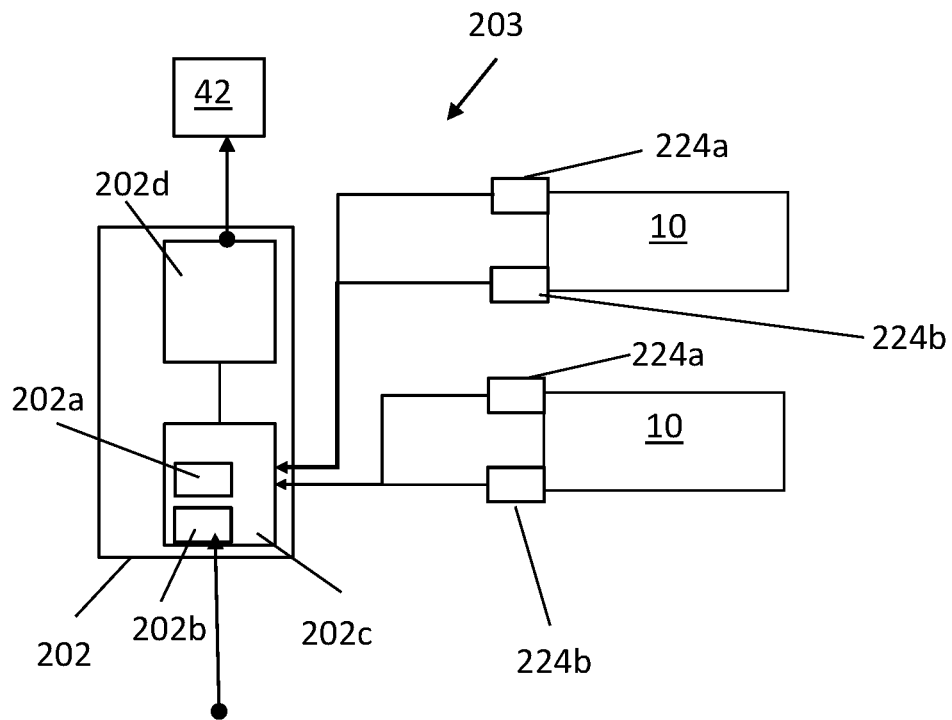
FIG. 12 is a schematic representation of a fuel tracking system.

The method 2040 performed is illustrated in FIG. 11.

At step 2042, engine parameters are sensed or monitored during a first time period in which a fuel of interest is being combusted in a gas turbine engine 10, 44 of the aircraft 1. This time period may be described as a first time period of aircraft operation, and may occur at any point of aircraft operation, including when the aircraft 1 is stationary (e.g. at a gate). Particularly in examples in which the engine parameters are monitored whilst the aircraft 1 is stationary, the gas turbine engine used may be an APU 44 of the aircraft 1, rather than one of the engines 10 arranged primarily to provide propulsive power.

The first time period may be a period at idle at initial start of the engine. This may allow fuel calorific value to be determined before a flight commences, and operation of the engine 10 thereafter may be varied according to the determined calorific value. The method 2040 described herein may therefore be used as part of an active control scheme.

By way of example of monitored engine parameters, the mass fuel flow rate into the combustor 16, shaft speed of one or more shafts 26, 27 of the engine 10, and/or one or more pressures and temperatures may be sensed—either instantaneously at a point within the first time period, or with monitoring over the first time period. The fuel flow rate into the combustor 16 may be measured directly—many current aircraft 1 have a fuel flow meter at that location, and a meter could be added if not. Alternatively, the fuel flow rate on entry to the combustor may be inferred from data collected elsewhere—e.g. from the position of a fuel metering valve (such valves commonly provide positional feedback), or from one or more pumps or flow meters located elsewhere. In examples with a volumetric pump rather than a gravimetric pump, mass flow rate may be calculated from the volumetric flow rate and the fuel density, or the calorific value calculation may be adjusted accordingly. Additionally, it will be appreciated that current aircraft 1 routinely monitor one or more shaft speeds, and that this information, like other data, is often provided to an Engine Electronic Controller (EEC) 42. Step 2042 may therefore be performed without the need for any new sensors.

At step 2044, a calorific value is determined for the combusted fuel, using the monitored engine parameters.

For example, the mass fuel flow rate used to obtain a given speed of the low pressure shaft, 26, or indeed the speed of any of the engine shafts 26, 27, may be used to calculate the calorific value of the fuel (either directly or by using a look-up table of known values). In some implementations, an instantaneous measurement may be performed so as to determine a calorific value. In other cases, the parameters (e.g. fuel flow rate and shaft speed) may be monitored over a longer period of operation of the same fuel, for example for improving confidence of the calculation.

The change in relationship between mass fuel flow rate and shaft speed may be at least approximately 1:1 to the change in calorific value of the fuel (assuming no gearing of the shaft).

In some implementations, measurements may be taken in both the first time period in which the first fuel of interest is being combusted in a gas turbine engine 10 and in a second time period in which a second fuel of interest is being combusted in the gas turbine engine 10. Other than the change in fuel, all other engine control options/all other features of engine operation may be kept constant between the first and second time periods, such that the fuel change is the only variable and a response of the system (in terms of a change to one or more of the monitored parameters) can be attributed to the change in fuel alone. The change in relationship between the mass fuel flow rate and the speed of the selected shaft may have a relationship close to 1:1 to the change in calorific value. The calorific value of the second fuel may therefore be determined based on knowledge of the calorific value of the first fuel, optionally as a relative value compared to that of the first fuel.

As an alternative to considering shaft speed, mass fuel flow may be held constant on changing fuel, and a change (if any) in the temperature rise across the combustor 16 considered. The combustor exit temperature—T40—may be compared to the compressor exit temperature—T30—to get a measure of this temperature change (with the compressor exit temperature corresponding closely to the combustor entry temperature).

As used herein, T30 and T40, and any other numbered temperatures, are defined using the station numbering listed in standard SAE AS755, in particular:

T30=High Pressure Compressor (HPC) Outlet Temperature

T40=Combustion Exit Temperature

In current engines 10, T40 is generally not measured directly using conventional measurement technology, such as thermocouples, due to the high temperature. A direct temperature measurement may be taken optically but, alternatively or additionally, a value for T40 may instead be modelled or inferred from other measurements (e.g. using readings from thermocouples used for temperature measurement at other stations and knowledge of the gas turbine engine architecture and thermal properties).

For a fuel with a higher calorific value, an increase in the temperature rise across the combustor (T40-T30) would be expected, and vice versa, so mass fuel flow rate and combustor temperature change can be used as an alternative to shaft speed, or as a check of a calculation based on shaft speed.

For the examples listed, calculation of a change in calorific value on fuel change is described. It will be appreciated that absolute values may be calculated, but that looking at a change in shaft speed and/or combustor temperature rise (or another parameter) for a fixed mass flow rate of fuel may offer improved accuracy in cases in which there are relevant accuracy limits on how well fuel mass flow can be measured.

When changes are assessed, as described above, it may be desirable to have the first and second time periods as close together as reasonably possible—a small interval may be left to ensure a complete change of fuel in the combustor 16 and allow for any transient effects to pass. The required interval size (if any) may depend on fuel flow rate at the operating condition. The gas turbine engine 10 generally reacts almost instantly (within a second) to differences in fuel once that fuel reaches the combustor 16, and speed probes used for shaft speed measurements generally have a low time constant. At relatively low power, low fuel flow rate conditions, an interval of around ten seconds from when the fuel entering the pylon which connects the engine 10 to the airframe of the aircraft 1 changes may be used. At higher power, where fuel flow rate may be four or more times higher, and interval of 2-3 seconds from fuel change on pylon entry may be appropriate. It will be appreciated that travel time from a fuel tank to the engine 10 may vary based on tank location as well as fuel flow rate, and can be accommodated accordingly with knowledge of the specific aircraft 1—pylon entry is therefore mentioned here for ease of generalisation, although time change from opening or closing of a valve at or near a fuel tank 50,53, or activation or deactivation of a fuel pump 108, may be used in various implementations, with the interval calculated with reference to fuel flow time between the point of interest and the engine 10. The interval may therefore be arranged to allow for time taken to flush the first fuel out from the fuel supply pipes and for the second fuel to reach the combustor 16, as well as for a new steady state to be reached.

Further, measurements may be averaged over a period of time (e.g. 5 seconds up to 30 seconds) within each time period, or in the second time period only, and any trends examined, to check that a new steady state has been reached and/or to improve reliability. In other examples, the transient behaviour itself may be used in the determination—no interval may be left in such cases, and parameters may be monitored during a single time period covering the change.

In some implementations, the propulsion system 2 of the aircraft 1 may then be controlled 2046 differently, depending on the determined calorific value of the fuel.

The method 2040 may also be used to obtain near-instantaneous measurements in flight, for example checking fuel calorific value when fuel is drawn from a different tank 50, 53 or combination of tanks. This method 2040 may then be used as part of an active control scheme to control subsequent operation of the gas turbine engine 10. A change in calorific value may be detected, e.g. based on a change in the relationship between fuel flow rate and shaft speed, and engine performance may be controlled accordingly, for example by changing one or more of fuel flow rate; pump spill; altitude; guide vane staging (where variable-position vanes are provided); and fuel (where multiple different fuels are available onboard the aircraft 1).

As such, once the calorific value(s) of one or more fuels onboard the aircraft 1 have been determined, the propulsion system 2 can be controlled based on the determined calorific value(s) by, for example:

Changing an operating parameter of a heat management system of the aircraft 1 (e.g. a fuel-oil heat exchanger), or changing the temperature of fuel supplied to the combustor 16 of the engine 10.

When more than one fuel is stored aboard an aircraft 1, selecting which fuel to use for which operations (e.g. for ground-based operations as opposed to flight, or for operations with different thrust demands) may be made based on the fuel. A fuel delivery system may therefore be controlled appropriately based on the fuel characteristics.

Adjusting one or more flight control surfaces of the aircraft 1 so as to change route and/or altitude based on knowledge of the calorific value of the fuel(s).

Changing the spill percentage of a fuel pump 108 (i.e. the proportion of pumped fuel recirculated instead of being passed to the combustor 16, as discussed in more detail below). The pump 108 and/or one or more valves may therefore be controlled appropriately based on the fuel characteristics.

Changing the scheduling of variable-inlet guide vanes (VIGVs). The VIGVs may therefore be moved, or a movement of the VIGVs be cancelled, as appropriate based on the fuel characteristics.

It will be appreciated that fuel flow rate on entry to the combustor 16 is generally already measured in modern gas turbine engines 10, with a gravimetric fuel flow meter often being provided. Conversions may be made as applicable where a volumetric fuel flow meter is provided. Further, fuel flow rate may additionally or alternatively be inferred from position of a fuel metering valve which controls fluid flow into the combustor 16 and/or other circuits—such fuel metering valves generally provide positional feedback, but, especially at cruise as opposed to idle, improved accuracy may be provided by a flow meter downstream of the fuel metering function. Similarly, shaft speeds are already recorded in modern gas turbine engines 10, so no additional hardware/sensors may be required to implement the method 2040 described herein. The method 2040 may therefore be implemented in software, optionally as part of the EEC 42, without requiring any physical changes to the gas turbine engine 10.

A propulsion system 2, or other power system 4 as discussed above, for an aircraft 1 may therefore comprise a fuel tracker 202 arranged to:

monitor 2042 engine parameters during a first time period of aircraft operation during which a gas turbine engine 10, 44 uses the fuel; and determine 2044 a calorific value of the fuel based on the monitored engine parameters.

The fuel tracker 202 may then provide the determined calorific value as an output. The determined calorific value may be supplied to an aircraft control system 42, for example to be used to influence control 2046 of the propulsion system 2.

The fuel tracker 202 may be provided as a separate fuel tracking unit built into the propulsion system 2, and/or as software and/or hardware incorporated into the pre-existing aircraft control systems. In some examples, the fuel tracker may store calorific value data for any fuel currently in the aircraft's tank(s) 50, 53, and may cause those data to be updated following new determinations (e.g. triggered by refuelling). The data may be stored separately from circuitry performing the calculations and retrieved when required—wherever the data are stored, that storage can be thought of as a part of the fuel tracker 202, whether or not it is integral or physically connected in any way.

The fuel tracker 202 may form part of a fuel tracking system 203.

The fuel tracking system 203 comprises the fuel composition tracker 202. The fuel composition tracker 202 of the example being described comprises memory 202a arranged to store received values for monitored engine parameters and determined fuel calorific values, and processing circuitry 202c arranged to calculate calorific values based on the received values for monitored engine parameters. The calculated calorific value may replace previously stored fuel characteristic data in the memory, and/or may be time- and/or date-stamped and added to the memory. A log of fuel characteristic data (in particular, calorific value, although other characteristics may also be stored) with time may therefore be assembled.

The fuel tracking system 203 comprises, or is in communication with, one or more sensors 224. The sensors 224, for example temperature sensors 224a and pressure sensors 224b, are associated with a gas turbine engine 10 so as to monitor the performance of the gas turbine engine 10. Data from these sensors are used, optionally in conjunction with other data provided, to calculate fuel calorific value based on engine performance when burning that fuel.

The fuel composition tracker 202 of the example shown also includes a receiver 202b arranged to receive data relating to fuel composition (including the monitored engine parameters, or values calculated elsewhere therefrom) and/or requests for fuel composition information.

The fuel composition tracker 202 of the example shown also includes an output module 202d. In some implementations, the output module 202d may be arranged to provide an alert if the determined calorific value of fuel supplied to the gas turbine engine 10 is inconsistent with a calorific value data input received, for example by sending a signal to an alarm or other system.

In some examples, the fuel tracking system 203 may therefore be further arranged to:
  receive an input of calorific value data for fuel in an aircraft 1, or provided to the aircraft 1 on refuelling;
  compare the input calorific value data to the determined calorific value; and
  provide an alert if the determined calorific value of fuel supplied to the gas turbine engine is inconsistent with the calorific value data input received.

In alternative or additional implementations, the output module 202d may send a message—for example comprising a fuel calorific value, or a control instruction based on the calorific value—to an aircraft control system 42, e.g. an Engine Electronic Controller (EEC), so as to influence control of the propulsion system 2 based on the fuel characteristics.

The inventors appreciated that, as different fuels can have different properties, whilst still conforming to the standards, knowledge of the fuel(s) available to an aircraft 1 can allow more efficient, tailored, control of the propulsion system 2, and in particular it may be appropriate to change spill rates around a fuel pump 108 of the gas turbine engine 10. For example, changing to a fuel with a higher calorific value may allow a smaller flow rate of fuel to the combustor 16 to meet an aircraft's energy needs at a particular point in the flight envelope, so potentially providing more fuel to auxiliary systems (e.g. fueldraulic actuators or fuel-oil heat exchangers) if a total pumped flow rate is constant.

As depicted in FIGS. 4, 6 and 10 and described above, an aircraft 1 may comprise multiple fuel tanks 50, 53; for example a larger, primary fuel tank 50 located in the aircraft fuselage, and a smaller fuel tank 53a, 53b located in each wing. In other examples, an aircraft 1 may have only a single fuel tank 50. Many different fuel tank arrangements are possible as described above, and the tanks 50, 53 may form a single fuel source, or multiple fuel sources.

The fuel used in a gas turbine engine 10 of the aircraft may therefore vary during flight (where an aircraft 1 has multiple distinct fuel sources) as well as between flights (as an aircraft 1 may be refuelled with a different fuel). The tanks 50, 53 may contain different fuels—for example with one tank 50 containing a kerosene jet fuel and another tank 53 containing a SAF, or a kerosene-SAF blend. The different fuels may be mixed en route to the combustor 16. The percentage of SAF in a fuel supplied to the engine 10 may therefore vary between 0% and 100% during operation of the aircraft 1 in some examples. The SAF may have a density (p) of between 90% and 98% of the density of kerosene. The SAF may have a calorific value, (CV) of between 101% and 105% the calorific value of kerosene (calorific value being as defined above). For example, the calorific value of kerosene may be 43.1 MJ/kg (with a current minimum CV allowed in the fuel specification of 42.8 MJ/kg), whereas the calorific value of SAF may be 44.2 MJ/kg. The calorific value and density of fuel blends may vary accordingly with a density of 90-100% of that of kerosene and a calorific value of 100% to 105% of that of kerosene.

The aircraft 1 of the examples currently being described comprises a fuel pump 108 arranged to pump fuel from the one or more tanks 50, 53 to the gas turbine engine 10. The fuel pump 108 has an inlet 108a arranged to receive fuel and an outlet 108b via which fuel leaves the pump 108. The received fuel may be from a single tank, or may be a blend from a combination of tanks 50, 53. The fuel fed to the gas turbine engine 10 may therefore have a different composition from any fuel stored in a tank in some examples. The fuel may pass through one or more elements of a heat management unit, or other engine components, en route to the inlet 108a of the pump 108. Further, not all of the fuel leaving the pump 108 is supplied to the combustor 16; some is instead recirculated ("spilled"), and recirculated fuel generally forms a proportion of the fuel entering the pump inlet 108a.

The proportion of fuel passing through the pump 108 which is recirculated is referred to as the spill or spill percentage, i.e.:

$$\text{Spill} = \frac{\text{Total fuel flow, } Q, \text{ at pump outlet} - \text{Fuel flow into combustor}}{\text{Total fuel flow, } Q, \text{ at pump outlet}}$$

Figure 13:
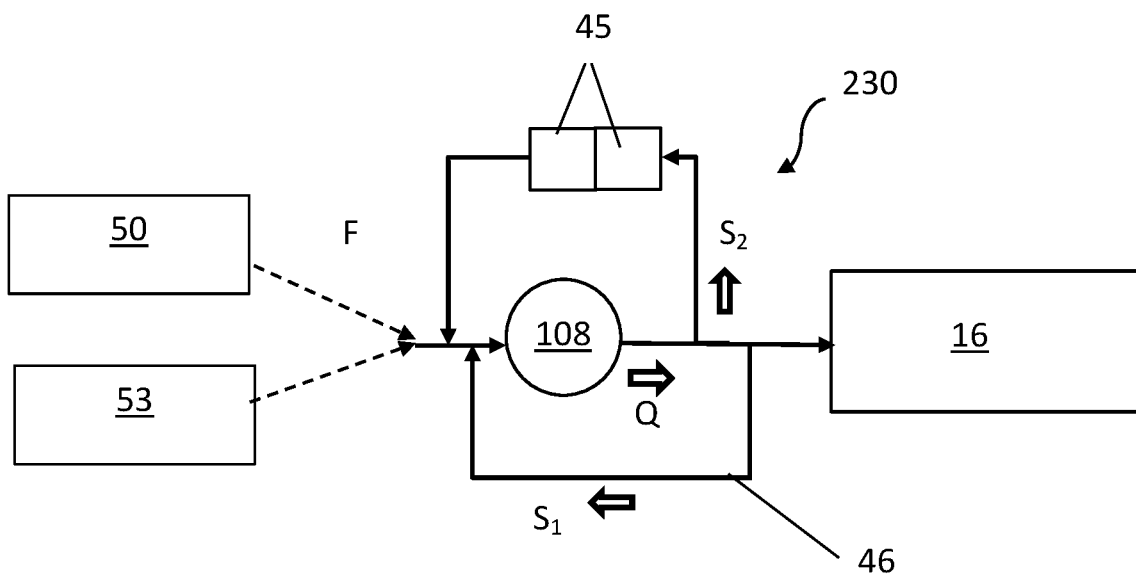
FIG. 13 is a schematic view of an aircraft fuel supply system, illustrating spill around the fuel pump.

The recirculated fuel may include fuel returned directly from the pump outlet 108b to the pump inlet 108a, for example via a fuel return line 46 (FIG. 13, flow $S_1$). In other examples, no such fuel return line 46 may be present. The recirculated fuel may include fuel diverted away from the combustor entry to serve other roles in auxiliary systems or engine components (FIG. 13, flow $S_2$), for example with the fuel acting as a heat transport medium in one or more heat exchangers, or as a working fluid in one or more fueldraulic actuators. Further, some of the recirculated fuel may be returned to a fuel tank 50, 53 before later use. Spilled fuel (FIG. 13, flows $S_1$ and $S_2$) may therefore be used to perform engine functions as well as to allow a pump 108 to keep operating at a set flow rate even when there are fluctuations in combustor fuel demand. As used herein, "spill" therefore includes fuel used for any purpose other than being fed to the combustor 16, not just fuel sent straight from the pump outlet 108b to the pump inlet 108a or back to a tank 50, 53.

When an aircraft 1 is operating on kerosene at cruise, spills of 70-85% are common, with spill often reaching 98% at flight idle. Precise spill levels depend on one or more of aircraft and engine designs, thrust demand, ambient temperature, altitude, and stage of cruise (e.g. due to a higher aircraft weight due to additional fuel, and often a lower altitude, at the start of cruise, and a lighter, and often higher, aircraft at the end of cruise). A minimum spill of at least 5% or 10% may be set to ensure sufficient fuel is provided to auxiliary systems 45. The pump 108 may be sized for the Maximum Take Off (MTO) thrust of an aircraft 1, optionally at low altitude. Around 10% of total pump capacity may generally be accounted for supplying auxiliary systems 45 at MTO. At cruise as compared to MTO, a pump 108 with a rotation speed linked to an engine shaft will still be spinning very quickly, but the flow demanded by the combustor 16 will be significantly lower than at MTO; the fraction of spilled excess flow is therefore generally much higher at cruise than at MTO.

A new pump 108 on any engine 10 will generally have some extra capacity (effectively over-supplying fuel) as its performance is expected to deteriorate over time—the % of total flow spilled may therefore be greater for newer pumps 108 than for older pumps. It will be appreciated that the total fuel offtake requirements for auxiliary systems 45 etc. are a function of how many auxiliary systems are being supplied with fuel, what the requirements of these systems 45 are in terms of flow, and when the flow is required (e.g. not all fueldraulic actuators generally move at the same time). A spare capacity margin is generally also provided such that more spilled fuel is generally available than needed.

One or more sensors may be provided to detect spill directly. For example, the fuel flow rate into the combustor 16 may be measured directly—many current aircraft 1 have a fuel flow meter at that location, and a meter could be added if not—or inferred from measurements elsewhere, and subtracted from a known pump outlet flow value, Q, to provide a measure of the recirculated fuel flow.

Figure 14:
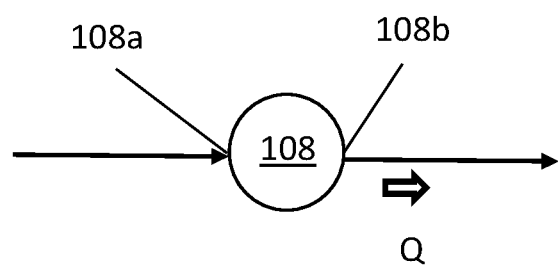
FIG. 14 is a schematic view of an aircraft fuel pump.

The inventors appreciated that, as different fuels can have different properties whilst still conforming to the standards, use of SAF, or kerosene-SAF blends, may change the desired spill at given conditions. In particular, as SAF content increases, a desired spill may generally reduce. One or more valves associated with the pump 108, with the fuel return line 46, and/or with the fuel-using auxiliary systems or components 45 may be used to control the spill. The pump 108 and valves (not pictured) and the fuel supply lines connecting them together form a fuel supply system 230, as illustrated in FIG. 13 and FIG. 14.

A fuel-change spill ratio, $R_s$, is defined as:

$$R_s = \frac{\text{spill percentage at cruise using kerosene}}{\text{spill percentage at cruise using a fuel with } X\% \text{ SAF}}$$

$R_s$ is therefore equal to 1 when X=0, i.e. when the fuel is a pure kerosene fuel, but varies when X increases. It will be appreciated that, in calculating $R_s$, conditions are taken to be the same other than the change of fuel—i.e. same engine 10, same stage of flight, same altitude, etc.

In various examples, X % is at least 30% (X≥30), and $R_s$ is greater than or equal to 1.003.

In various examples, when the fuel blend is 50% SAF by weight (X=50), the fuel-change spill ratio is at least 1.0066, and when X=100 such that the fuel is pure SAF, the fuel-change spill ratio is at least 1.0138.

The following relationship may apply in various examples where X % is at least 10%, and optionally at least 30%, illustrating the relationship between % SAF and spill:

$$R_s \geq 1 + \frac{X}{10000}, X \geq 10$$

The fuel supply system 230 is arranged to supply fuel to the combustor 16 at an energy flow rate, C, optionally measured in Mega Watts, MW. This energy flow rate, C, may be controlled to meet/equal the combustor energy demand to obtain a given power output/thrust in given conditions. Defining the density of kerosene as $\rho_K$, the calorific value of kerosene as $CV_K$ and the density and calorific value of the fuel supplied to the combustor 16 as $\rho_F$ and $CV_F$, respectively, it has been found advantageous to control the pump flow rate, Q, and spill rate based on fuel properties and combustor energy demand such that:

$$R_s = \frac{\text{spill percentage at cruise using kerosene}}{\text{spill percentage at cruise using the fuel with } X\% \text{ SAF}}$$

$$= \frac{Q - C/(CV_K \times \rho_K)}{Q - C/(CV_F \times \rho_F)}$$

In various examples, the gas turbine engine 10 is arranged such that, for an engine 10 with a maximum take-off thrust in the range from 400 kN to 500 kN, at cruise:

$$\frac{Q - (Q - 4595)/(5.88 \times 10^{-6} \times CV_K \times \rho_K)}{Q - (Q - 4995)/(5.88 \times 10^{-6} \times CV_F \times \rho_F)} \leq$$

$$R_s \leq \frac{Q - (Q - 4995)/(5.88 \times 10^{-6} \times CV_K \times \rho_K)}{Q - (Q - 4595)/(5.88 \times 10^{-6} \times CV_F \times \rho_F)}$$

where Q is measured in Imperial Gallons per hour, CV in CHU/lb, and ρ in lb per Imperial Gallon.

Converting units to measure Q in litres/second, CV in MJ/kg, and ρ in kg per litre gives:

$$\frac{Q - (Q - 5.80)/(0.014 \times CV_K \times \rho_K)}{Q - (Q - 6.31)/(0.014 \times CV_F \times \rho_F)} \leq$$

$$R_s \leq \frac{Q - (Q - 6.31)/(0.014 \times CV_K \times \rho_K)}{Q - (Q - 5.80)/(0.014 \times CV_F \times \rho_F)}$$

In various examples, the gas turbine engine 10 is arranged such that, for an engine 10 with a maximum take-off thrust in the range from 300 kN to 350 kN, the following relationship holds at cruise:

$$\frac{Q - (Q - 3457)/(1.13 \times 10^{-5} \times CV_K \times \rho_K)}{Q - (Q - 3857)/(1.13 \times 10^{-5} \times CV_F \times \rho_F)} \leq$$

$$R_s \leq \frac{Q - (Q - 3857)/(1.13 \times 10^{-5} \times CV_K \times \rho_K)}{Q - (Q - 3457)/(1.13 \times 10^{-5} \times CV_F \times \rho_F)}$$

where Q is measured in Imperial Gallons per hour, CV in CHU, and ρ in pounds per Imperial Gallon.

Converting units to measure Q in litres/second, CV in MJ/kg, and ρ in kg per litre gives:

$$\frac{Q - (Q - 4.37)/(0.027 \times CV_K \times \rho_K)}{Q - (Q - 4.87)/(0.027 \times CV_F \times \rho_F)} \leq$$

$$R_s \leq \frac{Q-(Q-4.87)/(0.027 \times CV_K \times \rho_K)}{Q-(Q-4.37)/(0.027 \times CV_F \times \rho_F)}$$

The fuel-change spill ratio, $R_S$, may therefore be controlled based on the pump output flow and fuel properties.

As mentioned above, a desired spill may vary based on one or more of ambient temperature, altitude, and stage of cruise. $R_s$ may therefore be varied accordingly.

In various examples, $R_s$ is decreased by less than 0.15%, and optionally by more than 0.1%, between the beginning and end of cruise, for a constant temperature and altitude.

In various examples, $R_s$ is decreased by at least 0.11% when altitude increases by at least 600 m.

Figure 15:
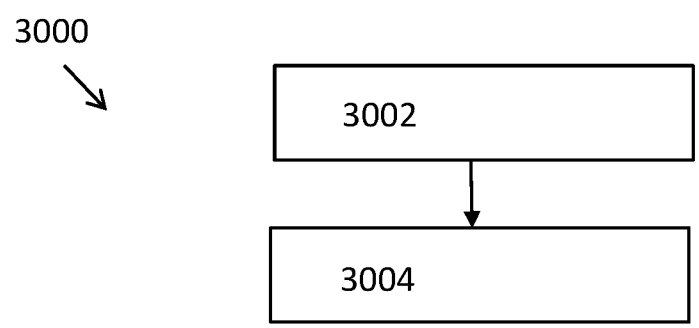
FIG. 15 is a schematic representation of a spill management method.

A method 3000 performed in some embodiments is illustrated in FIG. 15.

At step 3002, a fuel from one or more of the fuel tanks 50, 53 is supplied to the gas turbine engine 10. The fuel supplied to the gas turbine engine 10 comprises X % SAF, where X % is in the range from 5% to 100%, with any remainder of the fuel being kerosene. The fuel's density is denoted as $\rho_F$, and its calorific value as $CV_F$. Correspondingly, $\rho_K$ and $CV_K$ are used for kerosene.

In some implementations, at step 3004, the propulsion system 2 is controlled such that:

the fuel-change spill ratio, $R_s$, of:

$$R_s = \frac{\text{spill percentage at cruise using kerosene}}{\text{spill percentage at cruise using the fuel with } X\% \text{ SAF}}$$

is equal to:

$$\frac{Q-C/(CV_K \times \rho_K)}{Q-C/(CV_F \times \rho_F)}$$

Where Q is the fuel flow rate at the pump outlet, and C is the energy flow rate of fuel entering the combustor.

The fuel-change spill ratio, Rs, may therefore be controlled based on knowledge of the fuel and of current engine operation. The calorific value and/or density of the fuel may be determined or otherwise obtained using any one or more of the approaches described above.

The control 3004 may be iteratively repeated and updated if/when the fuel changes.

In alternative or additional implementations, and when the fuel supplied to the combustor 16 at step 3002 comprises at least 30% SAF (i.e. X≥30) at step 3004, the propulsion system 2 is controlled such that:

$$R_s = \frac{\text{spill percentage at cruise using kerosene}}{\text{spill percentage at cruise using a fuel with } X\% \text{ SAF}}$$

is greater than or equal to 1.003.

In various such implementations, spill is controlled such that:

$$R_s \geq 1 + \frac{X}{10000}.$$

For example, when X is 50, the fuel-change spill ratio may be at least 1.0066, and when X is 100, such that the fuel is pure SAF, and the fuel-change spill ratio may be at least 1.0138.

In various implementations of the method 3000, the gas turbine engine 10 may be arranged such that $R_s \leq 1.04$, and/or the gas turbine engine 10 is arranged such that $R_s \geq 1.003$, and optionally $R_s \geq 1.014$.

In other implementations, in particular in implementations in which a calorific value of the fuel is not known, the method 3000 may be flipped—instead of controlling $R_s$ based on engine activity and fuel properties, $R_s$ may be iteratively adjusted on changing to a new fuel until a desired energy flow rate, C, to the combustor 16 is achieved for a known (e.g. set or sensed) pump outlet flow rate Q. The change in spill, as captured in the ratio $R_s$, may therefore be used to determine the calorific value of a new fuel, if the fuel's density is known, or a value of the calorific value multiplied by the fuel density if not. A change in $R_s$ may therefore be used to determine fuel properties.

A propulsion system 2 for an aircraft 1 according to the examples currently being described may therefore comprise a gas turbine engine 10 and one or more fuel tanks 50, 53 arranged to contain fuel to supply fuel to power the gas turbine engine 10, one or more of the tanks 50, 53 containing sustainable aviation fuel—SAF—either alone or as part of a blend. The SAF has a density of between 90% and 98% of the density, $\rho_K$, of kerosene and a calorific value of between 101% and 105% the calorific value $CV_K$, of kerosene.

The gas turbine engine 10 of many examples comprises an engine core 11 comprising a turbine 19, a combustor 16, a compressor 14, and a core shaft 26 connecting the turbine to the compressor; and a fan 23 located upstream of the engine core, the fan comprising a plurality of fan blades and being arranged to be driven by an output from the core shaft 26; in addition to the fuel pump 108.

The fuel pump 108 is arranged to supply a fuel from one or more of the fuel tanks 50, 53 to the gas turbine engine 10 and provides a pump output volumetric flow rate, Q. The fuel pump 108 has an inlet 108a arranged to receive fuel from the one or more fuel tanks 50, 53 and an outlet 108b arranged to provide fuel to the gas turbine engine 10, and is arranged to recirculate (spill) excess fuel back from the outlet to the inlet (directly or indirectly), the percentage of fuel passing through the pump which is recirculated being referred to as a spill percentage. The fuel supplied to the gas turbine engine 10 comprises X % SAF, where X % is in the range from 5% to 100%, and is optionally at least 30%, with any remainder of the fuel being kerosene. The fuel supplied to the gas turbine engine 10 has a density, $\rho_F$, and a calorific value $CV_F$.

The propulsion system 2 is arranged such that the fuel-change spill ratio, $R_s$, is as described above.

The inventors have also appreciated that a measurement of the mass and volume of the fuel F being used by the aircraft can be used for the determination of the characteristics of the fuel. In one example, such a measurement of a fuel mass and volume can be performed during a refuelling process in which fuel is loaded onto the aircraft.

Figure 16:
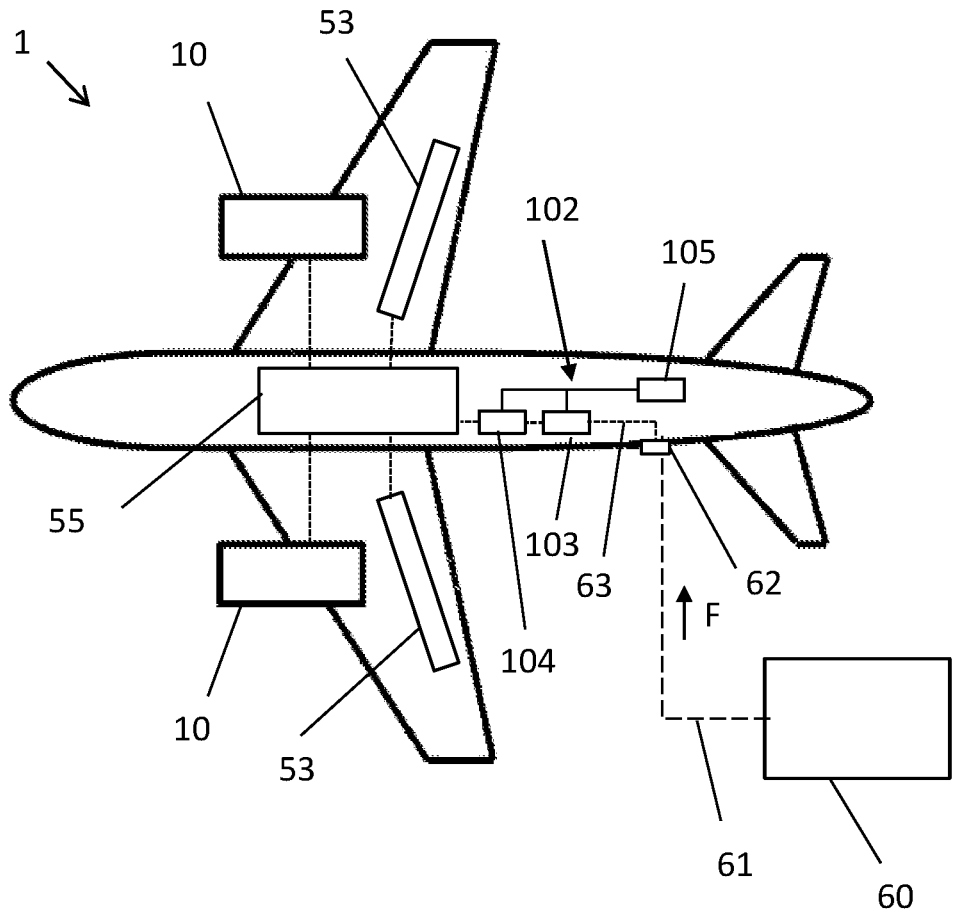
FIG. 16 is a schematic view of an aircraft including a fuel characteristic determination system.

FIG. 16 illustrates an aircraft 1 which is connected to a fuel storage vessel 60 for refuelling as described above. The fuel storage vessel 60 may be carried by a fuel supply vehicle (e.g. a fuel tanker) or may be a fixed storage vessel from which the aircraft 1 can be refuelled. The aircraft 1 comprises a fuel line connection port 62 which is coupled to a fuel loading line 61 during refuelling. The fuel loading line 61 may comprise a fuel pipe of known design. The fuel line connection port 62 is fluidly coupled with the fuel tanks 53, 55 of the aircraft 1 by a fuel transmission line or lines 63 on board the aircraft so that fuel received via the fuel loading line 61 is transferred and stored within the fuel tanks 53, 55. The fuel loading line 61 and fuel transmission line 63 may together form a fuel supply line used to supply fuel to the fuel tanks 53, 55 on board the aircraft 1 from the fuel storage vessel 60. In some examples, the fuel transmission line(s) 63 may not be present, with the fuel instead delivered directly from a fuel line connection port for each fuel tank (or set of interconnected fuel tanks).

Referring again to FIG. 16, the aircraft 1 further comprises a fuel characteristic determination system 102. The fuel characteristic determination system 102 is arranged to determine one or more fuel characteristics of the fuel being loaded, or which has been loaded, onto the aircraft 1, those characteristics being any of those described or claimed herein.

The fuel characteristic determination system 102 generally comprises a mass sensor 103, a volume sensor 104 and a fuel characteristic determination module 105. The mass sensor 103 is arranged to measure a mass of fuel being loaded onto the aircraft 1. In the presently described example, the mass sensor 103 is arranged to measure a mass flow rate of fuel as it flows from the fuel line connection port 62 to the fuel tanks 55, 53 on board the aircraft 1. The mass sensor in this example may be a mass flow meter arranged to measure the mass of fluid travelling past a fixed point within the fuel supply line per unit time. The point at which the mass flow rate is measured may be at any point upstream of the aircraft fuel tanks 53, 55 in which the fuel is stored so that the mass flow rate of fuel being loaded on the aircraft 1 can be measured. In the present example, the mass flow sensor 103 is located in a fuel conduit (e.g. part of the fuel transmission line 63) fluidly connecting the fuel line connection port 62 to one of the aircraft fuel tanks 53, 55. It may however be located at other points within the aircraft fuel system, for example at the fuel connection port 62. The mass flow meter 103 may be a Coriolis flow meter of known design. Any other suitable type of mass flow meter may however be used, for example any in which the mass determination is not measured indirectly based on knowledge of the density of the fuel.

The volume sensor 104 in the presently described example is arranged to measure a volume flow rate of fuel being loaded onto the aircraft 1. In the presently described example, the volume sensor 104 is arranged to measure a volume flow rate of fuel as it flows from the fuel line connection port 62 to the fuel tanks 53, 55 on board the aircraft 1. The volume sensor 104 in this example may be a volume flow meter arranged to measure the volume of fluid travelling past a fixed point within the aircraft fuel system per unit time. Similarly to the mass flow meter 103, the volume flow meter 104 may be located at any point upstream of the aircraft fuel tank(s) 53, 55 in which the fuel is stored. It may therefore be provided in the same fuel conduit as the mass flow meter 103, and may be downstream of the mass flow meter 103 as shown in the figures, or upstream from it. Any suitable volumetric flow meter may be used, such as a turbine or pressure flow meter. The volume flow meter may be of a type which does not infer the volumetric flow rate from a measured mass flow rate. Similarly, the mass flow meter may be of a type which does not infer the mass flow rate from a measured volumetric flow rate. The mass flow rate and volume flow rates are therefore measured independently from each other (and without requiring knowledge of the fuel density).

The fuel characteristic determination module 105 is arranged to determine one or more fuel characteristics of the fuel being loaded onto the aircraft 1 based on the fuel mass and fuel volume determined by the mass sensor 103 and volume sensor 104. The fuel characteristic determination module 105 is therefore in communication with the mass and volume sensors 103, 104 as shown in the Figures such that it can receive signals from them which are indicative of the fuel mass and fuel volume. In the present example, the fuel characteristic determination module 105 is a separate unit, and may be in communication with an electronic engine controller (EEC) 42 of each of the gas turbine engines 10 provided on the aircraft 1. The determined one or more fuel characteristics may be communicated to the EEC 42 such that the respective engine 10 can be controlled accordingly as will be discussed below. In other examples, the determination module 105 may be part of the EEC 42 of the (or each) engine 10.

The fuel characteristic determined by the fuel characteristic determination module 105 may be any of those described or claimed herein. In order to determine a fuel characteristic, the fuel characteristic determination module 105 is arranged to compare the fuel mass and fuel volume and determine a corresponding fuel density (e.g. by dividing the mass flow rate by the volume flow rate). As fuels having different fuel characteristics will exhibit a known variation in density, a characteristic of the fuel being loaded on to the aircraft 1 can be inferred based on the density. In some embodiments, a fuel characteristic or characteristics may be determined by calculating a deviation from the density value that would be expected if the fuel were fossil kerosene. In other embodiments, the determination module 105 may be arranged to access a lookup table defining known fuel characteristic dependence on fuel density. The measured fuel density can then be compared to the values in the lookup tables so that a characteristic of the fuel can be determined.

In one example, the fuel characteristic may be the percentage of SAF in the fuel. The inventors have observed that SAF has a lower density compared to fossil kerosene, and this difference can be used to infer the percentage of SAF present in the fuel based on a measurement of the density of the fuel as it is loaded onto the aircraft. Other fuel characteristics may also have an associated variation in fuel density. For example, the determination module 105 may determine that the fuel is fossil kerosene (e.g. substantially 100% fossil kerosene) if the measured fuel density is that associated with a fossil kerosene fuel with no SAF present. In other examples, the fuel characteristics determined may include a hydrocarbon distribution of the fuel, or an aromatic hydrocarbon content of the fuel. In other examples, the density of the fuel determined from the mass and volume measurements may be considered a fuel characteristic determined by the fuel characteristic determination system 102.

In the example shown in FIG. 16, a mass flow rate and volume flow rate of fuel are measured in fuel flowing within a conduit leading to the fuel tanks on board the aircraft. In some examples, the mass sensor is arranged to measure the mass of fuel stored in the aircraft fuel tanks during loading, or after it has been loaded. For example, the mass sensor 103 may be arranged to measure an increase in weight of the aircraft 1 as fuel is loaded, or an increase in weight of the fuel tanks 53, 55 themselves as they are filled with fuel. The fuel characteristic determination module 105 may in such examples base the fuel characteristic on a total mass of fuel loaded for a flight, or the mass per unit time loaded onto the aircraft, associated with a measured change in weight. The same may be the case for the volume sensor 104. In some examples therefore, the volume sensor 104 may be arranged to determine a volume of fuel stored in the fuel tanks of the aircraft. For example, the volume sensor 104 may comprise one or more level sensors arranged to measure a level of fuel within the, or each, fuel tank of the aircraft. The stored volume of fuel can then be determined. The determination module 105 may in such examples base the fuel characteristic(s) on a total volume, or volume per unit time, of fuel loaded onto the aircraft. The determination module may therefore more generally receive signal indicative of the mass and/or volume of fuel (e.g. a weight or level measurement), rather than a direct mass or volume measurement.

In various examples therefore, determining the mass of the fuel may comprise measuring the mass and/or a change in the mass of any one or more of: the aircraft; one or more fuel tanks on board the aircraft; a fuel tanker vehicle from which the fuel is supplied; or a storage vessel from which the fuel is supplied to the aircraft. Determining the volume of the fuel may comprise measuring the volume and/or a change in the volume of fuel: (a) stored in one or more fuel tanks on board the aircraft; and/or (b) stored in a fuel storage vessel from which the fuel is supplied to the aircraft.

In the example illustrated in FIG. 16, the determination system 102 is located entirely on board the aircraft 1. In other examples, that may not be the case, with one or more components of the determination system 102 not being located on the aircraft 1. For example, the mass and volume sensors 103, 104 and the determination module 105 may be included in a dedicated unit which is separate from the aircraft 1. In some examples, the fuel characteristic determination system 102 may be located entirely outside of the aircraft. In such an example, the fuel characteristic determination module 105 may determine a fuel characteristic which is then communicated to the aircraft 1 (e.g. to a control module of the engines or engines 10). In this example, a data transfer link may be provided (e.g. a wireless or wired data connection) and may be used to communicate the fuel characteristics to the aircraft from the fuel characteristic determination system 102. In some examples, the data transfer may be done manually by a user, e.g. a technician or other operator of the system may obtain the fuel characteristics from the determination system 102 and manually provide them to a control module on board the aircraft.

In some examples, some of the components of the system 102 may be located at the fuel supply vessel 60 (e.g. on board a fuel tanker vehicle). For example, the sensors 103, 104 may be located within the fuel supply line 61, and the fuel characteristic determination module 105 located on board the aircraft 1. In such an example, mass and volume measurements may be communicated to the determination unit on board the aircraft using any suitable (wired or wireless) data connection. In some examples, the mass and volume sensors 103, 104 may be arranged to measure the mass and/or volume of fuel that is taken out of the storage vessel 60 connected to the aircraft 1. In one example, the mass sensor 103 may be arranged to determine the mass of fuel supplied to the aircraft by measuring a change in weight of the fuel storage vessel 60, or a vehicle on which the fuel storage vessel 60 is transported. Similarly, the volume sensor 104 may comprise a level sensor arranged to measure the level of fuel contained in the fuel storage vessel 60. Measurements carried out on or associated with the fuel storage vessel may be used to determine a total mass and/or total volume, or a mass per unit time and/or volume per unit time of fuel provided to the aircraft.

In some examples, the fuel characteristic determination module 105 is arranged to determine the one or more fuel characteristics based at least in part on a fuel temperature. This may allow variation in the density of the fuel caused by changes in the fuel temperature to be distinguished from those associated with the fuel characteristic or characteristics being determined. In some examples, the determination module 105 is arranged to obtain a signal indicative of a current temperature of the fuel, for example from a fuel temperature sensor arranged to directly measure the temperature of the fuel, or an ambient temperature sensor.

In the presently described examples, the fuel characteristic determination module 105 is arranged determine the one or more fuel characteristics based only on the determined fuel mass and fuel volume. In other examples, the determination module 105 may be arranged to combine the fuel mass and fuel volume information with inputs from other sensors or other methods of determining fuel characteristics as described elsewhere herein. This may allow a greater range of types of fuel characteristic to be inferred, or may improve the accuracy of the fuel characteristic determination.

Figure 17:
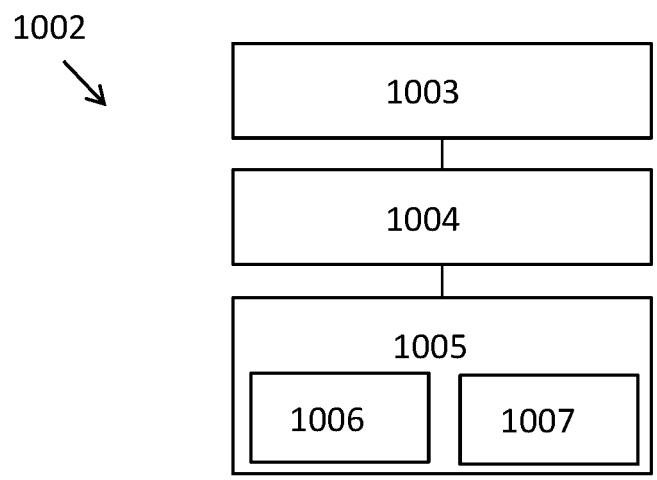
FIG. 17 is a schematic representation of a method of determining one or more fuel characteristics of an aviation fuel.

FIG. 17 illustrates a method 1002 of determining one or more fuel characteristics of an aviation fuel that may be carried out by the fuel characteristic determination system 102 shown in FIG. 16. The method 1002 comprises determining 1003 a mass of fuel being loaded (or which has been loaded) onto the aircraft 1; determining 1004 a fuel volume of the fuel being loaded (or which has been loaded) onto the aircraft 1; and determining 1005 one or more fuel characteristics based on the determined mass and volume of the fuel. The mass and volume measurements may be performed during a refuelling process e.g. to measure a mass and/or volume of fuel as it is being loaded onto the aircraft, or the total mass and/or volume of fuel that has been loaded onto the aircraft once the refuelling is complete (e.g. before operation of the aircraft).

Determining 1003 the fuel mass may comprise measuring a mass flow rate a point within a fuel supply line used to convey fuel to the fuel tanks 53, 55 of the aircraft. As discussed above, the point at which the mass flow rate is measured may be any point upstream of one or more fuel tanks 53, 55 on board the aircraft 1. For example, the fuel flow rate may be measured at a point on board the aircraft through which fuel loaded onto the aircraft travels to reach the fuel tanks(s). In other embodiments, the fuel flow rate may be measured at a point within a fuel loading system (i.e. not on the aircraft) such as a point within a fuel loading line 61 connected to the aircraft.

Determining 1004 the fuel volume may comprise measuring a volume flow rate a point within a fuel supply line used to convey fuel to the fuel tanks 53, 55 of the aircraft. As discussed above, the point at which the volume flow rate is measured may be any point upstream of one or more fuel tanks 53, 55 on board the aircraft 1 similarly to the measurement of the mass flow rate. The volume flow rate can be measured at similar, or an adjacent, position to the mass flow rate.

As discussed above, in some examples, determining 1003 the fuel mass may comprise measuring the mass or a change in the mass of the aircraft 1, one or more fuel tanks 53, 55 on board the aircraft to which fuel is supplied, a tanker vehicle from which the fuel is supplied, or a fuel storage vessel 60 from which it is provided. The change in weight of the aircraft 1, fuel tanks 53, 55, tanker vehicle, or fuel storage vessel 60 may be used to determine a mass flow per unit time, or total mass, of fuel loaded onto the aircraft 1 for comparison with a corresponding volume measurement.

The step of determining 1004 the fuel volume may comprise measuring the volume or a change in volume of fuel within one or more fuel tanks 53, 55 on board the aircraft 1 or the fuel storage vessel 60. Measuring the change in volume may comprise measuring a fluid level within the respective vessel/fuel tank in which the fuel is contained. The change in fuel level may be used to determine a volume per unit time, or total volume, of fuel loaded onto the aircraft 1 for comparison with the corresponding mass measurement.

Determining 1005 the one or more fuel characteristics may comprise comparing the determined fuel mass and fuel volume. As discussed above, this may include calculating 1006 a fuel density based on the mass and volume. The one or more fuel characteristics may be determined 1005 based on a comparison of the calculated fuel density with a known density value associated with fuel having known characteristics. The one or more fuel characteristics determined may be any of those described herein which are associated with a corresponding characteristic fuel density.

In the embodiment shown in FIG. 17, the one or more fuel characteristics are further determined 1007 based on a signal indicative of the temperature of the fuel. As discussed above, the signal indicative of the temperature of the fuel may be from a sensor arranged to directly measure the fuel temperature, or a sensor arranged to measure the ambient temperature, or otherwise input to the determination module.

In the present example, characteristics of fuel as it is being loaded onto the aircraft may be determined. In such examples, the one or more fuel characteristics determined may be communicated to the EEC 42 directly if it is running during refuelling, or may otherwise be stored and communicated to the EEC when it is activated. If the EEC is not active when fuel characteristics are determined, they may be communicated to another control system of the aircraft.

Where fuel characteristics are determined for fuel being loaded onto the aircraft that fuel may be mixed with fuel already present in the fuel tanks (e.g. from previous flights). The determined fuel characteristics may therefore be combined with those determined from previous times at which the aircraft was refuelled in order to determine the characteristics of the fuel stored in the aircraft fuel tanks. This may be done using a summing method in which the amount of fuel loaded into the tanks, the amount of fuel used during each flight, and the corresponding characteristics of the fuel loaded are logged and combined to determine the fuel characteristics of fuel actually stored within the aircraft tanks at a given time.

Figure 18:
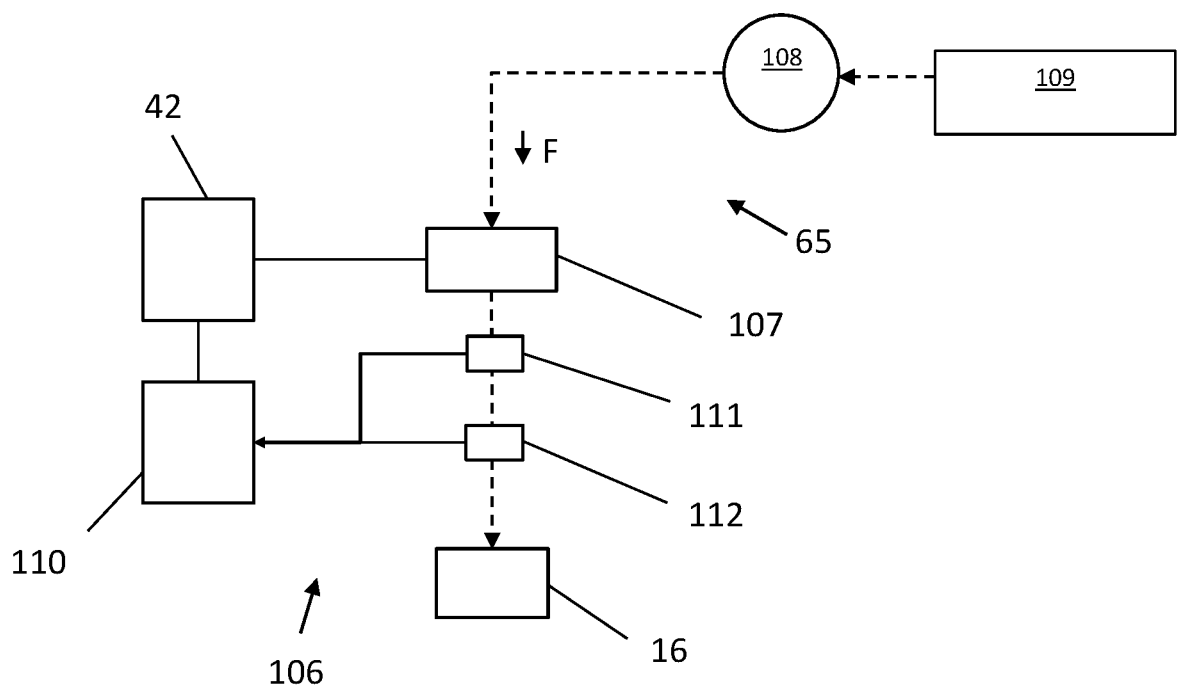
FIG. 18 is schematic view of a fuel characteristic determination system provided within a fuel system of a gas turbine engine.

The inventors have also appreciated that the fuel characteristics can be determined during operation of the gas turbine engine, rather than during refuelling. FIG. 18 illustrates another example of a fuel characteristic determination system 106. In this example, the fuel characteristic determination system 106 is configured to determine one or more characteristics of the fuel being used by the gas turbine engine of the present application during operation of the engine 10. The example of FIG. 18 therefore differs from that of FIG. 16 in that the mass and volume of fuel that is delivered to a combustor of the engine is determined, e.g. the mass and volume may be measured while the fuel is burnt by the gas turbine engine 10. More specifically, this may be during flight of the aircraft 1 to which the gas turbine engines 10 are mounted, or during operation of the aircraft 1 whilst it is on the ground (e.g. during taxi).

FIG. 18 shows a schematic view of part of the fuel system of the aircraft 65 and combustion equipment 16 of the gas turbine engine 10. The combustion equipment 16 comprises a plurality of fuel nozzles (not shown in FIG. 18) arranged to inject fuel into a combustion can. Fuel is provided to the combustion equipment 16 by a fuel delivery regulator 107 under the control of the EEC 42. Fuel is delivered to the fuel delivery regulator 107 by a fuel pump 108 from a fuel source 109 on board the aircraft 1 (e.g. the fuel tanks 53, 55 described above). The fuel delivery regulator 107 and combustion equipment 16 (which may be referred to simply as a combustor) may be of known design, and may be arranged for staged (lean-burn) combustion or rich-burn combustion.

The fuel characteristic determination system 106 shown in FIG. 18 generally comprises a fuel characteristic determination module 110, mass sensor 111 and volume sensor 112. The system 106 shown in FIG. 18 differs from that of FIG. 16 in that it is arranged to measure the mass and volume of fuel as it is being supplied and burnt by the combustion equipment 16 of the gas turbine engine 10 as the engine is operating, rather than when the fuel is being loaded onto the aircraft 1.

The aircraft 1 comprises an aircraft fuel supply system located on board the aircraft which is suitable for suppling fuel F to each of the gas turbine engines 10 to be burnt in the engine combustion equipment 16 as described above. The aircraft fuel supply system is arranged to provide fuel to an engine fuel system provided on each of the gas turbine engines 10. The engine fuel system and aircraft fuel supply system together form the (overall) fuel system of the aircraft 1 in which fuel is stored, delivered to the engine, and combusted. The fuel system of the aircraft includes any component which may store fuel, or through which fuel flows during use or during refuelling.

The mass sensor 111 is arranged to measure a mass flow rate of fluid being supplied to the combustion equipment 16. In the presently described example, the mass flow sensor 111 is arranged to measure the mass of fuel per unit time flowing between the fuel delivery regulator 107 and the combustion equipment 16. Any suitable mass flow rate meter may be used for the mass flow sensor 111, such as a Coriolis flow meter. The mass flow meter may be any mass flow meter which performs a mass measurement which is not based on knowledge of the density of the fuel. The mass flow sensor 111 may be arranged to measure the mass flow rate of fuel at any point within the fuel system of the aircraft that is upstream of the combustion equipment 16 (e.g. upstream of the fuel nozzles of the combustion equipment 16) and downstream of the fuel source 109 from which the fuel is supplied on board the aircraft 1 (e.g. downstream of the one or more fuel tanks 53, 55 forming the fuel source). In some examples, the mass flow rate is therefore measured at a point within the engine fuel system such as in a fuel conduit within or forming part of the gas turbine engine 10 (rather than being measured by a sensor provided on the aircraft 1 to which the gas turbine engine 10 is mounted). In some examples, the mass flow rate is measured at a point immediately before fuel the fuel is combusted, e.g. immediately before it enters the combustor. In yet other embodiments, the mass flow rate is measured at a point within the aircraft fuel supply system e.g. before it enters part of the gas turbine engine 10.

The volume sensor 112 is arranged to measure a volume flow rate of fluid being supplied to the combustion equipment 16. In the presently described example, the volume flow sensor is arranged to measure the volume of fuel per unit time flowing between the fuel delivery regulator 107 and the combustion equipment 16. Any suitable volume flow rate meter may be used for the volume flow sensor 112, such as a pressure or turbine type flow meter. The volume flow rate meter may be of a type that is arranged to measure the volume flow rate without reliance on a mass measurement. Similarly the mass flow rate meter may be of a type that is arranged to measure the mass flow rate without reliance on a volume measurement. The volume and mass flow sensors may be of the same type as described in the embodiment of FIG. 16.

The volume flow sensor 112 may be arranged to measure the volume flow rate of fuel at any point within the fuel system of the aircraft that is upstream of the combustion equipment 16 (e.g. upstream of the fuel nozzles of the combustion equipment 16) and downstream of the fuel source 109 from which the fuel is supplied (e.g. downstream of the one or more fuel tanks 53, 55 forming the fuel source). It may therefore be at a similar or adjacent position to the mass sensor 111 (e.g. upstream or downstream of it). In some examples, the volume flow rate is therefore also measured at a point within a fuel conduit within or forming part of the gas turbine engine 10 (rather than being measured by a sensor provided on the aircraft 1 to which the gas turbine engine 10 is mounted). In some examples, the volume flow rate is measured at a point immediately before fuel is combusted similarly to the mass flow rate, e.g. immediately before entering the combustor 16. In some examples, the volume flow rate is measured in part of the aircraft fuel supply system, before fuel reaches the gas turbine engines.

The fuel characteristic determination module 110 is in communication with the mass and volume sensors 111, 112, and is arranged to receive signals therefrom indicative of the mass and volume of fuel per unit time being burnt by the combustion equipment 16. The fuel characteristic determination module 110 is arranged to determine one or more fuel characteristics of the fuel based on the fuel mass and volume similarly to the determination module 105 described in connection with FIG. 16. For example, the determination module 110 may be arranged to calculate a density of the fuel from signal indicative of the fuel mass and volume based on which a fuel characteristic can be found as described above. As can be seen in FIG. 18, the determination module 110 may transmit the one or more fuel characteristics to the EEC 42. In other examples, it may form part of the EEC 42.

The fuel characteristic(s) determined by the determination module 110 may be any of those described or claimed herein. In order to determine a fuel characteristic, the fuel characteristic determination module 110 is arranged to compare the fuel mass and fuel volume and determine a corresponding fuel density (e.g. by dividing the mass flow rate by the volume flow rate). As fuels having different fuel characteristics will exhibit a known variation in density, a characteristic of the fuel being loaded on to the aircraft 1 can be inferred. In some embodiments, the fuel characteristic may be determined by calculating a deviation from the density value that would be expected if the fuel were fossil kerosene. In other embodiments, the fuel characteristic determination module 110 may be arranged to access a lookup table defining known fuel characteristic dependence on fuel density. The measured fuel density can then be compared to the values in the lookup tables so that a characteristic of the fuel can be determined. The fuel characteristic determination module may therefore operate in a corresponding manner to that of FIG. 16.

In one example, the fuel characteristic may be the percentage of SAF in the fuel. The inventors have observed that SAF has a lower density compared to fossil kerosene, and this difference can be used to infer the percentage of SAF present in the fuel based on a measurement of the density of the fuel as it is loaded onto the aircraft. Other fuel characteristics may also have an associated variation in fuel density. For example, the fuel characteristic determination module 110 may determine that the fuel is fossil kerosene (e.g. substantially 100% fossil kerosene) if the measured fuel density is that associated with a fossil kerosene fuel with no SAF present. In other examples, the fuel characteristics determined may include a hydrocarbon distribution of the fuel, or an aromatic hydrocarbon content of the fuel. In other examples, the density of the fuel may be considered a fuel characteristic determined by the fuel characteristic determination system 106.

In the example illustrated in FIG. 18, the mass sensor 111 and volume sensor 112 are arranged to measure the flow of fuel passing through the engine fuel system. In other embodiments, the determination module 110 may be arranged to receive a signal indicative of the mass and/or volume flow rate, which may not be a direct measurement of the flow of fuel. Such a signal may be an operating parameter of the fuel pump 108 such as the pump speed or spill rate which has a known relationship with the fuel mass and/or volume flow rate.

In some examples, the fuel characteristic determination module 110 is arranged to determine the one or more fuel characteristics based on a fuel temperature similarly to as described above. This may allow variation in the density of the fuel caused by changes in the fuel temperature to be distinguished from those associated with the fuel characteristic or characteristics being determined. This may be important in examples where the fuel is heated above ambient temperature by a heat exchanger forming part of a heat management system of the engine 10. In some examples therefore, the fuel characteristic determination module 110 is arranged to obtain a signal indicative of a current temperature of the fuel at the point where the volume and/or mass is measured. The temperature may be measured by a fuel temperature sensor arranged to directly measure the temperature of the fuel, or an ambient temperature sensor. In other examples, the fuel characteristic determination module 110 may receive a signal indicative of the fuel temperature which is inferred from other engine operating parameters rather than being based on a direct measurement.

In the presently described examples, the fuel characteristic determination module 110 is arranged to determine the one or more fuel characteristics based only on the determined fuel mass and fuel volume obtained during operation of the gas turbine engine 10. In other examples, the fuel characteristic determination module 110 may be arranged to combine the fuel mass and fuel volume information with inputs from other sensors or other methods of determining fuel characteristics as described elsewhere herein. This may allow a greater range or types of fuel characteristic to be inferred, or improve the accuracy of the fuel characteristic determination.

Figure 19:
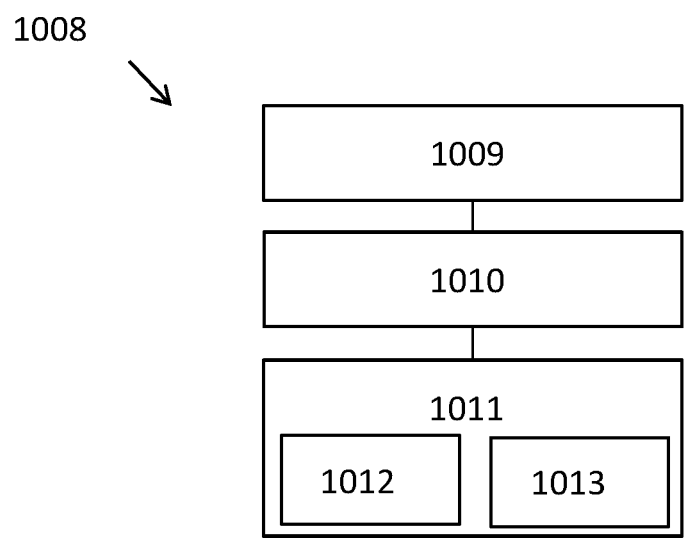
FIG. 19 is another schematic representation of a method of determining one or more fuel characteristics of an aviation fuel.

FIG. 19 illustrates a method 1008 of determining a fuel characteristic of an aviation fuel that may be carried out by the fuel characteristic determination system 106 shown in FIG. 18. The method 1008 comprises: determining 1009 a mass of fuel being supplied to the combustor; determining 1010 a corresponding volume of the fuel being supplied to the combustor; and determining 1011 one or more fuel characteristics based on the determined mass and volume.

The mass and volume of fuel are determined during operation of the gas turbine engine.

As discussed above, the determining 1009 of the mass of fuel comprises determining a mass flow rate of fuel being supplied to the combustor 16. The mass flow rate may be determined based on a measurement performed by a mass flow meter 111 on fuel flowing to the combustor 16. The mass flow rate may be measured at any point within the aircraft fuel system that is upstream of the combustion equipment 16. For example, upstream of the fuel nozzles of the combustion equipment 16, and downstream of the fuel source 109 from which the fuel is supplied on board the aircraft 1 (e.g. downstream of the one or more fuel tanks 53, 55 forming the fuel source). In some examples, the mass flow rate may be measured at a point in a fuel conduit of the engine fuel system. The mass flow rate may be measured immediately before fuel reaches the combustor 16.

Determining 1010 the volume of fuel comprises determining a volume flow rate of fuel being supplied to the combustor 16. The volume flow rate may be determined 1010 based on a measurement of fuel flow using a volume flow meter 112 as described above. The volume fuel meter 112 may be arranged to measure the volume flow rate at positions equivalent to those described above with reference to the mass flow meter.

In some examples the mass and volume flow rate may be measured at positions close to each other or immediately up or down stream from each other, or at separate locations within the fuel supply system. In any of the examples herein, the mass and volume are measured for the same flow of fuel i.e. the mass and volume are measured at positions on a flow path carrying the same fuel composition, and there are no additional sources of sinks of fuel between. This allows the measured flow rates to be meaningfully compared. In examples where fuels of different compositions are stored in the fuel tanks 53, 55 of the aircraft, the mass and volume sensors are located so as to measure the same fuel flow e.g. both volume and mass sensors may be located in a pipe conveying fuel from tank 53, which may store fuel of a different composition from that of tank 55. In such an example, a further mass and volume sensor pair may be provided in a pipe conveying fuel from tank 55 so that the characteristics of each fuel may be measured independently.

In some examples, the steps of determining 1009, 1010 the mass of fuel and volume of fuel may comprise basing the determination on a signal from which the flow rate can be inferred rather than a direct measurement. In some examples therefore, the determining of the mass or volume of fuel is based on an operating parameter of the fuel pump 108 or other signal indicative of the mass/volume flow rate.

As discussed above, determining 1011 the one or more fuel characteristics comprises comparing the determined fuel mass and fuel volume. This may include calculating 1012 a fuel density based on the mass and volume. The one or more fuel characteristics may be determined 1011 based on a comparison of the calculated fuel density with a known value associated with fuel having known characteristics. The one or more fuel characteristics determined may be any of those described herein which are associated with a corresponding characteristic fuel density.

In the embodiment shown in FIG. 19, the one or more fuel characteristics are further determined 1013 based on a signal indicative of the temperature of the fuel. As discussed above, the signal indicative of the temperature of the fuel may be from a sensor arranged to directly measure the fuel temperature, or a sensor arranged to measure the ambient temperature, or otherwise input to the determination module from another source.

The fuel characteristics determined using any of the fuel characteristic determination systems or methods of determining a fuel characteristic in the examples herein may be used in the operation of the aircraft, and more specifically operation of the gas turbine engine(s) of the aircraft. This may allow the operation of the aircraft 1 to be modified in response to the fuel characteristic determined.

Figure 20:
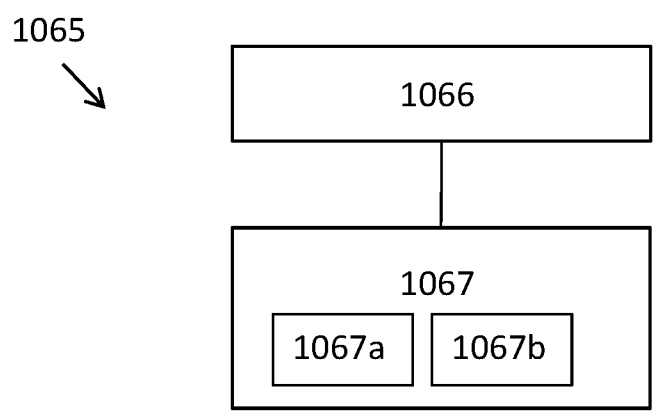
FIG. 20 is a schematic representation of a method of operating an aircraft.

The present application therefore further provides a method 1065 of operating an aircraft 1 powered by one or more gas turbine engines 10 as illustrated in FIG. 20. The method 1065 may be a method of operating the aircraft 1 of any of the examples described herein. The method 1065 comprises determining 1066 one or more fuel characteristics. This may comprise using any of the methods described herein. The method 1065 further comprises operating 1067 the aircraft 1 according to the one or more fuel characteristics. Operating the aircraft 1067 may more specifically comprise operating the gas turbine engine(s) 10 mounted to the aircraft 1, but may include operating other parts of the aircraft.

Once one or more fuel characteristics are known, the gas turbine engine 10 or the aircraft more generally may be controlled or operated in various different ways to take advantage of that knowledge. The step of operating 1067 the gas turbine engine or the aircraft may comprise modifying 1067a a control parameter of the aircraft, and specifically a control parameter of the gas turbine engine, in response to the one or more fuel characteristics. Modifying the control parameter may include any one or more of the following:

i) Modifying a control parameter of a heat management system of the gas turbine engine (e.g. a fuel-oil heat exchanger) based on the one or more fuel characteristics. By modifying the operation of the heat exchanger the temperature of fuel supplied to the combustor 16 of the engine 10 can be changed. In one example, modifying the operation of the heat management system or changing the temperature of the fuel may comprise increasing the temperature of the fuel if the fuel characteristics indicate that the fuel can tolerate operating at a higher temperature without risk of coking or thermal breakdown.

ii) When more than one fuel is stored aboard an aircraft 1, modifying a control parameter that controls a selection of which fuel to use for which operations (e.g. for ground-based operations as opposed to flight, for low-temperature start-up, or for operations with different thrust demands) based on fuel characteristics such as % SAF, nVPM generation potential, viscosity, and calorific value. A fuel delivery system of the aircraft may therefore be controlled appropriately based on the fuel characteristics. The fuel delivery system may be controlled to supply the engine with fuel having a different fuel characteristic to that measured in step 1066. This may include, for example, providing fuel with a relatively lower aromatic content; providing fuel with a lower SAF content; or providing fossil Kerosene fuel. The fuel supply may be controlled by switching between fuel tanks, or changing a fuel blend ratio.

iii) Modifying a control parameter to adjust one or more flight control surfaces of the aircraft 1, so as to change route and/or altitude based on knowledge of the fuel.

iv) Modifying a control parameter to modify the spill percentage of a fuel pump (i.e. the proportion of pumped fuel recirculated instead of being passed to the combustor) of a fuel system of the aircraft according to the one or more fuel characteristics, for example based on the % SAF of the fuel. The pump and/or one or more valves may therefore be controlled appropriately based on the fuel characteristics.

v) Modifying a control parameter to change the scheduling of variable-inlet guide vanes (VIGVs) based on fuel characteristics. The VIGVs may be moved, or a movement of the VIGVs be cancelled, as appropriate based on the fuel characteristics.

In the examples above, the gas turbine engine or the aircraft is operated according to the one or more fuel characteristics by making changes to how the aircraft or gas turbine engine are controlled during their use. This may be done, for example, by a control system of the engine (such as the EEC 42) making changes to various control parameters of the engine. Similar changes may be implemented by other control systems of the aircraft during use (e.g. during flight). The EEC may be more generally referred to as an example of a control system 42 arranged to control operation of the aircraft (e.g. it may be a control module of a control system).

The present application further provides an aircraft 1 having a fuel characteristic determination system 102, 106 according to any one or more of the examples disclosed or claimed herein. The aircraft 1 further comprises a control system arranged to control operation of the aircraft according to one or more fuel characteristics determined by the fuel characteristics determination system. The control system may comprise the engine EEC 42, with which the fuel characteristic determination system may be in communication or partly integrated therein. In other examples, other control systems of the aircraft may be provided with fuel characteristics and the aircraft controlled accordingly.

The step of operating 1067 the gas turbine engine or aircraft according to the one or more fuel characteristics may be performed automatically in response to the determination of fuel properties without any intervention of the pilot. In some examples, it may be performed after approval by a pilot, following the pilot being notified of a proposed change. In some examples, the step 1067a may include automatically making some changes, and requesting others, depending on the nature of the change. In particular, changes which are "transparent" to the pilot—such as internal changes within engine flows which do not affect engine power output and would not be noticed by a pilot—may be made automatically, whereas any changes which the pilot would notice may be notified to the pilot (i.e. a notification appearing that the change will happen unless the pilot directs otherwise) or suggested to the pilot (i.e. the change will not happen without positive input from the pilot). In implementations in which a notification or suggestion is provided to a pilot, this may be provided on a cockpit display of the aircraft, and/or sent to a separate device such as a portable tablet or other computing device, and/or announced via audible sound such as synthesized speech or recorded message or a particular tone indicative of the proposed/notified change.

In other examples, the step of operating 1067 the gas turbine engine according to the one or more fuel characteristics may include providing 1067b the gas turbine engine with fuel having different characteristics to that of the fuel for which the one or more fuel characteristics were measured in step 1066. This provision of a different fuel may include loading fuel having different fuel characteristics into the fuel tanks of the aircraft when refuelling the aircraft.

In some embodiments, the one or more fuel characteristics determined may include the density of the fuel calculated from the mass and volume measurements. In such an example, the aircraft may be operated according to the fuel density.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A method of determining one or more fuel characteristics of an aviation fuel suitable for powering a gas turbine engine of an aircraft, the gas turbine engine having a combustor supplied with a mixed fuel from a fuel system of the aircraft, the method comprising:
   determining a mass of the mixed fuel being supplied to the combustor, the mixed fuel comprising a mix of at least a fresh fuel added to a fuel tank during a recent refueling operation and residual fuel that existed in the fuel tank prior to the recent refueling operation;
   determining a corresponding volume of the mixed fuel being supplied to the combustor;
   determining one or more fuel characteristics based on the determined mass and determined volume, the one or more fuel characteristics determined including any one or more of:
      (i) a hydrocarbon distribution of the mixed fuel;
      (ii) a percentage of sustainable aviation fuel (SAF) in the mixed fuel; and
      (iii) an aromatic hydrocarbon content of the mixed fuel; and
   modifying a control parameter of a heat management system of the gas turbine engine to increase a temperature of the mixed fuel if the determined one or more fuel characteristics indicates that the mixed fuel can tolerate operating at a higher temperature without risk of coking or thermal breakdown.

2. The method of claim 1, wherein determining the one or more fuel characteristics comprises calculating a fuel density based on the determined mass and determined volume.

3. The method of claim 1, wherein determining the mass of the mixed fuel comprises determining a mass flow rate of fuel being supplied to the combustor.

4. The method of claim 3, wherein the fuel system comprises an engine fuel system forming part of the gas turbine engine, and the mass flow rate is measured at a point in a fuel conduit of the engine fuel system, preferably immediately before the mixed fuel reaches the combustor.

5. The method of claim 3, wherein the mass flow rate is determined based on an operating parameter of a fuel pump provided in the fuel system, or the mass flow rate is determined based on a measurement of fuel flow using a mass flow meter.

6. The method of claim 1, wherein determining the volume of the mixed fuel comprises determining a volume flow rate of fuel being supplied to the combustor.

7. The method of claim 6, wherein the fuel system is an engine fuel system forming part of the gas turbine engine, and the volume flow rate is measured at a point in a fuel conduit of engine fuel system, preferably immediately before the mixed fuel reaches the combustor.

8. The method of claim 6, wherein the volume flow rate is determined based on an operating parameter of a pump provided in the fuel system or wherein the volume flow rate is determined based on a measurement of fuel flow using a volume flow meter.

9. The method of claim 1, wherein the one or more fuel characteristics include an indication that the fuel is a fossil fuel.

10. A method of operating an aircraft having a gas turbine engine, the method comprising:
  determining one or more fuel characteristics of the mixed fuel using the method of claim 1; and
  operating the aircraft according to the one or more fuel characteristics.

11. The method according to claim 10, wherein operating the aircraft according to the one or more fuel characteristics comprises:
  a) modifying a control parameter of the aircraft, preferably a control parameter of the gas turbine engine, in response to the one or more fuel characteristics; and/or
  b) providing a fuel having different fuel characteristics during a next refuelling of the aircraft.

12. The method according to claim 1, wherein one of the fresh fuel and the residual fuel includes SAF.

13. The method according to claim 12, wherein the other of the fresh fuel and the residual fuel contains kerosene.

14. A fuel characteristic determination system for determining one or more fuel characteristics of an aviation fuel suitable for powering a gas turbine engine of an aircraft, the gas turbine engine having a combustor supplied with a mixed fuel from a fuel system of the aircraft, the fuel characteristic determination system comprising:
  a processor programmed to:
    receive a fuel mass signal indicative of a mass of the mixed fuel being supplied to the combustor, the mixed fuel comprising a mix of at least a fresh fuel added to a fuel tank during a recent refueling operation and residual fuel that existed in the fuel tank prior to the recent refueling operation;
    receive a fuel volume signal indicative of a volume of the mixed fuel being supplied to the combustor; and
    determine one or more fuel characteristics of the fuel based on the fuel volume signal and the fuel mass signal, the one or more fuel characteristics determined including any one or more of:
      (i) a hydrocarbon distribution of the mixed fuel;
      (ii) a percentage of SAF in the mixed fuel; and
      (iii) an aromatic hydrocarbon content of the mixed fuel; and
    modify a control parameter of a heat management system of the gas turbine engine to increase a temperature of the mixed fuel if the determined one or more fuel characteristics indicates that the mixed fuel can tolerate operating at a higher temperature without risk of coking or thermal breakdown.

15. The fuel characteristic determination system of claim 14, wherein the processor is programmed to calculate a density of the mixed fuel based on the fuel mass signal and fuel volume signal.

16. The fuel characteristic determination system of claim 14, further comprising:
  a mass flow meter arranged to measure a mass flow rate of the mixed fuel being supplied to the combustor and wherein the fuel mass signal is received from the mass flow meter; and/or
  a volume flow meter arranged to measure a volume flow rate of them mixed fuel being supplied to the combustor and wherein the fuel volume signal is received from the volume flow meter.

17. The fuel characteristic determination system of claim 16, wherein:
  the mass flow meter and/or volume flow meter are arranged to measure the flow of the mixed fuel measured at a point in a fuel conduit of an engine fuel system of the gas turbine engine.

18. The fuel characteristic determination system of claim 14, wherein:
  the fuel system further comprises a fuel pump arranged to provide the mixed fuel to the combustor, and
  the fuel mass signal and/or the fuel volume signal is based on an operating parameter of the fuel pump.

19. The system of claim 14, wherein the one or more fuel characteristics include an indication that the fuel is a fossil fuel.

20. An aircraft comprising the fuel characteristic determination system of claim 14, further comprising a control system arranged to control operation of the aircraft according to the one or more fuel characteristics determined by the fuel characteristic determination system.

21. The fuel characteristic determination system of claim 14, wherein one of the fresh fuel and the residual fuel includes SAF.

22. The fuel characteristic determination system of claim 21, wherein the other of the fresh fuel and the residual fuel contains kerosene.

* * * * *